Jan. 11, 1966  S. LUBKIN ETAL  3,229,257
DATA PROCESSING APPARATUS

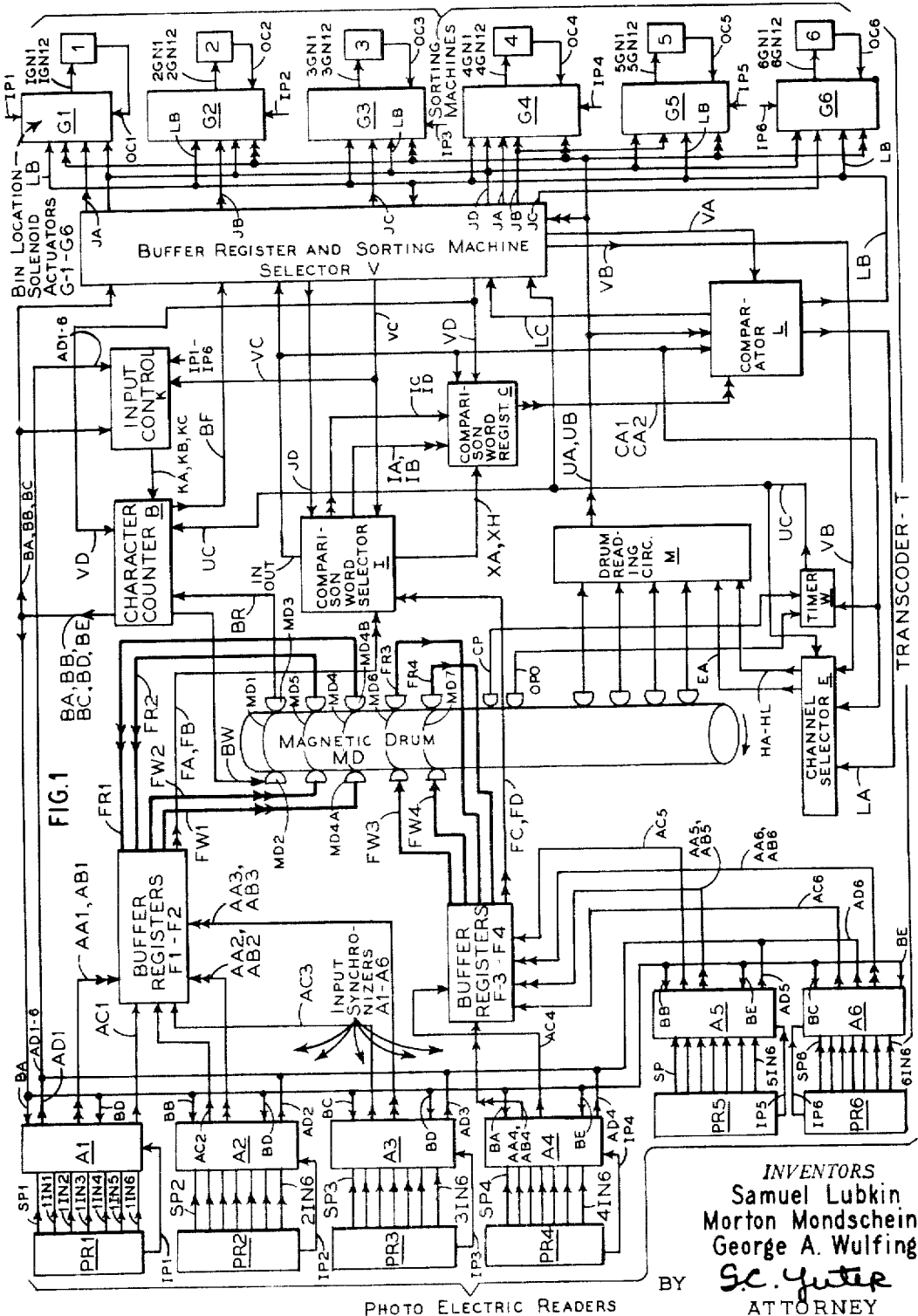

Filed Oct. 17, 1960  18 Sheets-Sheet 2

GATE

BUFFER

FLIP-FLOP

PULSE AMPLIFIER

DELAY LINE

TOGGLE FLOP

WRITE AMPLIFIER

READ AMPLIFIER

ACTUATOR

DETAIL OF WRITE AMPLIFIER

*INVENTORS*
Samuel Lubkin
Morton Mondschein
George A. Wulfing

S.C. Yuter
ATTORNEY

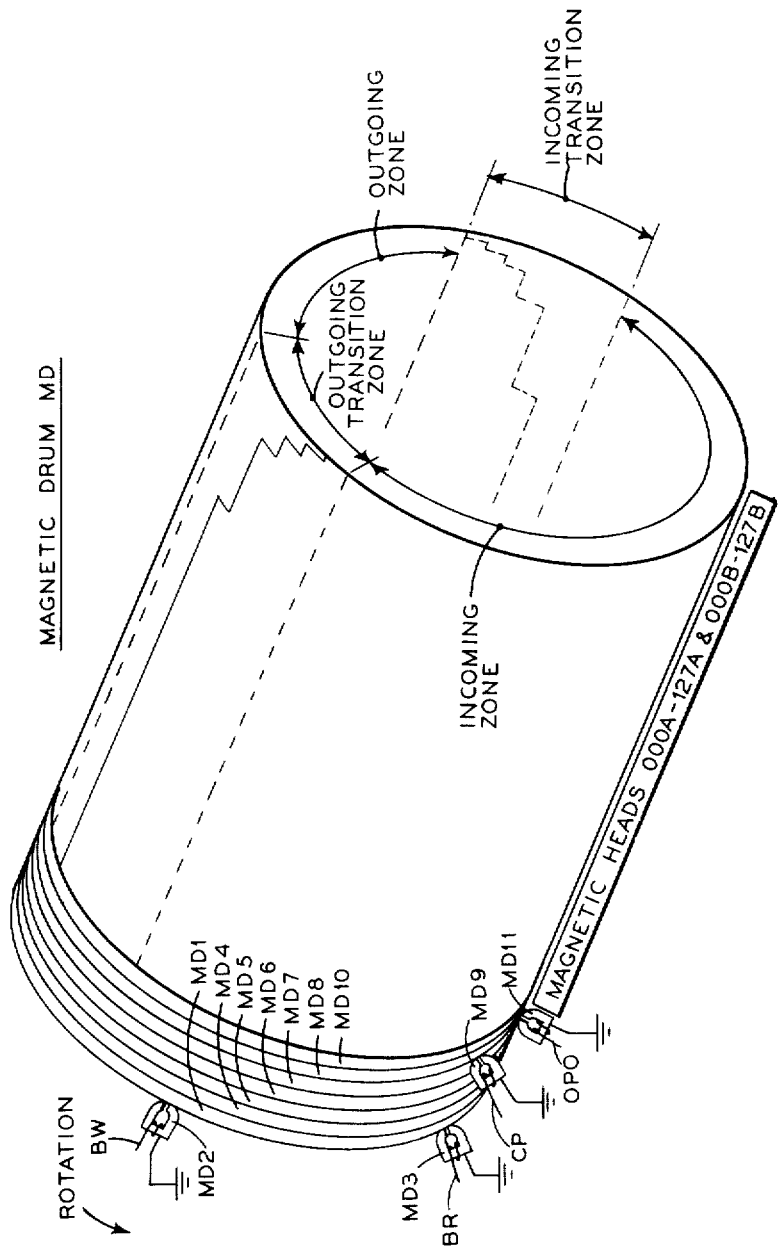

FIG. 16
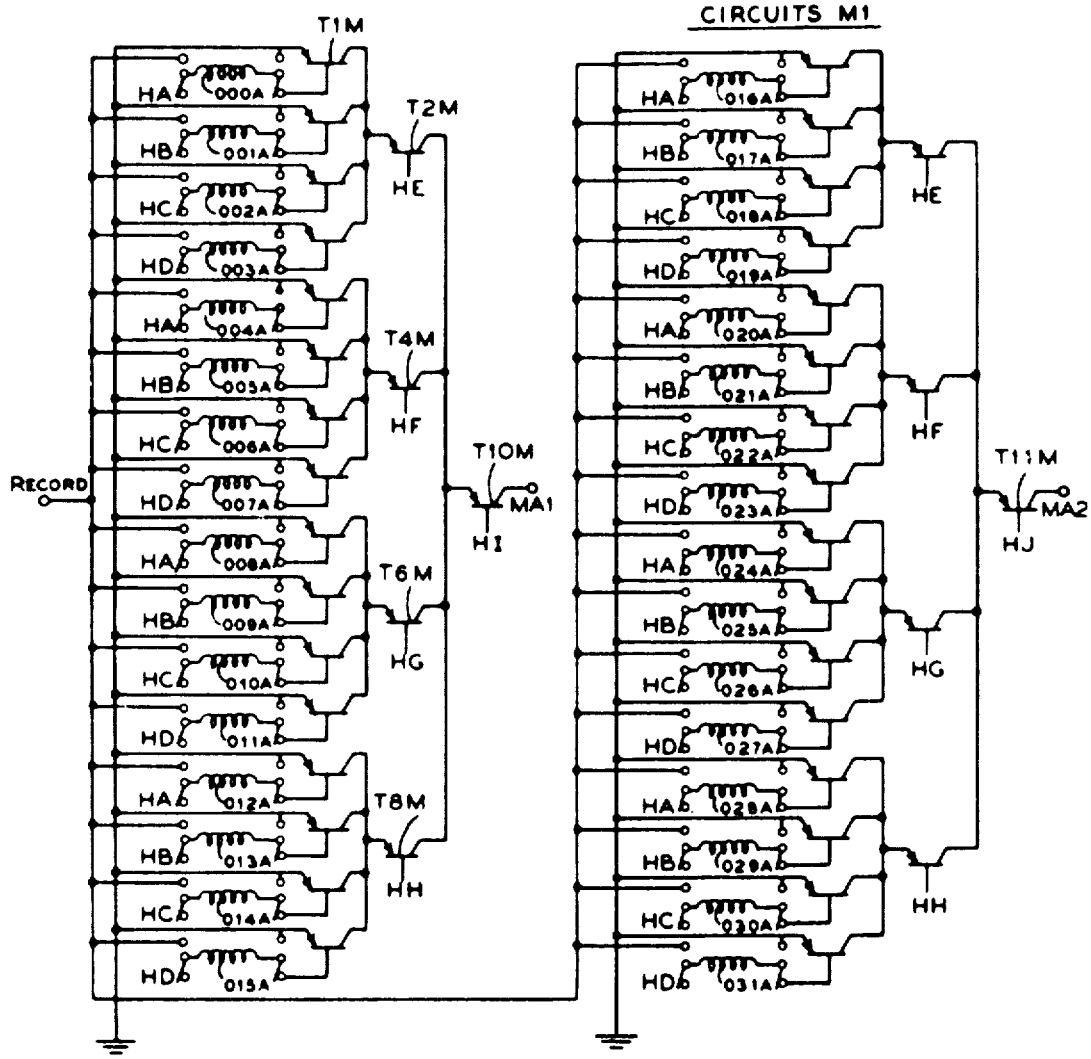
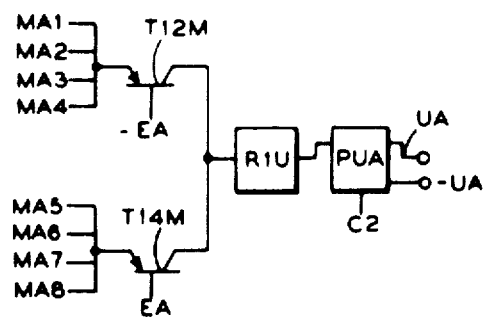
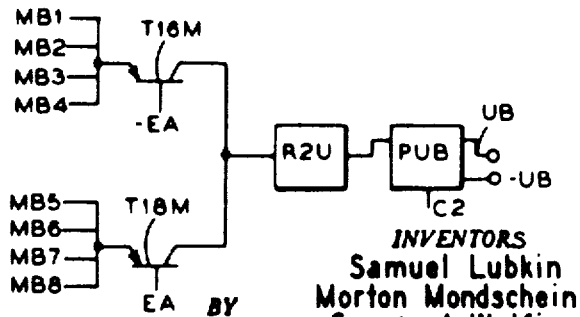
INVENTORS
Samuel Lubkin
Morton Mondschein
George A. Wulfing
ATTORNEY

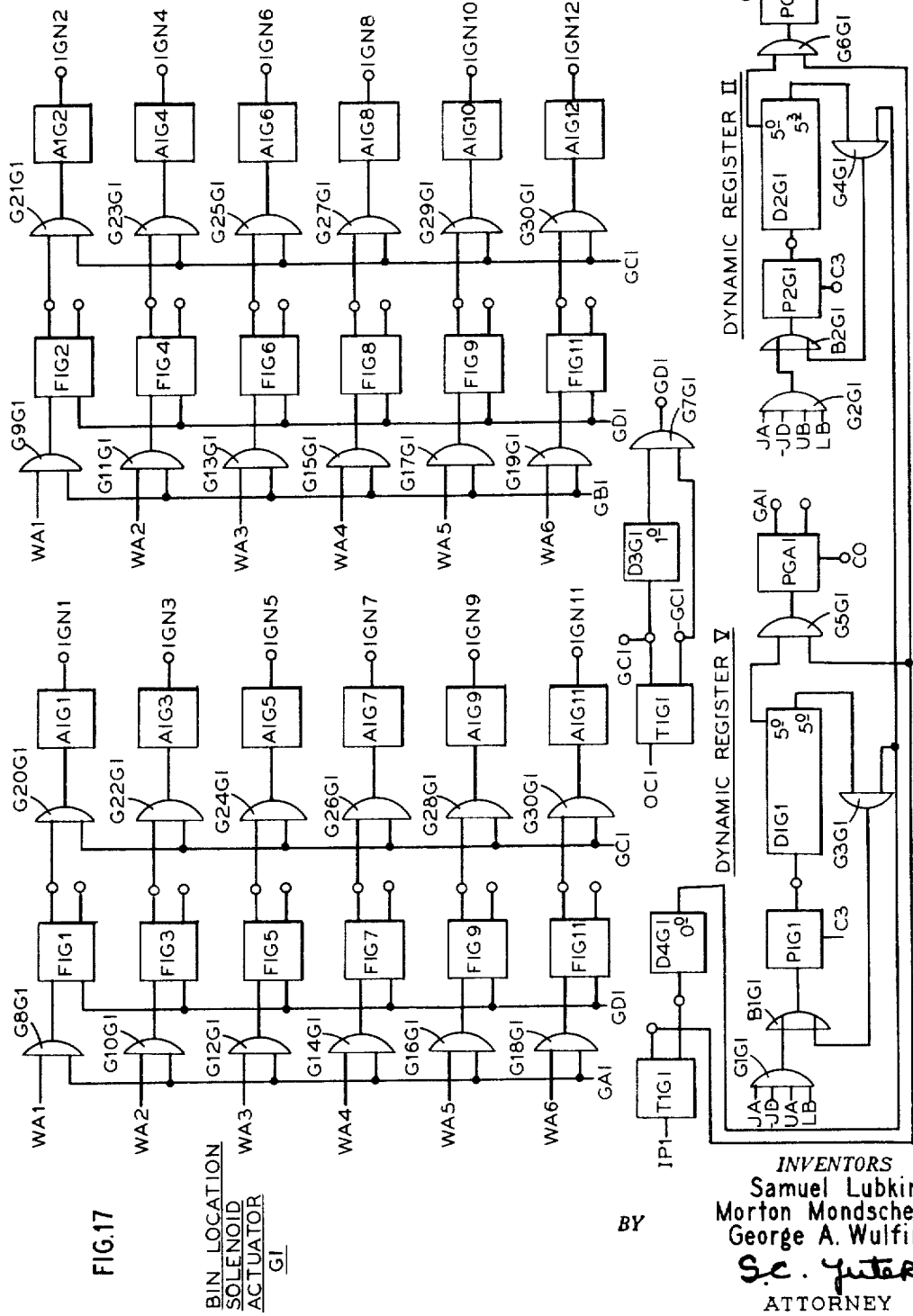

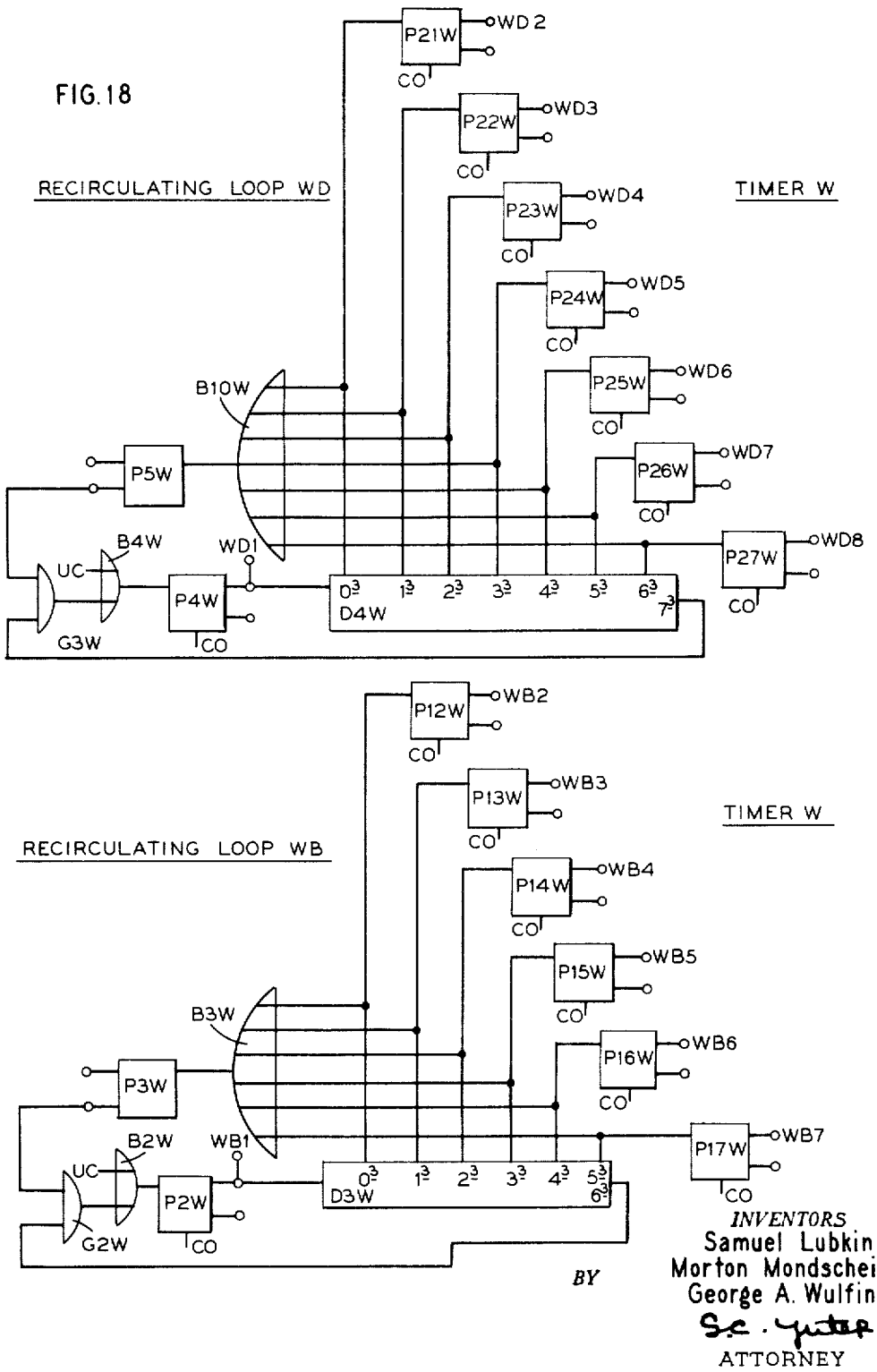

United States Patent Office 3,229,257
Patented Jan. 11, 1966

3,229,257
DATA PROCESSING APPARATUS
Samuel Lubkin, Bayside, and Morton Mondschein, Lynbrook, N.Y., and George A. Wulfing, Oradell, N.J., assignors to Curtiss-Wright Corporation, a corporation of Delaware
Filed Oct. 17, 1960, Ser. No. 63,008
16 Claims. (Cl. 340—172.5)

This invention relates to data processing and more particularly to record medium routing apparatus which senses indicia on a record medium and routes the record medium to a location associated with the sensed indicia.

A typical record medium routing operation is the sorting of mail. The sorting of mail as presently practiced in a typical large city post office is a highly complex operation involving very large numbers of letters. These letters must be sorted into groups representing geographic locations and placed in suitable containers for delivery to their ultimate addressees.

At the present time the actual work of sorting and preparing mail for delivery is performed manually and is subject to the physical and mental limitations of the individuals involved. As the memory and the physical reach of any one sorter is limited, the mail must be re-sorted through successive primary, secondary and supplementary stages. Most letters are sorted four to eleven successive times, depending on the size of the post office and the complexity of the routing.

For example, the Washington, D.C., post office performs two sorting operations that are related to outgoing and incoming mail. "Outgoing Mail," defined as all mail delivered to the post office, comprises a flow of letters in the order of 1,300,000 pieces of first class mail during an average weekday. Of these, approximately forty-five percent are destined for local delivery. This mass of some 585,000 pieces, together with all mail received from outside the postal area, a total of approximately 1,600,000 pieces, is defined as "Incoming Mail."

As a first step in automating the sorting operation, the address on a letter is converted to a representation which is capable of being sensed or read by a machine. Accordingly, all letters are imprinted with indicia by a manually-operated code imprinter upon receipt at a post office. The indicia may take many forms. For example, the back of the envelope may be imprinted with a dot code wherein each character of the street number, street name, street type, city section, city name and state are represented by coded combinations of dots. This dot coding step may be considered as the input operation of a data processing system.

The output operation of the system is mechanized by using conveyor belts having pockets which carry the letters over various bins which will receive the letters. However, there remains the very substantial problem of transcoding the information contained in a dot code on a letter to a routing signal which will insure that the letter whose dot code has been read is delivered to an appropriately assigned bin.

It is, accordingly, an object of the invention to provide apparatus for receiving coded combinations of indicia sensed from a record medium, such as a letter, and for routing the record medium to a location in accordance with the sensed indicia.

A more general object of the invention is to provide improved apparatus which, in response to signals representing a first set of data, produces signals representing a second set of data related to the first set of data.

Another object of the invention is to provide transcoding apparatus for use in combination with input apparatus which generates first coded combinations of signals in response to indicia on a record medium and with output apparatus which routes the record medium to one of a plurality of locations in response to a second coded combination of signals produced by the transcoding apparatus.

It is another object of the invention to provide improved apparatus for sorting record mediums such as post office letters or bank checks.

A specific embodiment of this general aspect of the invention is transcoding apparatus for use between letter sensing apparatus which senses address indicia on each letter to produce address signals and letter routing apparatus which in response to routing signals produced by the transcoding apparatus drops each letter into a specific bin corresponding to the route of a mailman who will deliver the letter. In the transcoding apparatus, storage means, a rotating magnetic storage drum, stores groups of signals magnetically, with each group having an address area portion and a bin portion. Each address area portion is converted to corresponding signals which are sequentially compared by comparing means with the address signals from the letter sensing apparatus. When the address signals fall within the corresponding address area portion, the associated bin portion of the stored data is converted by converting means to routing signals which direct the letter routing apparatus to drop the letter into the proper bin.

Of course, this aspect of the invention is not limited to mail sorting but is equally applicable to any record medium routing or data processing operation.

Briefly, in accordance with this general aspect of the invention, transcoding apparatus is provided for use with apparatus for converting indicia on a record medium to a first coded combination of signals and for routing the record medium to one of a plurality of locations in response to a second coded combination of signals. The transcoding apparatus includes storage means for storing a plurality of groups of indicia. Each of the groups of stored indicia has first and second portions. Converting means is provided for converting the first portions to third coded combinations of signals. Comparing means compares the first coded combinations of signals with the third coded combinations of signals. Other converting means converts the second portion of a group of the indicia to a second coded combination of signals when the comparing means indicates that a given relationship exists between the first coded combination of signals and the third coded combination of signals associated with the group.

Other objects, features and advantages of the invention will be apparent from the following detailed description when read with the accompanying drawings wherein:

FIGURE 1 is a block diagram of the overall system in accordance with the invention;

FIGURE 2 shows symbolic representations of the components combined to form the blocks of FIGURE 1. In particularly, FIGURE 2A symbolically shows a gate, FIGURE 2B is the symbolic representation of a buffer, FIG- URE 2C shows a flip flop in symbolic form, FIGURE 2D is the symbol of a pulse amplifier, FIGURE 2E shows symbolically a delay line, FIGURE 2F symbolically represents a toggle flop; a write amplifier is shown symbolically in FIGURE 2G, while FIGURE 2H shows the details of the write amplifier of FIGURE 2G; a read amplifier is represented symbolically in FIGURE 2H, and FIGURE 2J shows the symbol for an actuator;

FIGURE 3 shows the Magnetic Drum MD of FIGURE 1 with the surface of the magnetic drum divided into zones;

FIGURE 16 shows in more detail a typical Drum Reading Circuit M1 of FIGURE 1;

FIGURE 17 shows the details of a typical Bin Location Solenoid Actuator G1; and

FIGURE 18 shows in detail the remainder of the Timer W of FIGURE 1.

TABLE OF CONTENTS

Figure 2A:
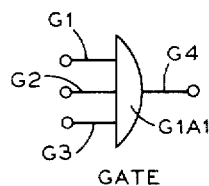

| | Fig. No. | Col. No. |
|---|---|---|
| Word Structure | ---- | 3 |
| Overall System Operation | 1 | 7 |
| Signal List | ---- | 12 |
| Components | 2 | 15 |
| Magnetic Drum MD | 3, 4, 5 | 18 |
| Timer W | 6, 18 | 21 |
| Input Synchronizers A1 to A6 | 7 | 24 |
| Buffer Registers F1 to F4 | 8 | 26 |
| Character Counter B | 9 | 27 |
| Input Control K | 10 | 31 |
| Buffer Register and Sorting Machine Selector V | 11 | 33 |
| Comparison Word Selector I | 12 | 37 |
| Comparison Word Registers C1 and C2 | 13 | 38 |
| The Comparator L | 14 | 42 |
| Channel Selector E | 15 | 46 |
| Drum Reading Circuits M | 16 | 49 |
| Bin Location Solenoid Actuators G1 to G6 | 17 | 51 |

WORD STRUCTURE

A letter word, that is, the address on an envelope, is represented by eighteen lines of coded combinations of dots that are printed in phosphorescent ink on the back of an envelope. Although phosphorescent ink is given as an example, it should be understood that other media such as magnetic ink are equally applicable. Each line comprises a coded combination of six dot positions. The presence or absence of a dot in each position represents a bit or binary digit. The presence of a dot indicates a binary one, and the absence of a dot indicates a binary zero. Since six binary digits can be combined in sixty-four different ways, it is readily apparent that each line of dots can easily represent all the conventional characters encountered in an address. In particular, it is seen that to represent all the letters of the alphabet plus the digits from zero to nine requires only thirty-six combinations.

Although it does not affect the operation, it is convenient to utilize codes for alphabetic characters, which when interpreted as six-bit binary numbers, are in the same order as the alphabet. In other words, alphabetic characters are arranged in groups or fields, and in each group a unit alphabetic increase is represented by a unit bit increase. Whenever, in this description, a comparison between alphabetic quantities is mentioned, this means a comparison between the binary numbers represented by the codings for the alphabetic quantities. For definiteness, the coding in the following table has been chosen from the many permissible for this application. These codes are written in order of decreasing significance for bits from left to right. As will be later noted, decimal digits are handled at many points in the apparatus as only four bits rather than six. In such cases, the four bits are obtained from the six listed in the table by deletion of the initial two zeros. The last three codes are used on the drum for special purposes as described hereinafter in greater detail.

TABLE I

| Character | Code | Binary Numerical Equivalent |
|---|---|---|
| 0 | 000011 | 3 |
| 1 | 000100 | 4 |
| 2 | 000101 | 5 |
| 3 | 000110 | 6 |
| 4 | 000111 | 7 |
| 5 | 001000 | 8 |
| 6 | 001001 | 9 |
| 7 | 001010 | 10 |
| 8 | 001011 | 11 |
| 9 | 001100 | 12 |
| A | 010100 | 20 |
| B | 010101 | 21 |
| C | 010110 | 22 |
| D | 010111 | 23 |
| E | 011000 | 24 |
| F | 011001 | 25 |
| G | 011010 | 26 |
| H | 011011 | 27 |
| I | 011100 | 28 |
| J | 100100 | 36 |
| K | 100101 | 37 |
| L | 100110 | 38 |
| M | 100111 | 39 |
| N | 101000 | 40 |
| O | 101001 | 41 |
| P | 101010 | 42 |
| Q | 101011 | 43 |
| R | 101100 | 44 |
| S | 110101 | 53 |
| T | 110110 | 54 |
| U | 110111 | 55 |
| V | 111000 | 56 |
| W | 111001 | 57 |
| X | 111010 | 58 |
| Y | 111011 | 59 |
| Z | 111100 | 60 |
| Equality Indicator | 001111 | 15 |
| End of Incoming Comparators | 011111 | 31 |
| End of Outgoing Comparators | 101111 | 47 |

The lines of dots are disposed on the envelope in the following order: The first six lines of dots represent the house number on a given street, referred to for brevity as street number, wherein the first line represents the most significant decimal digit of the street number, and the last line of dots represents the least significant demical digit of the street number. The next four lines of dots represent the street name, which may be of numeric type, as for example 52nd Street. Since only four characters are assigned to the street name, it will generally be abbreviated to fit the four assigned characters. The next line of dots represents the street type, that is, whether it is a street, an avenue, a boulevard, etc. The next line of dots represents a section of the city, for example, north, northwest, etc. The next four lines of dots represent the city name and the last two lines represent the state name. During an incoming pass, it is only necessary to read the first twelve lines of dots, that is, the lines comprising the street number, the street name, the street type, and the city section. On an outgoing pass, it is only necessary to read the last six lines, that is, the lines concerned with the city and state.

The lines are read in the order from street number to state by a photoelectric reader and are converted to electrical signals. If a dot is present, an electrical signal of one polarity is transmitted from the reader, whereas if a dot is not present an electrical signal of the opposite polarity is transmitted. Specifically, positive electrical signals or positive polarity pulses represent binary ones, and negative polarity electrical signals or negative polarity pulses represent binary zeros. Each line of dots, although read from the photoelectric reader in parallel, is converted into a series parallel array of six positive polarity signals representing the dots of a line.

In general, the pulses representing each character are stored in a pair of parallel groups. One group comprises the first, third and fifth bits (the odd bits) of the character, and the other group contains the second, fourth and sixth bits (the even bits), starting from the most significant bit of the character. The flow of the letter words throughout the transcoder will, in general, be through a pair of parallel paths. One of the paths will handle the odd bits of the letter word and is usually appended by a subscript A, whereas the other parallel path will handle the even bits of the characters of the letter word and will have a subscript B. Thus, for example, when a letter word is temporarily stored, it will be stored in a pair of twin or parallel registers, one of the registers storing the even bits of the character and the other register storing the odd bits of the character. In addition to this parallel handling of information, the information travels along the paths in serial form, that is, the odd bits in one path occur or pass one point in the path in a time-displaced order which is chosen to be from least significant bit first to most significant bit last.

The letter words are compared with permanently recorded drum words that are stored as patterns of magnetization on channels of the rotating magnetic drum MD. Each drum word (for an incoming pass) is divided into the following portions: a street number portion, a street name portion, a street type portion, a section of the city portion, and a bin number portion. The drum words associated with an outgoing pass are divided into a city portion, a state portion, and a bin number portion. For convenience, each of the sequences is taken to be in the order of increasing significance and, moreover, within each portion, the significance of characters is assumed to decrease from left to right when written in customary form. The street number portion of a typical incoming pass drum word is divided into three parts of three decimal digits each. The first three decimal digits constitute a lower bound for the three less significant decimal digits of the street number, the next three decimal digits an upper bound for these three less significant digits, and the third three decmal digits represent the three more significant decimal digits of the street number. It should be recalled that the street number of any letter word is represented by six digits which are divided into two groups: the three more significant digits and the three less significant digits. Each part is arranged with digits in the order of increasing significance. Each of the digits of the street number are represented by coded combination of four bits. Since the street number digits range from zero to nine, it is only necessary to use four binary digits (bits) to represent any of these decimal digits. The street name is represented by four characters of six bits each. The street type is represented by one six-bit character. The city section is represented by one six-bit character, and the bin number is represented by a coded combination of twelve bits, that is, a twelve-place binary number. This makes a total of eighty-four bits per drum word. Each drum word is recorded on a pair of twin registers, with one of the registers storing the odd bits of the characters and digits of the drum word and the other register storing the even bits of the drum word, each therefore being forty-two bits long.

The three decimal digits which define the lower bound of a street number in an incoming mail drum word represent the lower limit which the three less significant decimal digits of a letter word may have and be associated with a particular bin. The three decimal digits of the upper bound portion of the drum word represent the upper limit that the three less significant decimal digits of the letter word may have for it to be deposited in a particular bin. The three remaining digits of the street number of the drum word represent the three more significant digits of the street number of the letter word. Thus, it is seen, for a letter bearing a particular letter word to be stored in a certain bin number, it is necessary for the three more significant digits of the street number portion of the letter word to equal the three similar digits of the street number portion of the drum word and for the three less significant digits of the street number portion of the letter word to fall between the upper and lower bounds of the street number portion of the drum word.

In addition to satisfying this criteria, the street name portion of the drum word must equal the street name portion of the letter word. Similarly, the street type and city section characters of the drum word must equal the street type and city section characters of the letter word. Still a further requirement for the selection of a bin number is due to the fact that, in most localities, one side of a street has the odd numbers and the other side has the even numbers. Since opposite sides of a street may be served by different postmen, it is necessary to specify whether odd or even numbers or both are to go into a particular bin. For convenience in designating the particular condition, the lower and upper bounds are both made odd if only odd numbers are to be selected and are both made even if only even numbers are to be selected. The two bounds are made of different parity if it is desired to include both odd and even street numbers in the same bin. The rare case where both odd and even numbers go into the same bin, but the range of numbers to be handled in adjacent regions makes it impossible to designate lower and upper bounds of opposite parity, is handled by breaking the desired range into two portions (two drum words) with the same bin number. If all these conditions are satisfied, the twelve bits representing the bin number generate signals which cause the letter to be deposited in the bin represented by the bin number.

An outgoing drum word comprises four six-bit characters to represent the city, two six-bit characters to represent the state, and twelve bits to represent an appropriate bin number, a total of forty-eight bits. Again, as with an incoming pass drum word, the bits of the characters are divided into pairs of twin registers wherein one register of the pair stores the odd bits and the other register of the pair stores the even bits of the characters of the drum word, each thus containing twenty-four bits. Within the registers, the bits occur serially, from least significant to most significant bit. During an out-going pass, equality comparisons are performed between the characters representing the city in the drum word with the characters representing the city in the letter word. A similar equality comparison is performed for the state characters of both the drum and letter words. If the equality exists, electrical signals representing the bin number are generated to cause the letter to drop into the appropriate bin related to that bin number. At the end of drum words relating to a particular state, a drum word with a special character in the most significant position of the city name is added to designate a bin number into which the state "residue" letters are to go. These are letters directly to cities which are not of sufficient importance to be assigned an individual drum word.

OVERALL SYSTEM OPERATION

In describing FIGURE 1, several conventions have been observed: (1) Only positive signal lines have been shown, although in many cases the negative counterpart of the positive signal is also transmitted. Therefore, for example, the JD signal line is, in fact, a pair of signal lines, one carrying the JD signal and the other the —JD signal. (2) Many signal lines should be considered as cables carrying a plurality of signal leads which branch out to the particular elements. For example, there is a line leaving Character Counter B labeled BA, BB, BC, BD, BE which is a cable of five leads which branch out to feed separate Input Synchronizers A1 to A6. (3) Arrowheads on lines indicate direction of signal flow wherein single arrowheads indicate control signals and double arrowheads indicate information signals.

Referring to FIGURE 1, the Transcoder T is shown servicing six Sorting Machines. Each Sorting Machine includes, by way of example, a Photoelectric Reader PR which converts phosphorescent ink dot code of the letter word to electrical signals. It should be noted, however, that the dot code could be in magnetizable ink and the readers of the magnetic type may be employed. A typical Photoelectric Reader PR1 serially reads the eighteen characters of a letter being processed by Sorting Machine 1. As each character is read the Photoelectric Reader PR1 transmits in parallel a coded combination of 1IN1 to 1IN6 signals and a sprocket signal SP1. After all eighteen characters are read, the Photoelectric Reader PR1 transmits an IP1 signal. The remainder of a Sorting Machine includes a plurality of conveyor pockets which accept the letters after they have been read by a Photoelectric Reader PR. Each pocket accepts one letter at a time from a Photolectric Reader PR. Incorporated in each pocket are a plurality of twelve code wheels; each code wheel is individually movable laterally on a common shaft to one of two positions. Thus, the code wheels may be binarily coded into 4,096 different combinations. When a conveyor pocket is in position for code wheel movement, it transmits an OC signal to its associated bin location solenoid actuator in the group G1 to G6. The conveyor pockets move along a track above a plurality of bins. During the conveyor pocket movement, the code wheels roll over sets of recessed slots placed opposite each bin. When a set of code wheels conforms to the mating configuration of the recessed slots the code wheels drop into the recessed slots causing the opening of a trap door in the conveyor pocket which allows the enclosed envelope to fall into a bin. Each bin has a different coded combination of recessed slots. Therefore, it is also possible to uniquely determine 4,096 different bins for each Sorting Machine.

The six Sorting Machines operate in "parallel"; each supplies up to 4,096 individual bins, but the total number of destinations is not six times 4,096, but merely one times 4,096. In other words, for each bin associated with one machine, there will be a corresponding bin associated with each of the other machines, and the six corresponding bins constitute a common destination. Each bin is subject to handling by one postman. For incoming mail, a bin may represent a city block or a single large receiver, or more generally, one postman's route.

The function of the Transcoder T is to accept the eighteen character or line, one hundred and eight bit electrical signals from the Photoelectric Readers of each of the Sorting Machines and to convert or transcode these electrical signals into a coded combination of twelve electrical one bit signals that energize solenoids via the actuators G1 to G6 which laterally move the code wheels of the associated conveyor pocket so that the envelope may be deposited in the appropriate bin of the associated Sorting Machine.

The Transcoder T includes six Input Synchronizers A1 to A6 which respectively receive coded combinations of electrical signals from the Photoelectric Readers PR1 to PR6. For example, the Input Synchronizer A1 receives a coded combination of six one bit electrical signals via the 1IN1 to 1IN6 signal lines from the Photoelectric Reader PR1 under the control of a sprocket signal which is transmitted via the SP1 signal line. The coded combination of these six electrical signals represents one character of the dot code read by the Photoelectric Reader PR1. The Input Synchronizer A1 accepts these bits in parallel and converts the parallel array into two serial arrays of three bits each. The first serial array comprises the odd bits of the character and the second serial array comprises the even bits of the character. When the six bits of the character have been so assembled, an AD1 signal is transmitted to the Input Control K, indicating that the Input Synchronizer A1 is ready to transfer the character now repersented by two three-bit serial arrays to the Buffer Registers F1 and F2 as the AA1 and AB1 signals. When the actual transmission occurs, Input Synchronizer A1 also transmits to the Buffer Registers F1 and F2 AC1 signals that clear out a previously stored character. The Input Synchronizers A2 to A6 service the Photoelectric Readers PR2 to PR6 in a similar manner.

The Buffer Registers F1 to F4 are parallel recirculating registers each comprising three serial subregisters. One pair of subregisters is assigned to each of the Input Synchronizers A1 to A6 for temporarily storing twelve characters. In particular, a first subregister of Buffer Register F1 and a parallel first subregister of Buffer Register F2 is assigned to Input Synchronizer A1. The first subregister of Buffer Register F1 receives the odd bits of the characters transferred from Input Synchronizer A1 as the AA1 signals and the parallel first subregister of Buffer Register F2 receives the even bits of the characters transferred from Input Synchronizer A1 as the AB1 signals. Similarly, a second subregister of Buffer Register F1 and the parallel subregister of Buffer Register F2 respectively receive the odd and even bits of the characters transferred from Input Synchronizer A2, and a third subregister of Buffer Register F1 and the parallel third subregister of Buffer Register F2 receive respectively the odd and even bits transferred from the Input Synchronizer A3. The Buffer Register F3 and F4 are similarly divided into subregisters which accept bits from the Input Synchronizers A4 to A6.

A typical Buffer Register F1 transmits signals via the FW1 signal line to the magnetic recording head MD4A. The signals are recorded on channel MD4 of Magnetic Drum MD and are read approximately one word time later by magnetic reading head MD4B. The reproduced signals are transmitted back via the FR1 signal line to the Buffer Register F1 for retransmission via the FW1 signal line. In this manner the characters are stored in a recirculating register. The output of the Buffer Register F1 is the FA signal line.

The Buffer Registers F2 to F4 are similar having respectively the channels MD5, MD6 and MD7 in their recirculation paths and having as respective outputs the FB, FC and FD signal lines.

Since the Photoelectric Readers PR1 to PR6 asynchronously transmit characters respectively to the Input Synchronizers A1 to A6, it is necessary to establish a scheduling of the transfer of characters from the Input Synchronizers A1 to A6 to the Buffer Registers F1 to F4 wherein the characters are assembled into serial words. This scheduling procedure is performed by the Character Counter B in cooperation with the Input Control K. For example, the Input Control K and the Character Counter B cooperate to first permit the transfer of a character, if available, from the Input Synchronizer A1 to the Buffer Registers F1 and F2, then the transfer of a character, if available, from the Input Synchronizer A2 to the Buffer Registers F1 and F2 and finally the transfer of a character, if available, from the Input Synchronizer A3 to the Buffer Registers F1 and F2. A similar sequential schedule is provided for the Input Synchronizers A4, A5 and A6 in their transfer of characters to the Buffer Registers F3 and F4.

More particularly, the Character Counter B serially generates the BA, BB and BC signals which are respectively transmitted to the Input Synchronizers A1 and A4, Input Synchronizers A2 and A5, and Input Synchronizers A3 and A6. During the time of occurrence of the BA signals, the first subregisters of the Buffer Registers F1 to F4 are in position to receive characters. The presence of the BB signals indicates the availability of the second subregisters to accept characters and the occurrence of the BC signals denote the availability of the third subregisters of the Buffer Registers F1 to F4. After initial synchronization by the UC signal, a once per magnetic drum revolution signal from the Timer W, the BA, BB, BC signals are sequentially generated by a three stage ring counter. Each signal has a duration of forty-two pulse times.

Character Counter B, in addition to generating the BA, BB and BC signals that indicate which subregisters are available to receive characters also controls the positioning of the characters within the subregisters and further indicates when any subregister is completely loaded. To perform these functions Character Counter B includes a recirculation register having three subsections that operates synchronously with the Buffer Registers F1 to F4.

In particular, the character positions of the first subsection recirculate in parallel with the character positions of the first subregisters of Buffer Registers F1 to F4, the character positions of the second subsection recirculate in parallel with character positions of the second subregisters of Buffer Registers F1 to F4, and the character positions of the third subsection recirculate in parallel with character positions of the third subregisters of Buffer Registers F1 to F4.

It should be noted that each character position of either a subsection or a subregister comprises three bit positions. A bit stored in a particular one of the three bit positions of a given character position of a subsection controls the positioning of a character into like-ordered character positions of a pair of subregisters slated next to receive such character. More particularly, a bit in the first bit position of a character position of the first subsection controls the positioning of a character in the first pair of subregisters of Buffer Registers F1 and F2, i.e. the loading of characters transferred from Input Synchronizer A1. A bit in the second bit position of a character position of the first subsection controls the positioning of a character in the first pair of subregisters of Buffer Registers F3 and F4, i.e. the loading of characters transferred from Input Synchronizer A4. Similar bits in the second and third subsections similarly control the positioning of characters in the other pairs of subregisters.

Now, if for each time that a character is transferred to a subregister from an input synchronizer the associated bit is shifted three bit positions in its subsection, it is seen that the next character position in the pair of associated subregisters is designated to receive the next character to be transferred.

Therefore, initially, KB pulse signals from the input control K are inserted in the first and second bit positions of each of the first character positions of each character counter subsection. These pulses upon transmission through the character counter B circulate in the recirculation register which includes the BW signal line, the magnetic writing head MD2, the channel MD1 of Magnetic Drum MD, the magnetic reading head MD3 and the BR signal ine back to the character counter B. Once per drum cycle the pulses are transmitted from the character counter B to the Input Synchronizers A1 to A3 as the BD signals (these are in the first bit positions) and to the Input Synchronizers A4 to A6 as the BE signals (these are in the second bit positions). During the coincidence of the BD signal with the BA, BB, or BC signals at a periodically recurring sampling time, a character if available will be transferred from the Input Synchronizer A1, A2 or A3 to respectively the first, second or third pair of subregisters of the Buffer Registers F1 and F2 along with the respective transmission of an AD1, AD2 or AD3 signal to the Input Control K. Similarly, during the coincidence of the BE signal with the BA, BB or BC signals at a periodically recurring sampling time, a character if available will be transferred from the Input Snychronizers A4, A5 or A6 to respectively the first, second or third pair of subregisters of the Buffer Registers 3 and 4 along with the respective transmission of an AD4, AD5 or AD6 signal to the Input Control K. The Input Control K upon receipt of an AD signal generates under the control of the BA, BB and BC signals a KC signal which causes a three bit position shifting of the pulse that caused the character transfer. Therefore, the next character position of the pair of subregisters that has just received the character is assigned to receive the next character that will be transferred also to that pair of subregisters.

Now, in general, after a pulse has been shifted twelve times and prior to the thirteenth possible shift, i.e. after twelve characters have been loaded into a pair of subregisters, the subregister is completely loaded and ready for transfer. There is an exception to this action which is hereinafter described in the section concerning the Character Counter B. At this time, a BF signal occurring at a predetermined time is transferred from the character counter B to Buffer Register and Sorting Machine Selector V to indicate that the contents of a particular pair of subregisters are available for transfer to the Comparison Word Registers C1 and C2 via Comparison Word Selector I.

It should be noted that it is now necessary to transfer the pulse from the twelfth character position back to the first character position of the subsection involved. First, the associated Photoelectric Reader PR after reading the last character transmits an IP signal to Input Control K which generates a KC signal that causes the clearing of the pulse from the twelfth character position. Second, during the transfer of the letter word, Buffer Register and Sorting Machine Selector V, as hereinafter more fully described, transmits a VC signal to Input Control K which generates an appropriately timed KB pulse that is transferred via the KB signal line to Character Counter B and inserted into the proper bit position of the first character position of the subsection involved.

The Buffer Register and Sorting Machine Selector V controls the transfer of the contents of the pairs of subregisters of the Buffer Registers F1 to F4 to the Comparison Word Registers C1 and C2. Since the pairs of subregisters are asynchronously loaded, it is necessary to systematically check to determine which pairs of subregisters are completely loaded and to sequentially permit the transfer of completely loaded pairs to the Comparison Word Registers C1 and C2.

Briefly, the Buffer Register and Sorting Machine Selector V includes a six state counting circuit which continuously cycles through the states. One state is assigned to each pair of subregisters and impliedly to the associated Input Synchronizers A1 to A6 and associated Bin Location Solenoid Actuators G1 to G6. It should be noted that within the Transcoder T there is assigned to each Sorting Machine and its Photoelectric Reader PR and Input Synchronizer A, a pair of subregisters of the Buffer Registers F and a Bin Location Solenoid Actuator G. The six state counting circuit generates JA, JB, JC and JD signals. A unique combination of these signals is generated during each state, and each unique combination is assigned to one Sorting Machine.

During operation, the contents of the pair of subregisters associated with Sorting Machine 1 are tested. If this pair of subregisters is completely loaded, a transfer of the contents is performed followed by a comparison cycle.

At the end of the comparison cycle, the contents of the pair of subregisters associated with Sorting Machine 2 are tested. If, however, the pair of subregisters associated with Sorting Machine 1 is not completely loaded then there is no transfer and no comparison cycle, but there is a test of the pair of subregisters associated with Sorting Machine 2. Similar tests are sequentially performed for the pairs of subregisters of the remaining Sorting Machines 3 to 6 followed by another cycle of tests.

The BA, BB and BC signals from Character Counter B cooperate with the JA, JB, JC and JD signals within the Buffer Register and Sorting Machine Selector V to test for the presence of BF signals from Character Counter B at particular times to determine whether pairs of subregisters are loaded. If a BF signal occurs at one of these particular times, it is known that a particular pair of subregisters is loaded and the VC and VD signals are generated. The VC signal is transmitted to the Comparison Word Selector I to cause the transfer of the characters of the loaded pair of subregisters from the Buffer Registers F1 to F4 via the FA and FB signal lines or the FC and FD through the Comparison Word Selector I and via the IA and IB signal lines to the Comparison Word Registers C1 and C2. The JD signal received by the Comparison Word Selector I chooses either the FA and FB signal lines or the FC and FD signal lines. The VD signal is transmitted to the Comparison Word Registers C1 and C2 to prepare them to receive the characters. The assembly of the characters in the proper order of significance, as well as the duplication required of certain characters during incoming passes, is performed by a predetermined cycle of transmission of the IC, ID and XA to XH signals from the Comparison Word Selector I to the Comparison Word Registers C1 and C2. At the same time, the VC and VD signals are respectively transmitted to the Input Control K and Character Counter B so that the subsection of the Character Counter B which transmitted the properly timed BF signal may be cleared back to its initial state.

Some time after the transfer has been effected, Timer W transmits a UC pulse signal to Buffer Register and Sorting Machine Selector V which in turn transmits a VA signal to the Comparator L to permit comparisons to be performed. The UC signal occurs once a drum revolution to time the start of a comparison cycle. The UC signal is also transmitted to Channel Selector E to initiate the operator of timing circuits therein.

At this point, a letter word read from the Photoelectric Reader of a particular Sorting Machine is stored in the Comparison Word Registers C1 and C2 and by virtue of the unique combination of JA to JD signals being transmitted, the Bin Location Solenoid Actuator G of this particular Sorting Machine is primed to receive bin number signals. A comparison cycle starts.

During the comparison cycle, the letter word stored in the Comparison Word Registers C1 and C2 is compared against drum words stored in a particular order on a plurality of pairs of channels of Magnetic Drum MD. The drum words are divided into two parts, an address part for comparison with letter words and a bin number part for routing letters to the appropriate bins. The pairs channels are divided into sectors assigned to incoming and outgoing passes. Special coded characters indicate the transition between the drum words of incoming and outgoing passes.

During the comparison cycle, the letter word stored in the Comparison Word Registers C1 and C2 is periodically transmitted to one input of the Comparator L via the CA1 and CA2 signal lines. At the same time, the drum words stored on the magnetic drum MD are transferred via the Drum Reading Circuits M as the UA and UB signals to the Comparator L. A first series of comparisons are performed to locate the particular channel on the Magnetic Drum MD which stores the drum word which will lead to a successful comparison. The results of this first series of comparisons cause the generation of LA signals which are transmitted from the Comparator L to the Channel Selector E. The Channel Selector E, in response to the LA signals, transmits the EA and HA to HL, signals to the Drum Reading Circuits M. Combinations of these signals locate the channel which contains the desired drum word. The channel is then read and the successive drum words on the channel are again transferred as the UA and UB signals to the Comparator L, and a second series of comparisons are performed.

The drum word is compared against the letter word stored in the Comparison Word Registers C1 and C2. If an outgoing pass is in progress, the test will be for equality of the two words. When the equality is determined, the Comparator L generates an LB signal indicating a successful comparison. Similarly, if the comparisons are being performed on an incoming pass, when the letter word falls within the bounds of the drum word, and certain parity conditions are satisfied, a successful comparison is performed and the LB signal is also generated. The LB signal is transmitted to the Buffer Register and Sorting Machine Selector V and the Bin Location Solenoid Actuators G1 to G6.

The LB signal when received by the Buffer Register and Sorting Machine Selector V causes the termination of the VA signal and prevents further comparisons by the Comparator L.

It will be recalled that the Buffer Register and Sorting Machine Selector V is generating the unique combination JA, JB, JC and JD signals related to the Sorting Machine whose letter word is being compared and therefore, the Bin Location Solenoid Actuator G associated with this Sorting Machine is primed to receive the coded combination of signals representing the bin number.

For example, assume that the Photoelectric Reader PR1 associated with Sorting Machine 1 transmitted the letter word under consideration, the JA signal is transmitted from the Buffer Register and Sorting Machine Selector V to the Bin Location Solenoid Actuator G1. The coincidence of the JA signal and the LB signal from the Comparator L causes the transfer of the coded combination of signals representing the bin number as the UA and UB signals from the Drum Reading Circuits M to the Bin Location Solenoid Actuators G1. This coded combination of signals is received by the Bin Location Solenoid Actuator G1 and temporarily stored. Some time after the temporary storage has been effected, Buffer Register and Sorting Machine Selector V transmits a VB signal to Channel Selectors E so that they are returned to their rest state.

When the conveyor pocket has received the letter from the Photoelectric Reader PR1 and is in a proper position, the Sorting Machine 1 transmits an OC1 signal which causes the stored signals to generate a combination of AGN1 to AGN12 signals for energizing solenoids in the Sorting Machine 1. The energization of these solenoids causes lateral movement of the code wheels on the conveyor pocket which has received the letter whose coded combination of dots was read by the Photoelectric Reader PR1. With the code wheels set in the coded combination, the conveyor pocket then travels over the bins until the appropriate bin is found, causing the letter to drop into the desired bin.

SIGNAL LIST

The following list shows those signals which are transferred between the various units of the transcoder. In general, each signal has a negative counterpart, i.e. although only an EA signal is listed there is also a minus EA signal. The signal and its negative counterpart are simultaneously present or absent. Signals when present have a positive potential and when absent have a negative potential. The negative counterparts are directly opposite, i.e. when present they are negative and when absent they are positive.

| Signal | Source | Function | Where Used |
|---|---|---|---|
| AA1 | Input Synchronizer A1 | Three odd bits of character being transferred from Input Synchronizer A1 to Buffer Register F1. | Buffer Registers F. |
| AA2 to AA6 | Input Synchronizers A2 to A6 | Similar to above. | Do. |
| AB1 | Input Synchronizer A1 | Three even bits of character being transferred from Input Synchronizer A1 to Buffer Register F2. | Do. |
| AB2 to AB6 | Input Synchronizers A2 to A6 | Similar to above. | Do. |
| AC1 | Input Synchronizer A1 | Three pulse time signal for clearing out three bit positions in Buffer Registers F1 and F2. | Do. |
| AC2 to AC6 | Input Synchronizers A2 to A6 | Similar to above. | Do. |
| AD1 | Input Synchronizer A1 | Signal indicating a digit is stored in Input Synchronizer A1 awaiting transfer to Buffer Register F1. | Input Control K. |
| AD2 to AD6 | Input Synchronizers A2 to A6 | Similar to above. | Do. |
| BA | Character Counter B | Gate associated with availability of subregisters associated with Input Synchronizers A1 and A4. | Input Synchronizers A1 and A4; Input Control K; Buffer Register and Sorting Machine Selector V. |
| BB | Character Counter B | Gate associated with availability of subregisters associated with Input Synchronizers A2 and A5. | Input Synchronizers A2 and A5; Input Control K; Buffer Register and Sorting Machine Selector V. |
| BC | ----do---- | Gate associated with availability of subregisters associated with Input Synchronizers A3 and A6. | Input Synchronizers A3 and A6; Input Control K; Buffer Register and Sorting Machine Selector V. |
| BD | ----do---- | Pulse associated with availability of appropriate digit position in subregisters associated with Input Synchronizers A1, A2 and A3. | Input Synchronizers A1 to A3. |
| BE | ----do---- | Pulse associated with availability of appropriate digit position in subregisters associated with Input Synchronizers A4, A5, A6. | Input Synchronizers A4 to A6. |
| BF | ----do---- | Pulse indicating that a subregister is fully loaded. | Buffer Register and Sorting Machine Selector V. |
| CA1 | Comparison Word Register C1 | Odd bits of letter word to be compared with drum words. | Comparator L. |
| CA2 | Comparison Word Register C2 | Even bits of letter word to be compared with drum words. | Do. |
| EA | Channel Selector E | Signal indicating which half of channels contains desired drum word. | Drum Reading Circuits M. |
| FA | Buffer Register F1 | Information signal output of Buffer Register F1. | Comparison Word Selector I. |
| FB | Buffer Register F2 | Information signal output of Buffer Register F2. | Do. |
| FC | Buffer Register F3 | Information signal output of Buffer Register F3. | Do. |
| FD | Buffer Register F4 | Information signal output of Buffer Register F4. | Do. |
| 1GN1 to 1GN12 | Bin Location Solenoid Actuator G1. | Coded Combination of signals to position wheels for tripping. | Sorting Machine 1. |
| 2GN1 to 2GN12 | Bin Location Solenoid Actuator G2. | Same as above. | Sorting Machine 2. |
| 6GN1 to 6GN12 | Bin Location Solenoid Actuator G6. | Same as above. | Sorting Machine 6. |
| HA to HL | Channel Selector E | Signals used to select appropriate channel of magnetic drum. | Drum Reading Circuits M1 to M8. |
| IA | Comparison Word Selector I | Odd bits of word being transferred from subregisters of Buffer Register F1 or F3 via Comparison Word Selector I. | Comparison Word Register C1. |
| IB | ----do---- | Even bits of word being transferred from subregisters of Buffer Register F2 or F4 via Comparison Word Selector I. | Comparison Word Register C2. |
| IC and ID | ----do---- | Signals controlling output points of Storage Units in Comparison Word Registers C1 and C2 during an incoming pass. | Comparison Word Registers C1 and C2. |
| 1IN1 to 6IN6 | Photoelectric Readers of Sorting Machines 1 to 6. | Character Code Pulses. | Input Sychronizers A1 to A6. |
| IN | Comparison Word Selector I | Incoming Pass in progress. | Timer W; Comparison Word Registers C1 and C2; Comparator L, Channel Selector E; Buffer Storage and Sorting Machine Selector V. |
| IP1 to IP6 | Photoelectric Readers of Sorting Machines. | Indicates that all data has been read from envelope. | Bin Location Solenoid Actuators G1 to G6; Input Synchronizers A1 to A6; Input Control K. |
| JA | Buffer Register and Sorting Machine Selector V. | Signifies Sorting Machines 1 and 4. | Bin Location Solenoid Actuators G1 and G4. |
| JB | ----do---- | Signifies Sorting Machines 2 and 5. | Bin Location Solenoid Actuators G2 and G5. |
| JC | ----do---- | Signifies Sorting Machines 3 and 6. | Bin Location Solenoid Actuators G3 and G6. |

| Signal | Source | Function | Where Used |
| --- | --- | --- | --- |
| JD | Buffer Register and Sorting Machine Selector V. | Separates Sorting Machines 1, 2 and 3 from Sorting Machines 4, 5 and 6. | Bin Location Solenoid Actuators G1 to G6; Comparison Word Selector I; Input Control K. |
| KA | Input Control K | Pulse indicating a character has been loaded into one of the Input Synchronizers A1–A6 and the associated subregister is available. | Character Counter B. |
| KB | ____do____ | Pulses to be stored in Character Counter B or various stages. | Do. |
| KC | ____do____ | Pulses indicating that last character has been read into Input Synchronizers corresponding to available subregisters. | Do. |
| LA | Comparator L | Signal indicating letter word greater than key word. | Channel Selector E. |
| LB | ____do____ | Signal indicating successful comparison. | Bin Location Solenoid Actuators G1 to G6; Buffer Registers and Sorting Machine Selector V. |
| OUT | Comparison Word Selector I | Indicates outgoing pass in progress. | Timer W; Comparison Word Registers C1 and C2; Comparator L; Channel Selector E; Buffer Register and Sorting Machine Selector V. |
| OC1 to OC6 | Sorting Machines 1 to 6 | Indicates proper time for operation of solenoids to set up bin number key on letter pocket. | Bin Location Solenoid Actuators G1 to G6. |
| SP1 to SP6 | Photoelectric Readers of Sorting Machines 1 to 6. | Sprocket Pulse. | Input Synchronizers A1 to A6. |
| UA | Drum Word Reading Circuits M. | Odd bits of drum words. | Bin Location Solenoid Actuators G1 to G6; Comparator L; Buffer Register and Sorting Machine Selector V. |
| UB | ____do____ | Even bits of drum words. | Do. |
| UC | Timer W | Indicates start of comparison cycle. | Channel Selector E; Character Counter B. |
| VA | Buffer Register and Sorting Machine Selector V. | Indicates that a new word was entered into the Comparison Word Registers C1 and C2 before the start of a comparison cycle. | Buffer Register and Sorting Machine Selector V; Comparator L. |
| VB | ____do____ | Indicates an end of comparison character has been read. | Channel Selector E. |
| VC | ____do____ | Indicates that transfer from subregisters of Buffer Registers F1 to F4 into Comparison Word Registers C1 and C2 is under way. | Input Control K; Comparison Word Selector I. |
| VD | ____do____ | Indicates beginning of transfer from Buffer Registers F1 to F4 into Comparison Word Registers C1 and C2. | Comparison Word Registers C1 and C2; Character Counter B. |
| XA to XH | Comparison World Selector I | Sequential signals to cause proper loading of Comparison Word Registers C1 and C2. | Comparison Word Registers C1 and C2. |

Since the timing signals from Timer W are so widely used throughout the system they have not been incorporated in this list, but their significance is readily understood by reading the section concerning the Timer W.

COMPONENTS (FIG. 2)

The entire transcoder is assembled from several basic components which are repeated in many combinations. Since these components are standard devices in the digital computer art, their symbolic representations will be used throughout the discussion and their logical operation will now be described.

FIGURE 2A shows a typical gate G1A1. Gate G1A1 is an "and" circuit, commonly comprising crystal diodes, having input terminals G1, G2, and G3 and an output terminal G4. Gate G1A1 has the property that the potential at the output terminal G4 has a value equal to the least positive potential at any one of the input terminals G1, G2, and G3. Thus, assuming signals standardized at fixed positive and negative levels, for the potential at the output terminal G4 to be a positive value, the potentials at the input terminals G1, G2, and G3 must all have positive values. The number of inputs is not restricted to three, but may be two, four, or more. A typical diode "and" circuit may be found on page 398 of the book entitled "Pulse and Digital Circuits," written by Millman and Taub, published by the McGraw-Hill Book Company in 1956. It should be noted that all gates throughout the system are prefaced by a reference character G.

Figure 2B:
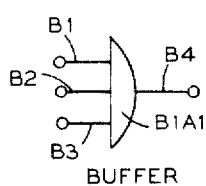

FIGURE 2B shows the typical buffer B1A1 having input terminals B1, B2, and B3 and an output terminal B4. The buffer B1A1 has the property that the potential at the output terminal B4 is substantially equal to the most positive potential at any any one of the input terminals B1, B2, and B3. The buffer B1A1 is a diode "or" circuit which may be found on page 38 of the book entitled "Digital Computer Components and Circuits," by R. K. Richards, published by the Van Nostrand Company, Inc., in 1957. Although buffer B1A1 shows three input terminals, it may have two, four, or more. It should be noted that all buffers throughout the system have reference characters preceded by a B.

Figure 2C:
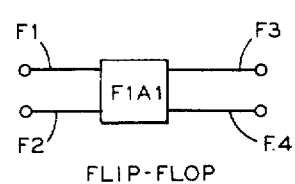

FIGURE 2C shows a typical flip-flop F1A1. Flip-flop F1A1 is a bistable circuit which may be a conventional bistable multivibrator employing transistors. In a first stable state, the "set" state, the output terminal F3 of the flip-flop F1A1 is at a positive potential and the output terminal F4 is at a negative potential. In the second stable state, the "reset" state, the potentials at the output terminals interchange; that is, the output terminal F3 is at a negative potential, and the output terminal F4 is at a positive potential. The stable states of the flip-flop F1A1 are controlled by positive pulses or signals received by the input terminals F1 and F2. The input terminal F1, the set terminal, will trigger the flip-flop F1A1 into the first stable or "set" state, when pulsed positively. A positive pulse received at the input terminal F2 will trigger the flip-flop to the "reset" or second stable state. All flip-flops throughout the system will have a reference character starting with the letter F.

Figure 2D:
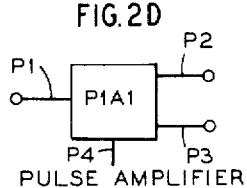

FIGURE 2D shows a typical pulse amplifier P1A1. When the pulse amplifier P1A1 receives a positive going pulse at its input terminal P1, it transmits a positive pulse from the output terminal P2 and a corresponding negative pulse from the output terminal P3. The pulse amplifier P1A1 is a reshaping amplifier, that is, the output pulses are basically replicas of clock pulses received at a clocking input terminal P4. Thus, the pulse amplifier P1A1 can receive a misshapen and poorly timed pulse at the input terminal P1 and, provided a portion of it coincides with the leading edge of the clock pulse received at the clocking terminal P4, it will transmit a replica of this clock pulse in two phases from the output terminals P2 and P3. Such amplifiers are well known in the digital computer art, and typical circuits may be found in section 13–8 entitled "Regenerative Broadening" on page 409 of the previously cited book "Pulse and Digital Circuits." All pulse amplifiers throughout the system have reference numerals starting with the letter P.

Figure 2E:
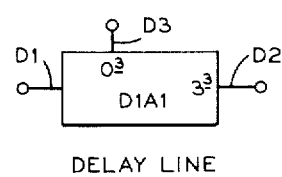

FIGURE 2E shows a typical delay line D1A1. Signals received at the input terminal D1 are transmitted from the output terminal D2 a predetermined time later. This may be of lumped-parameter type as described in Chapter 10 of the book entitled "Pulse and Digital Circuits" previously referred to. The delay of the delay line is reckoned in pulse times or clock pulse periods, and the overall delay is indicated by the number adjacent to the output terminal D2. For example, the number $3^3$ indicates that the overall delay from the input terminal D1 to the output terminal D2 is three and three-quarters pulse times or clock pulse periods. In addition, the delay line D1A1 has a tap D3. Thus, signals received by the input terminal D1, in addition to being transmitted from the output terminal D2, are also transmitted from the tap D3. The tap transmits signals that are delayed less than the overall delay of the line. The number opposite the tap indicates the delay from the input terminal D1 to the tap D3. For example, for the delay line D1A1, this number is $0^3$, indicating that a signal received by the input terminal D1 will be transmitted from the tap D3 three-quarters of a pulse time or clock pulse period later. It should be noted that all delay lines are preceeded by a reference charcter D.

Figure 2F:
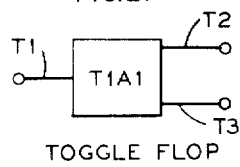

FIGURE 2F shows a typical "toggle" flop T1A1. The toggle flop T1A1 may be a conventional Schmidt trigger circuit which transmits from its output terminal T2 a well-shaped version of the signal received at its input terminal T1. If, for example, the signal received at the input terminal T1 has greatly sloping leading and trailing edges, the signal transmitted from the output terminal T2 will have a steeply rising lead edge and a rapidly falling trailing edge. All toggle flops start with a reference character T.

Figure 2G:
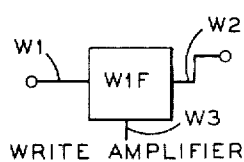

FIGURE 2G shows a typical write amplifier W1F. Write amplifier W1F is a conventional amplifier which receives pulse signals at its input terminal W1 and transmits high current pulses from its output terminal W2 to drive a magnetic writing head for recording information on a magnetic drum. A convenient amplifier for this purpose utilizes the "double-pulse" method of recording as described on page 332 of the book "Digital Computer Components and Circuits" previously cited. FIGURE 2H shows a possible arrangement for such an amplifier using pulse amplifiers, half-pulse delay lines, buffers, an output transformer, and a standard clock pulse source CO. The input pulses at W1 are assumed to occur at a time slightly before that corresponding to clock pulses CO to permit full reshaping in pulse amplifier P1Z. If a pulse is present on the W1 input, the positive output terminal of pulse amplifier P1Z will drive the primary of transformer T in one direction which may be termed positive first through buffer B1Z and, a half pulse-time later, in the opposite or negative direction on through delay line D1Z and buffer B2Z. If no pulse is present on the W1 input terminal, the lower terminal of amplifier P1Z is positive during the time CO is positive and pulse amplifier P2Z operates driving transformer T first in the negative direction through buffer B2Z and, a half pulse-time later, in the positive direction through delay line D2Z and Buffer B1Z. This method of recording may be considered to add one-quarter of a pulse period delay in the circuit beyond the indicated clocking time since the transition between directions of current applied to transformer T is taken as the reclock center during reading, in accord with the read method titled "Amplified and Clipped" in the cited reference. In FIGURE 2G, the W3 line represents the clocking pules (CO in FIGURE 2H). It should be noted that all write amplifiers have reference characters starting with the letter W.

Figure 2I:
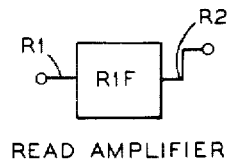

FIGURE 2I shows a typical read amplifier R1F. Read amplifier R1F is a high gain amplifier with a step-up transformer in its input circuit so that low-level signals received by its input terminal R1 are transmitted as high level signals for its output terminal R2. It should be noted that all read amplifiers throughout the system have reference characters starting with the letter R.

Figure 2J:
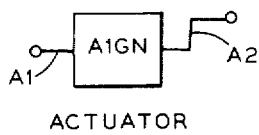
Figure 2H:
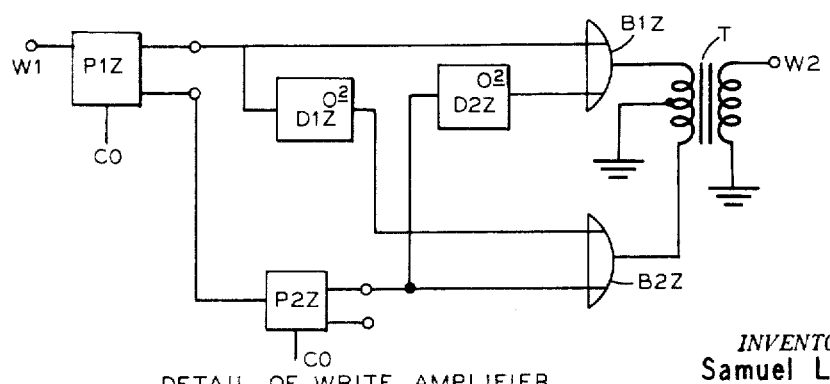

FIGURE 2J shows a typical actuator A1GN1 actuator A1GN1 is a high current amplifier which, when it receives a signal at its input terminal A1, transmits a high current signal from its output terminal A2, the amplitude of the current being sufficient to energize a solenoid. The reference characters of all Actuators are prefixed by an A.

MAGNETIC DRUM MD (FIGS. 3, 4, 5)

The Magnetic Drum MD is a rotating cylinder whose periphery is coated with a magnetizable medium such as one of the iron oxides or a cobalt-nickel plating. The Magnetic Drum MD is divided into a plurality of peripheral bands or channels that are axially spaced from each other. Opposite each channel is at least one magnetic reading head. Some of the channels which are associated with recirculating registers are provided with a magnetic reading head and a magnetic writing head that are angularly displaced from each other along the channel. FIGURE 3 shows a schematic representation of the Magnetic Drum MD. It should be noted that some of the magnetic heads are not shown, solely for the purpose of clarity.

Magnetic Drum MD has a first channel MD1 which forms a part of the recirculation register associated with the Character Counter B. Disposed opposite the channel MD1 are a pair of angularly displaced magnetic heads MD2 and MD3. The magnetic head MD2 receives signals via the BW signal line for recording on the channel MD1. The magnetic head MD3 is connected to the Character Counter B via the BR signal line for transmitting information represented by the signals read from the channel MD1. The magnetic heads MD2 and MD3 are angularly displaced from each other a distance which is equivalent to one hundred eighteen bits of storage. Information represented by signals is first transmitted from the Character Counter B via the BW signal line to the magnetic head MD2 and recorded on the channel MD1. As the Magnetic Drum MD rotates, the areas of the channel then move under the magnetic head MD3 and the information is read by the magnetic head MD3 and transmitted back to the Character Counter B via the BR signal line. The Character Counter B again transmits the information to the magnetic head MD2. In this manner, the information recirculates or is dynamically stored. The channels MD4, MD5, MD6 and MD7 are part of the recirculation paths for the Buffer Registers F1 to F4. Although the magnetic heads associated with these four channels are not shown, each channel has a pair of magnetic heads which are equivalent to the heads MD2 and MD3 of the channel MD1. Therefore, the channels MD4, MD5, MD6 and MD7 are parts of recirculation paths which dynamically store information for the Buffer Registers F1 to F4.

The channel MD8 is the clock pulse channel. That is, on this channel are recorded a plurality of evenly spaced pulses which occur at a constant repetition rate. These pulses are read by the magnetic reading head MD9 and are fed via the CP signal line to the Timer W. The channel MD10 contains four pulses which are read by the magnetic reading head MD11 once per revolution and used to synchronize the remainder of the apparatus with the rotation of the Magnetic Drum MD. These pulses are fed, via the OPO signal line, to the Timer W. They are arranged in two groups of two pulses each. One group consists of a pair of adjacent pulses and is located so that the later pulse of the pair occurs one pulse-time before the first pulse in the first key word for an incoming pass. The second group consists of a pair of alternate pulses and is located so that the later pulse of the pair occurs one and one-quarter pulse-times before the first pulse in the first key word for an outgoing pass.

The remainder of the channels of the Magnetic Drum MD store the drum words. These drum words are stored in registers that are equally divided among one hundred twenty-eight pairs of channels. One channel of the pair contains registers which store the odd bits of the drum words and the other channel of the pair contains registers which store the even bits of the drum words. Whenever a drum word is read out, the pair of subregisters associated with the drum word simultaneously transmit the information. Thus, during channel selection operations, the channels are selected in pairs. Each of the channels is divided into four zones. The incoming zone comprises registers containing the major portion of the drum words associated with an incoming pass. The outgoing zone contains drum words associated with an outgoing pass. The incoming transition zone contains drum words that are an interleaved array of drum words associated with an incoming pass and outgoing pass and several key drum words which will be hereinafter more fully described. The outgoing zone similarly contains an interleaved combination of drum words associated with an outgoing pass, an incoming pass, and several key drum words.

Figure 4:
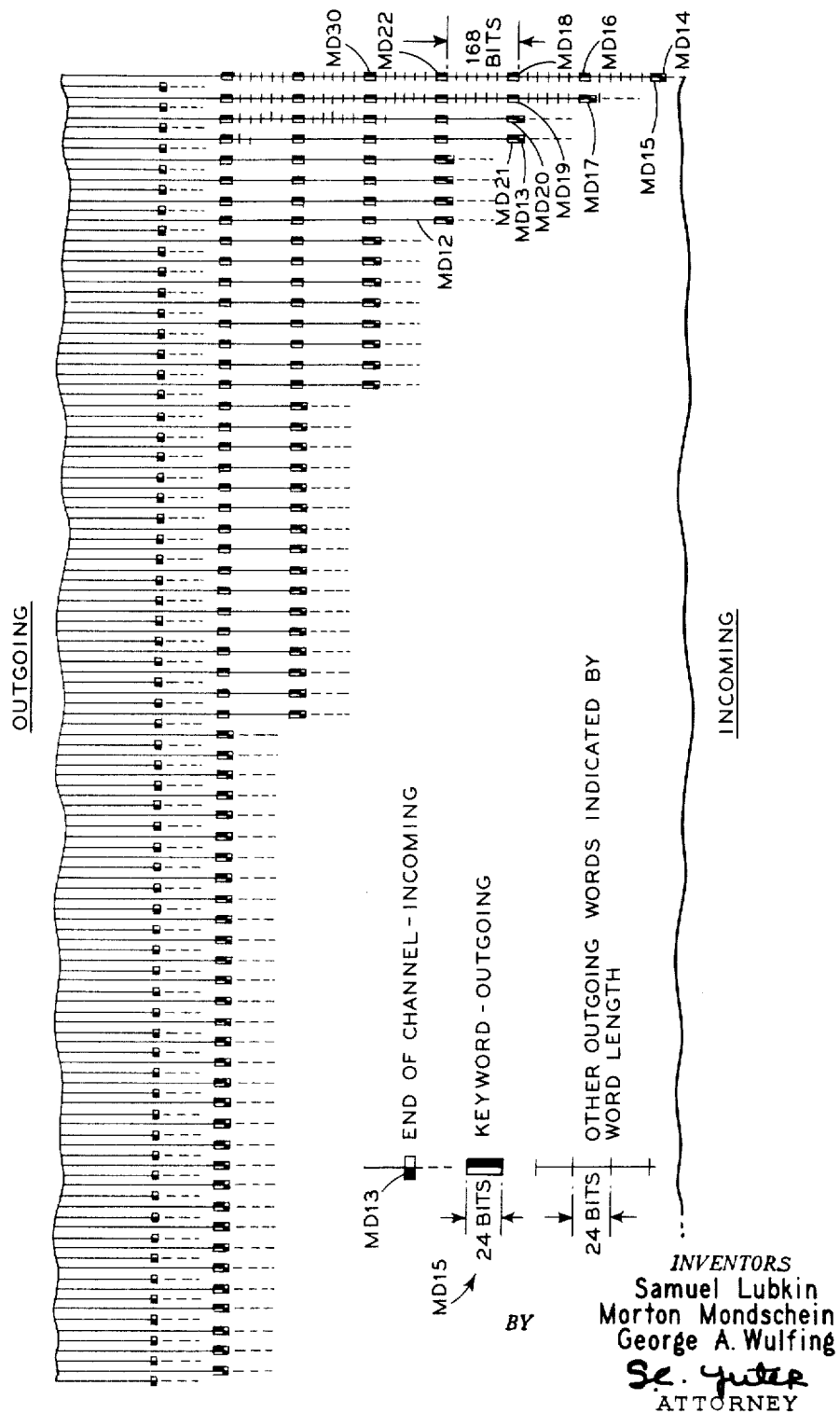
FIGURE 4 shows the outgoing transition zone of the Magnetic Drum MD of FIGURE 3 in greater detail.

The outgoing transition zone is shown in greater detail in FIGURE 4. The one hundred twenty-eight pairs of channels are indicated by lines such as line MD12, which is actually the border between a parallel pair of channels. The drum words for an incoming pass are disposed from the bottom of the figure serially until a point such as MD13 is reached. From the point MD13 upward are the drum words associated with an outgoing pass. In other words, points such as MD13 indicate the transition from the incoming pass to the outgoing pass for each pair of channels.

In the first pair of channels, at the transition (MD14) between the drum words for an incoming pass and the drum words for an outgoing pass, is recorded the outgoing start character, a unique, special serial combination of bits to indicate the transition. This code is detected to indicate the end of comparisons during an incoming pass. For definiteness, the code 011111 has been chosen for this purpose. This code differs from any used for numbers or alphabetic characters. The register following this transition contains the first key drum word MD15 of the outgoing pass. This first key drum word will actually be the largest (numerically) drum word that is stored in the first half of the channels. Seven registers later, the second level of key drum words, that is, the key drum words MD16 and MD17, are respectively recorded in the first and second pairs of the channels. The key drum word MD16 is the largest word stored in the first quarter of the channels while the key drum word MD17 is the largest word stored in the third quarter of the channels. Seven registers later, the third level of key drum words is recorded, that is, the key drum words MD18, MD19, MD20 and MD21. The key drum word MD18 is the largest word stored in the first eighth of the channels. The key drum word MD19 is the largest word in the fifth eighth of the channels. The key drum word MD20 is the largest word in the third eighth of the channels, and the key drum word MD21 is the largest word of the seventh eighth of the channels. The next level of key drum words, that is, the key drum words parallel with the key drum word MD22 in the first channel, divide the channels into sixteenths. The next level of key drum words, that is, the key drum words parallel with the key drum word MD30 divide the channels into thirty-seconds. The next level of key drum words divides the channels into sixty-fourths, and the last level of key drum words divides the channels into one hundred twenty-eighths, i.e. into individual pairs.

When a channel selection is being performed, there is first a comparison between a letter word and the key drum word MD15. If the letter word is greater than the key drum word MD15, the letter word is then compared with the key drum word MD17 switching to the corresponding pair of channels. If the letter word is less than the key drum word MD15, the letter word is then compared with the key drum word MD16 and no switching occurs. After the seventh level of comparison, the appropriate pair of channels has been selected and, from that point on, the comparisons are performed solely in that channel. It is thus possible, by performing the seven levels of comparison to select the pair of channels which will contain the drum word which will satisfy the type of comparison required for the letter word. It should be noted that the levels of the key drum words are separated by six regular drum words of the outgoing type. Therefore, the key drum words occur every seventh register in a channel. Or, stated another way, since each one of the outgoing pass drum words comprises twenty-four bits, the key drum words occur every one hundred sixty-eight bit times.

Figure 5:
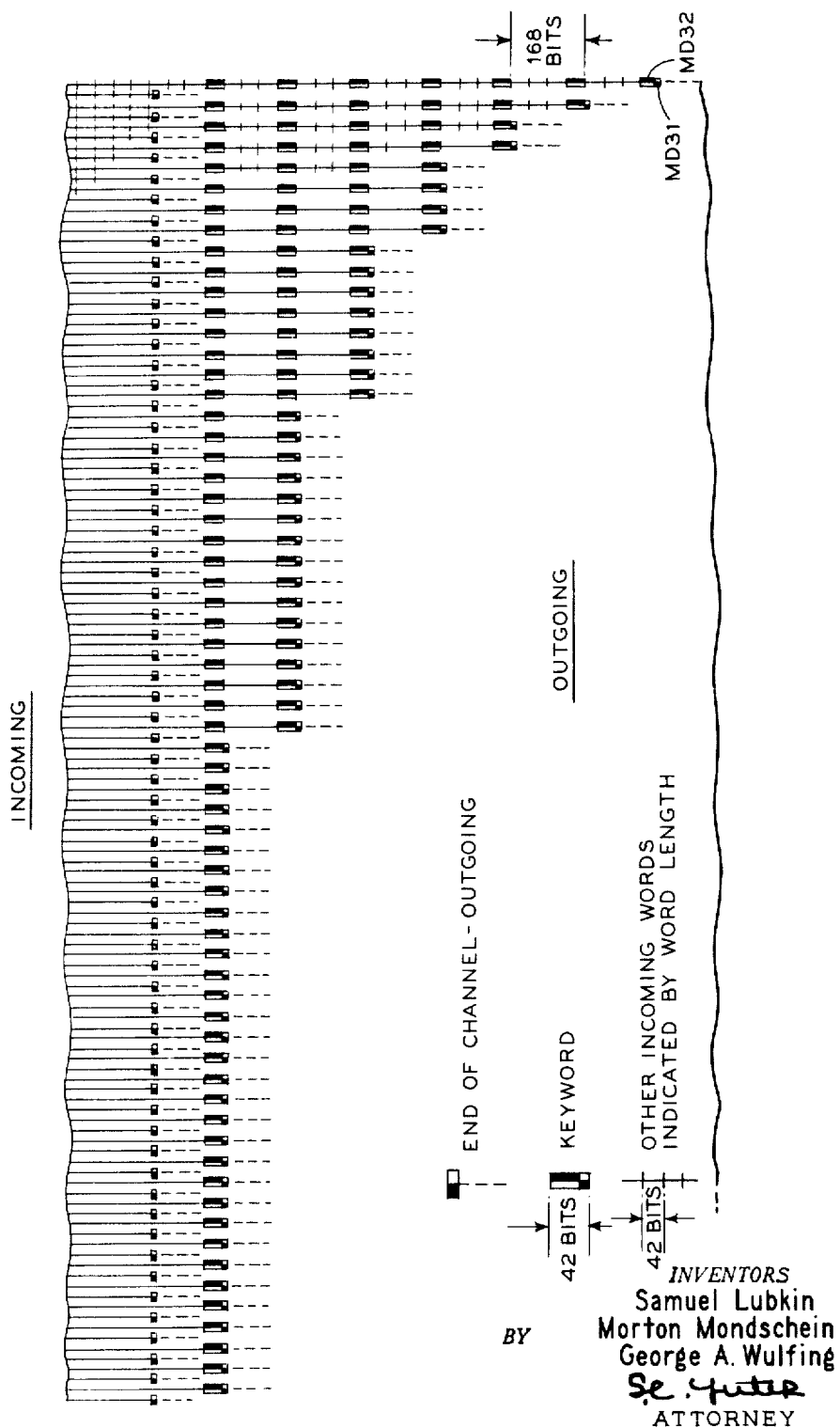
FIGURE 5 shows the incoming transition zone of the Magnetic Drum MD of FIGURE 3 in greater detail.

FIGURE 5 shows the incoming transition zone, that is, the transition from the registers associated with an outgoing pass to the registers associated with an incoming pass. Again, there are seven levels of key drum words that perform the same function as the key drum words in the outgoing transition zone, except that now they are concerned with the drum words for an incoming pass. Here, just prior to the first key word MD32 in the first channel is a coded combination of bits (MD31) which uniquely indicates the end of an outgoing pass comparison. For definiteness, the code 101111 has been chosen for this function. This code differs from any used for numbers or alphabetic characters, as well as from the code marking the start of comparisons during an outgoing pass. It should be noted that, for an incoming pass, the key words are separated by three drum words of the incoming type. However, these drum words associated with an incoming pass, that is, each one of these drum words comprises forty-two bits. Therefore, it again can be said that the separation from the start of one key word to the start of the next key word is one hundred sixty-eight bits.

Since this separation of one hundred sixty-eight bits occurs between both the key words for an incoming pass and an outgoing pass, the portions of the channels for the incoming pass can be made to completely mesh or dovetail with the portions of the channels for an outgoing pass, and the magnetic drum is completely packed without any waste of space, provided the number of words of each type per drum channel satisfies certain relations. It is convenient to make the choice, shown in the diagrams, of having the same sequence of channel selection for an incoming pass as for an outgoing pass. This makes the word arrangement the same in all channels, comprising: a start character for an outgoing pass, a number M of comparison words for an outgoing pass, including up to seven key words; a start character for an incoming pass; and a number N of comparison words for an incoming pass. M and N are the same for every channel, but the angular position around the drum differs among the channels. To completely pack the drum, we must have the total number of bits (B) per drum channel equal to $24M+42N+6$. It is also convenient to make B an integral multiple of 126 so as to synchronize the recirculation registers with the drum rotation. Also, to provide for at least 168 pulses beyond the last channel selection point for necessary circuit preparation prior to starting the subsequent cycle, it is necessary that M be at least $8 \times 7 = 56$ and that N be at least $8 \times 4 = 32$. Analysis then shows that, to satisfy all the stated conditions, it is necessary that $B=126(K+23)$, $M=7L+61$, and $$N=3K-4L+34$$

where both K and L are zero or positive integers and $3K \geq 4L$. In particular, if it is desired that the total number of comparison words exceed 13,000 for an outgoing pass and 10,000 for an incoming pass, then $$M \geq \frac{13000}{128} = 102$$

and $$N \geq \frac{10000}{128} = 79$$

so that $$L \geq \frac{102-61}{7} = 6$$

and $$K \geq \frac{79-34+4 \times 6}{3} = 23$$

The smallest suitable drum corresponds to these minimum values, i.e. to $B=126(23+23)=5796$ bits per channel. For these same values, $M=7 \times 6+61=103$ and $$N=3 \times 23-4 \times 6+34=79$$

to make for a total of $103 \times 128 = 13,184$ comparison words for an outgoing pass and $79 \times 128 = 10,112$ for an incoming pass.

Having selected the capacity of each drum channel to suit a particular need as concerns the number of incoming and outgoing words, the latter may still be changed at a later time to accommodate a different proportion of words for each type of pass with complete packing of the drum. For example, retaining 5,796 bits per channel ($K=23$), but making $L=3$ instead of 6, we get $$M=3 \times 7+61=82$$

and $N=3 \times 23-3 \times 4+34=91$ so that the total number of outgoing words becomes $82 \times 128 = 10,496$ and the total number of incoming words becomes $$91 \times 128 = 11,648$$

Several other points are worthy of mention. As will be seen in the figures, alternate channel pairs have no key words at all. They need none, since the preceding key word comparisons indicate that the word read from the envelope must lie in the range covered by the final channel pair reached. Also, it should be noted that the key words themselves, although out of sequence in the drum channels in which they are recorded, are valid comparison words for bin number designation for corresponding addresses. The fill-in words between key words in any channel are also valid comparison words but are in correct sequence in the channel in which they are recorded. Finally, it may be stated that, except for the key words, the exact order of comparison words of a particular type in a channel does not affect the operation, as long as every word in one channel is in proper sequence with respect to any word in any other channel.

TIMER W (FIGS. 6 AND 18)

The Timer W generates periodically occurring pulses which set the basic rhythm of the Transcoder. In particular, the Timer W generates clock pulses which are periodically occurring square wave signals that are primarily used to retime and reshape the pulse signals throughout the system. The clock pulses are generated in four phases. Timer W also generates several series of timing pulses which occur once per word time for either the incoming passes or the outgoing passes. The timing pulses of one series, in addition to occurring once per word time, are displaced in phase by multiples of the clock pulses for the timing pulses of other series to represent different bits within the words.

Figure 6:
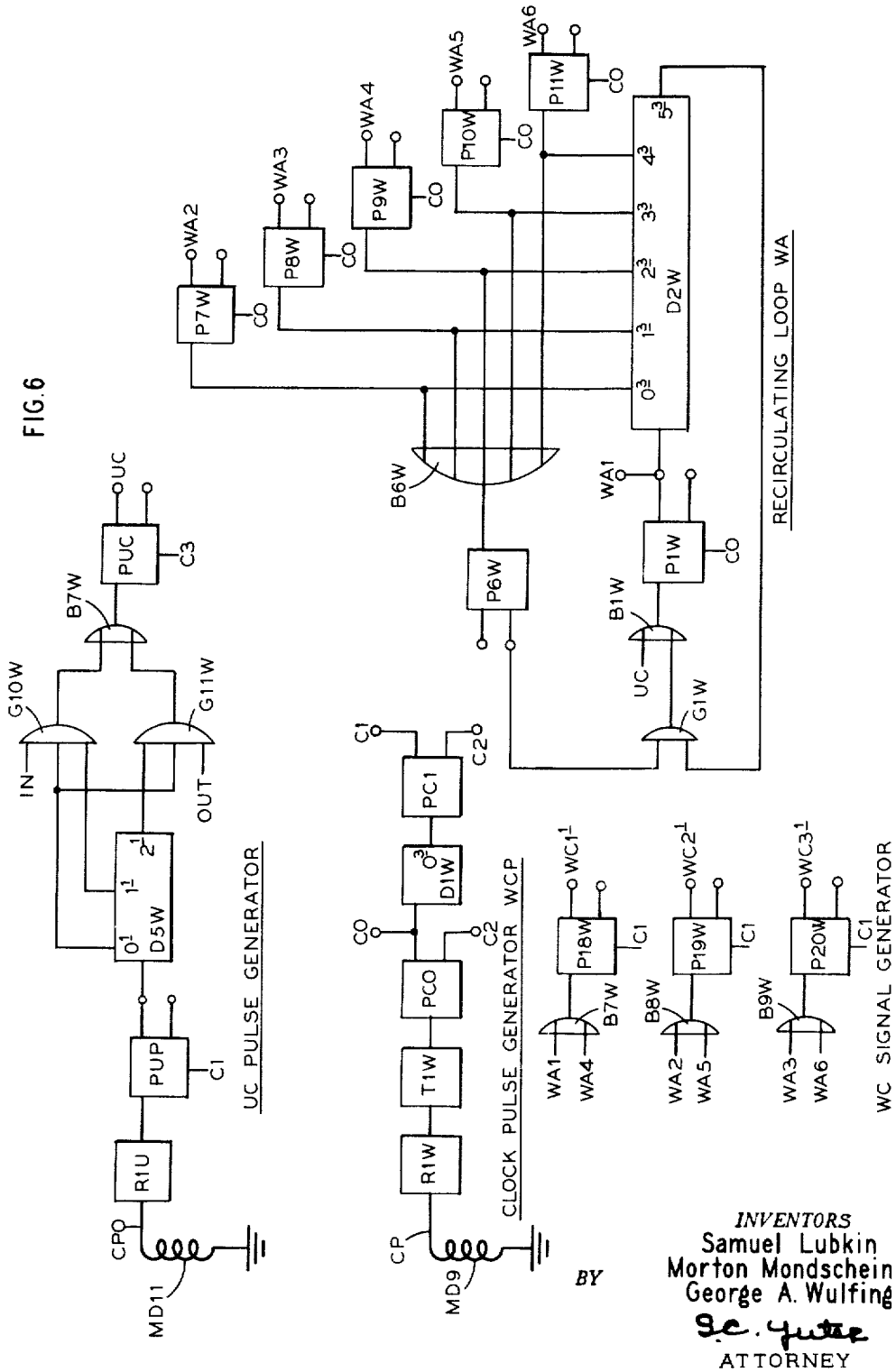
FIGURE 6 shows the details of a portion of the Timer W of FIGURE 1.

More particularly, the clock pulse generator WCP (FIG. 6) generates the four phases of clock pulses. The Magnetic Drum MD is provided with a single channel MD8 upon which are recorded periodically occurring pulses from which the clock pulses are derived. The amplifier R1W receives the raw clock pulses from the reading head MD9 opposite the clock pulse channel MD8 on the Magnetic Drum MD and transmits an amplified verison of the clock pulses to the pulse amplifier PC0 after they are squared up by the toggle flop T1W. The signals from the positive output terminal of the pulse amplifier PC0 are arbitrarily made the C0 pulses. The pulses from the negative output terminal of the pulse amplifier PC0, which are one hundred eighty degrees out of phase with the C0 pulses, are called the C2 pulses. The C0 pulses from the pulse amplifier PC0 are transmitted via the quarter pulse delay line D1W to the pulse amplifier PC1. The positive output terminal of the pulse amplifier PC1 transmits the C1 pulses which are one-quarter of a pulse time delayed from the C0 pulses. The negative output terminal of the pulse amplifier PC1 transmits the C3 pulses which are one hundred eighty degrees out of phase with the C1 pulses. In this manner, the four phases of clock pulses are generated, the first phase being the C0 pulses, the second phase occurring a quarter of a pulse time later are the C1 pulses, the third phase occurring, effectively, one-half pulse time after the C0 pulses are the C2 pulses, and the fourth phase are the C3 pulses which occur, effectively, three-quarters of a pulse time after the C0 pulses.

Once each drum revolution, a master timing pulse UC is derived from the pulses recorded on the magnetic drum in channel MD10. These pulses are read by magnetic head MD11 and are amplified by reading amplifier R1U and reshaped by pulse amplifier PUP before entering delay line D5W. The pulses occur in two groups of two pulses each. One of these consists of two adjacent pulses. Once a drum revolution, these two pulses appear simultaneously at the two adjacent $0^1$ and $1^1$ of delay line D5W. During an incoming pass, at this time, this causes a positive pulse to pass through gate G10W and via buffer B7W and pulse amplifier PUC, to be emitted as pulse UC. The second group of pulses on this drum channel consist of two alternate pulses. During an outgoing pass, when these appear simultaneously at taps $0^1$ and $2^1$ of delay line D5W once each drum revolution, the UC pulse is generated via gate G11W, buffer B7W, and pulse amplifier PUC. The pulse groups are so located on the drum that, for either type of pass, the UC signal occurs one-quarter pulse time before the first bit of the first key word.

The periodically recurring timing pulses associated with the words are generated by combinations of signals from recirculating loops. In particular, the recirculating loop WA generates pulses having a repetition rate of once per six C0 pulses. The recirculating loop WA comprises the gate G1W, the buffer B1W, the pulse amplifier P1W, and the five and three-quarter pulse time delay line D2W serially connected in closed loop in that order. Once per revolution of the Magnetic Drum MD, the UC pulse passes through the buffer B1W and starts recirculating in the recirculation loop WA. The pulse is retimed at the pulse amplifier P1W and enters the five and three-quarter pulse time delay line D2W. From the output terminal of the delay line D2W, the pulse is fed back to the second input terminal of the buffer B1W via gate G1W and again circulates. Since the pulse amplifier P1W effectively introduces a quarter of a pulse time delay, it is seen that the overall delay in the recirculating loop WA is six pulse times. Therefore, at any point in the loop the pulse will be present every six clock pulse times.

The recirculating loop WA generates six series of pulses respectively displaced from each other by one pulse time. Initially the positive output terminal of the pulse amplifier P1W generates the WA1 pulse. Three-quarters of a pulse time later, this pulse is present at the $0^3$ tap of the delay line D2W and, after reshaping by pulse amplifier P7W with consequent additional one-quarter pulse time delay, generates the WA2 pulses. The $1^3$ tap of the delay line D2W transmits a pulse one pulse time later which, when reshaped by pulse amplifier P8W, is a WA3 pulse. In a similar manner, the WA4, WA5 and WA6 pulses are respectively generated using the $2^3$, $3^3$ and $4^3$ taps of the delay line D2W. The output signals from the $0^3$, $1^3$, $2^3$, $3^3$, and $4^3$ taps of the delay line D2W are transmitted through the buffer B6W to pulse amplifier P6W. The negative output of this amplifier connects to gate G1W and inhibits the recirculation whenever a signal is present at these taps. When the UC pulse enters the loop, therefore, its presence at these five successive taps at five successive pulse times prevents any pulses that might have been present in the delay line D2W from re-entering it during the five pulse times after the UC signal is applied. This insures that one, and only one, pulse will circulate no matter what may be initially introduced into the delay line during the period of starting up the drum or switching on the power.

The recirculating loop WB generates pulses which recurs every seven clock pulse times. The recirculating loop WB comprises the gate G2W, the buffer B2W, the pulse amplifier P2W and the six and three-quarter pulse time delay line D3W, which are serially connected in a closed loop in that order. Its operation is entirely similar to that of recirculating loop WA, but the longer delay line causes the longer period of circulation. The positive output terminal of the pulse amplifier P2W generates the WB1 pulse and the taps on the delay line D3W, which are displaced from each other by one pulse time connect to reshaping pulse amplifiers P12W to P17W whose positive outputs are, respectively, the sources of the WB2 to WB7 pulses.

The recirculating loop WD generates pulses that periodically recur every eight pulse times. The recirculating loop WD is similar to the recirculating loops WA and WB, except for its longer delay line and correspondingly longer circulation period. It generates the successive pulses WD1 to WD8.

The output of buffer B7W, whose two inputs are the WA1 and WA4 signals, consists of the superposition of these two signals and thus is a pulse which recurs every three pulse times. Retiming by pulse amplifier P18W causes a delay of one-quarter pulse time. The positive output of this amplifier are the WC1¹ pulses. In similar fashion, mixing of pulses WA2 and WA5 in buffer B8W and retiming by pulse amplifier P19W produces the WC2¹ pulses which also repeat every three pulse times but occur one pulse time later than the WC1¹ pulses. The WC3¹ pulses, occurring one pulse time later still, are generated in a similar way.

Since the length of the words during the incoming pass is forty-two bits or pulse times, it is necessary to generate forty-two unique pulses, one associated with each word bit. These pulses are generated by combining appropriate WA and WB pulses. Table II shows the combinations which generate the IT pulses for the words during the incoming pass. For instance, the IT1 pulse is generated by combining a WA1 pulse with a WB1 pulse.

TABLE II  INCOMING PASS

| | | | | | |
|---|---|---|---|---|---|
| IT1 | WA1 | WB1 | IT22 | WA4 | WB1 |
| IT2 | WA2 | WB2 | IT23 | WA5 | WB2 |
| IT3 | WA3 | WB3 | IT24 | WA6 | WB3 |
| IT4 | WA4 | WB4 | IT25 | WA1 | WB4 |
| IT5 | WA5 | WB5 | IT26 | WA2 | WB5 |
| IT6 | WA6 | WB6 | IT27 | WA3 | WB6 |
| IT7 | WA1 | WB7 | IT28 | WA4 | WB7 |
| IT8 | WA2 | WB1 | IT29 | WA5 | WB1 |
| IT9 | WA3 | WB2 | IT30 | WA6 | WB2 |
| IT10 | WA4 | WB3 | IT31 | WA1 | WB3 |
| IT11 | WA5 | WB4 | IT32 | WA2 | WB4 |
| IT12 | WA6 | WB5 | IT33 | WA3 | WB5 |
| IT13 | WA1 | WB6 | IT34 | WA4 | WB6 |
| IT14 | WA2 | WB7 | IT35 | WA5 | WB7 |
| IT15 | WA3 | WB1 | IT36 | WA6 | WB1 |
| IT16 | WA4 | WB2 | IT37 | WA1 | WB2 |
| IT17 | WA5 | WB3 | IT38 | WA2 | WB3 |
| IT18 | WA6 | WB4 | IT39 | WA3 | WB4 |
| IT19 | WA1 | WB5 | IT40 | WA4 | WB5 |
| IT20 | WA2 | WB6 | IT41 | WA5 | WB6 |
| IT21 | WA3 | WB7 | IT42 | WA6 | WB7 |

The length of the words during an outgoing pass is twenty-four bits. Therefore, it is necessary to generate pulses occurring once per twenty-four clock pulse times. These pulses are generated by combining the WA pulses and the WD pulses as shown in Table III. For example, the OT1 pulse is generated by combining a WA1 and a WD1 pulse.

TABLE III.  OUTGOING PASS

| | | | | | |
|---|---|---|---|---|---|
| OT1 | WA1 | WD1 | OT13 | WA1 | WD5 |
| OT2 | WA2 | WD2 | OT14 | WA2 | WD6 |
| OT3 | WA3 | WD3 | OT15 | WA3 | WD7 |
| OT4 | WA4 | WD4 | OT16 | WA4 | WD8 |
| OT5 | WA5 | WD5 | OT17 | WA5 | WD1 |
| OT6 | WA6 | WD6 | OT18 | WA6 | WD2 |
| OT7 | WA1 | WD7 | OT19 | WA1 | WD3 |
| OT8 | WA2 | WD8 | OT20 | WA2 | WD4 |
| OT9 | WA3 | WD1 | OT21 | WA3 | WD5 |
| OT10 | WA4 | WD2 | OT22 | WA4 | WD6 |
| OT11 | WA5 | WD3 | OT23 | WA5 | WD7 |
| OT12 | WA6 | WD4 | OT24 | WA6 | WD8 |

INPUT SYNCHRONIZERS A1 TO A6 (FIG. 7)

The function of the Input Synchronizers A1 to A6 is to receive the pulses representing the characters of the letter word from the Photoelectric Readers PR1 to PR6 in parallel and convert the parallel representation of each character to a serial representation. The serial representation of each character is temporarily stored until the proper location in the Buffer Registers F1 to F4 is reached. The serial representation of the character is then transferred to the appropriate position in the appropriate buffer register. Since there are six Photoelectric Readers PR1 to PR6 reading different envelopes in parallel and non-synchronous with each other, there are six Input Synchronizers A1 to A6 which are almost identical. For this reason, only the Input Synchronizer A1 will be completely described and the remaining Input Synchronizers A2 to A6 will be discussed only in terms of their differences from the Input Synchronizer A1. The six bits representing the character being read are transmitted from the Photoelectric Reader PR1 as the signals 1IN1 to 1IN6 to gates G6A1 to G11A1. At the same time, a spocket pulse SP1 from Photoelectric Reader PR1, associated with this character and lasting more than four pulse times but less than one hundred twenty pulse times, triggers the toggle flop T1A1. The positive output terminal of toggle flop T1A1 is coupled to one input terminal of Gate G1A1. The negative output terminal of toggle flop T1A1, delayed four pulse times by delay line D3A1 is connected to a second input of gate G1A1 so that, with the occurrence of the spocket pulse SP1, these two inputs keep gate G1A1 open to the third input, WC2¹ pulses, for four pulse times. Hence, depending upon the exact time of occurrence of the SP1 pulse, one or two full WC2¹ pulses or one partial and one full pulse will pass through gate G1A1 to set flip-flop F1A1. A positive voltage from the positive output terminal of flip-flop F1A1 is transmitted in parallel to respective input terminals of the gates G2A1 and G6A1 to G11A1. If there is a pulse on the line 1IN1 indicating a bit in the most significant bit position of the character, the WC3[1] occurring approximately one pulse time after the WC2[1] that set flip-flop F1A1 passes through gate G6A1 and buffer B2A1 to pulse amplifier PAE1 and enters the two and three-quarter pulse time delay line D1A1. If there is a pulse on the 1IN3 line, indicating the presence of a bit in the third most significant bit position of the character, the WC1[1] pulse occurring one pulse time after WC3[1] passes through gate G7A1 and buffer B2A1 to pulse amplifier PAE1. This pulse enters delay line D1A1 one pulse time after the pulse that passed through gate G6A1. Similarly, if there is a pulse on the line 1IN5, the fifth most significant bit position, the WC2[1] pulse occurring one pulse time after WC1[1] passes through gate G8A1 and buffer B2A1 to pulse amplifier PAE1, and enters delay line D1A1. The odd bits of the character now circulate in a recirculation register comprising the delay line D1A1, the gate G12A1, buffer B2A1, and pulse amplifier PAE1. It should be noted that the recirculation is maintained because the positive output terminal of flip-flop F1A1, which in a set condition, is coupled via buffer B4A1 to gate G12A1. At the same time, and in a similar manner, the three even bits of the character are respectively gated through gates G9A1 to G11A1 and to buffer B3A1 and pulse amplifier PAF1 to two and three-quarters pulse time delay line D2A1. These three bits now recirculate in a recirculation register defined by the following path: from delay line D2A1 to gate G13A1, buffer B3A1 and pulse amplifier PAF1, back to delay line D2A1. The recirculation is maintained because the positive output terminal of flip-flop F1A1 is coupled via buffer B4A1 to gate G13A1.

Since both of the recirculation registers are three pulses long, and since they were serially loaded, the bits can recirculate in serial order until the proper position for the storage of the character represented by these six bits is located in the appropriate subregisters of the Buffer Registers F1 to F4. As will hereinafter be more fully described, the Buffer Registers F1 to F4 comprise two parallel recirculation channels on the Magnetic Drum MD. One channel accepts the three odd bits and the other channel at the same time accepts the three even bits of the character.

While the bits of the character are being loaded into the recirculation registers, the WC1[1] timing pulse, which occurs approximately two pulse times after the setting time of flip-flop F1A1, causes the setting of flip-flop F2A1 via gate G2A1. The positive potential on the positive output terminal of flip-flop F2A1 is transmitted to one input terminal of gate G3A1. Gate G3A1 is the timing gate which indicates when the appropriate location for storage of the character in the Buffer Registers F1 to F4 has been found. The timing pulse WC3[1] controls the time of the sampling for the BA and BD signals from the Character Counter B which indicate when the proper position is available in the Buffer Registers F1 to F4. The BA signal indicates that the subregisters of the Buffer Registers F1 to F4 reserved for input synchronizer A1 are available, and the occurrence of the BD pulse at this WC3[1] time indicates that the proper position within these subregisters of Buffer Registers F1 to F4 for the character being read is available. At this time, a pulse passes through gate G3A1 to set flip-flop FAC1. Flip-flop FAC1 remains set for three pulse times, when it is reset by the next occurring WC3[1] pulse received at its reset terminal through gate G15A1 since, as will be seen, flip-flop F2A1 is reset before that time and thus its reset terminal, which is the other input to gate G15A1, is positive. A positive voltage AC1 from the positive output terminal of flip-flop FAC1 is transmitted to gate G4A1 to permit the transmission of the three odd bits of the character as the AA1 signal, and to the gate G14A1 to permit the transmission of the three even bits as the AB1 signal.

At the same time, the positive voltage A.C., from the positive output terminal of flip-flop FAC1 is transmitted to gate G5A1 and the next occurring WC2[1] pulse passes through this gate via buffer B1A1 to reset flip-flops F2A1 and F1A1. Even if flip-flop FAC1 is never set, for example during the time the last six characters are read during an incoming pass, the IP1 signal from the Photoelectric Reader PR1 occurring after the last character is read opens gate G5A1 through buffer B1A1 to reset the flip-flops F1A1 and F2A1 at the next WC2[1] pulse time. Although the resetting of flip-flop F1A1 blocks transmission to the loading inputs of the recirculation registers at gates G12A1 and G13A1, a positive voltage from the positive output terminal of flip-flop FAC1 is transmitted via buffer B4A1 to the gates G12A1 and G13A1 to maintain recirculation until the bits are completely transmitted. Upon the resetting of flip-flop FAC1, the recirculation paths are broken and both recirculation registers are cleared. The bits representing the characters are serially transmitted as the AA1 signal to Buffer Register F1 and as the AB1 signal to Buffer Register F2.

It should be noted that the letter word comprises eighteen characters, twelve for the street portion of the address and six for the city and state portion. During an incoming pass, the first twelve characters are stored in the Buffer Registers F1 to F4 since they are the characters required for bin selection. However, during an outgoing pass, only the six last characters are required. However, the Photoelectric Reader PR1 starts reading the first available character. Therefore, provision is made to ignore the first twelve characters read during an outgoing pass. These selections from the eighteen characters read by the Photoelectric Reader PR1 are not performed in the Input Synchronizer A1 and will be explained in connection with the Character Counter B and Input Control K. The AD1 signal, which lasts from the time flip-flop F2A1 is set until a short time after flip-flop FAC1 is reset, is however generated in the Input Synchronizer A1 to assist in these controls. The AD1 signal is a superposition in buffer B5A1 of the positive output of flip-flop F2A1 and the positive output of flip-flop FAC1 delayed a half-pulse time by delay line D4A1.

Figure 7:
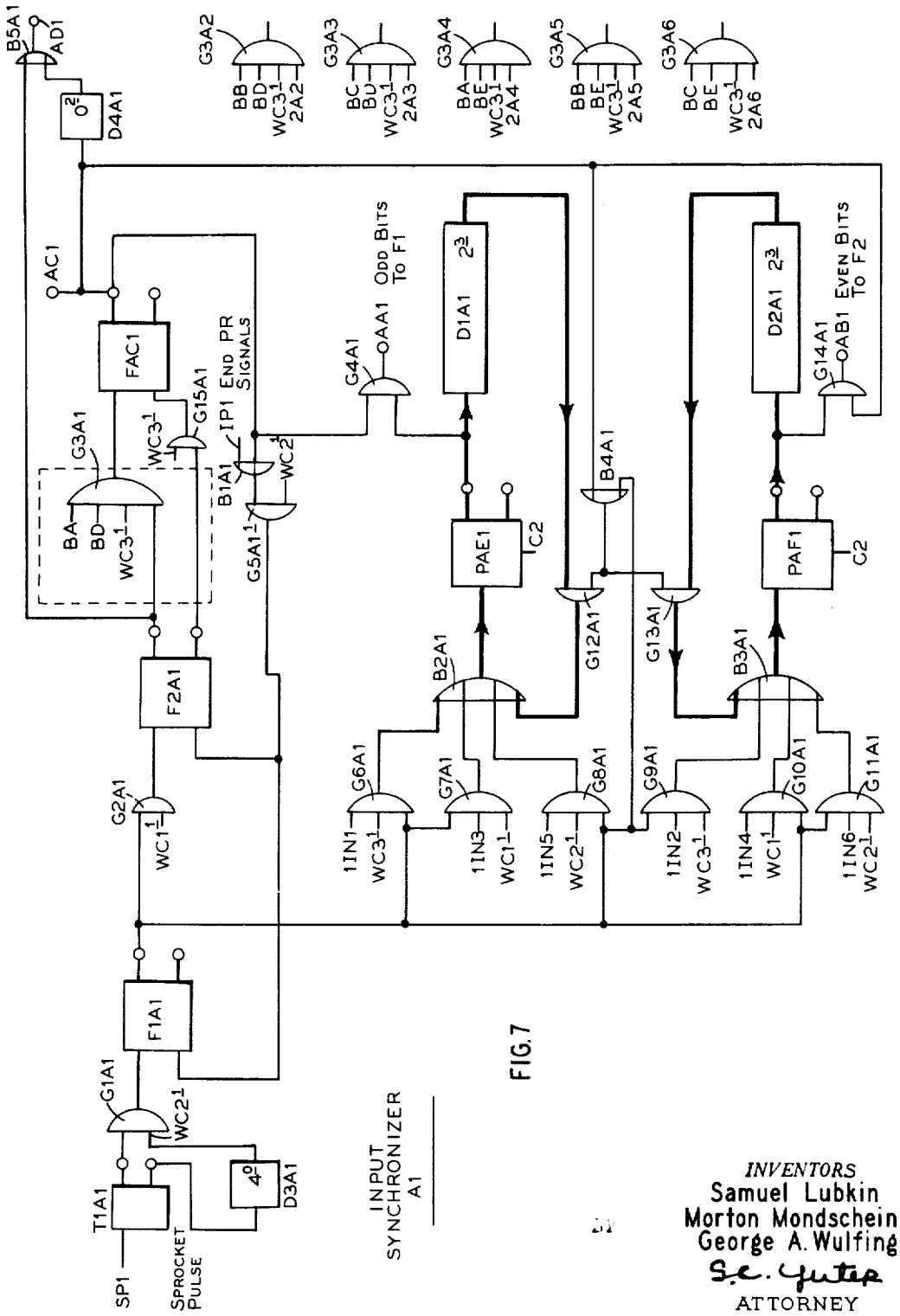
FIGURE 7 shows the details of a typical Input Synchronizer A1 of FIGURE 1.

The remaining five Input Synchronizers A2 to A5 are identical except for the following differences: Input Synchronizer AN, where N can equal 2, 3, 4 or 5, has a toggle flop T1AN which receives a spocket pulse SPN; its gates G6AN to G11AN respectively receive signals NIN1 to NIN6; its gate G4AN transmits the odd bits of characters as signals AAN and the gate G14AN transmits the even bits as signals ABN; its buffer B5AN transmits the signal ADN while its flip-flop FACN transmits a signal ACN. Finally, the gate G3A1 is replaced by the gates G3A2 to G3A6 as shown in FIGURE 7.

Figure 8:
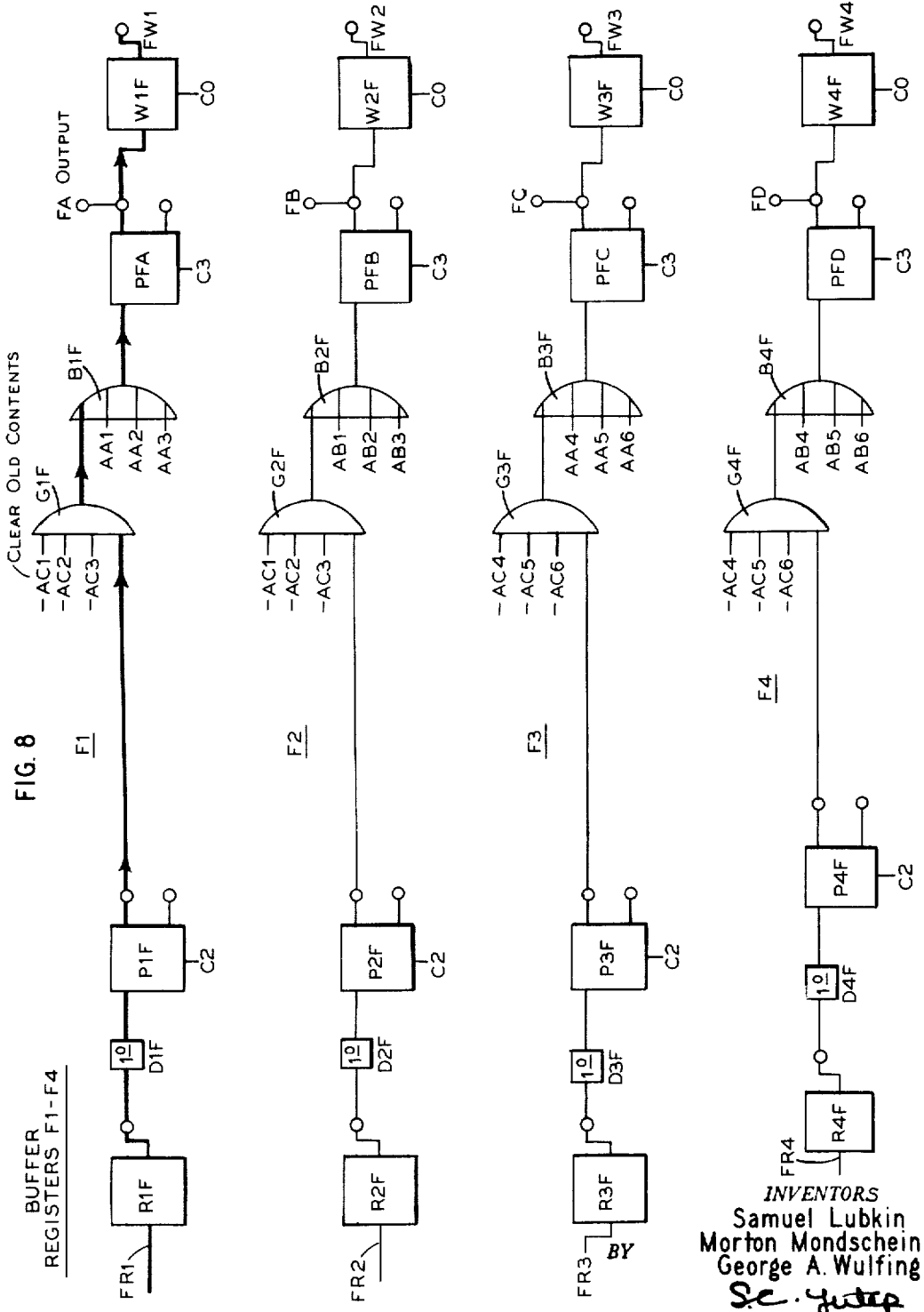
FIGURE 8 shows the Buffer Registers F1 to F4 of FIGURE 1 in detail.

BUFFER REGISTERS F1 to F4 (FIG. 8)

The Buffer Registers F1 to F4 are the recirculation registers which temporarily store the characters of the letter words received by the Input Synchronizers A1 to A6 as they are being assembled into complete words. After a complete letter word is formed, the letter word is transferred via the Comparison Word Selector I to the Comparison Word Register C. The Buffer Registers F1 to F4 comprise four recirculation registers, F1, F2, F3 and F4. Each of the Buffer Registers F1 to F4 includes a portion of a magnetic drum channel, plus an external portion between the reading and writing heads of the channel for the introduction and reading of the information. The Buffer Registers F1 to F4 are treated in pairs. For instance, Buffer Registers F1 and F2 are one pair. Buffer Register F1 stores the odd bits of characters, and the Buffer Register F2, which operates in parallel with the Buffer Register F1, stores the even bits of the character in three identical parallel positions. Each of the Buffer Registers F1 to F4 comprises three serial subregisters of equal length. Each of the subregisters is assigned to one of the Input Synchronizers. For example, the Buffer Registers F1 and F2 each have a first subregister, which is assigned to receive the characters from the Input Synchronizer A1. Each has a second subregister, which is assigned to receive the characters from the Input Synchronizer A2, and each has a third subregister which is assigned to receive the characters from the Input Synchronizer A3. The Buffer Registers F3 and F4 are similar to the Buffer Registers F1 and F2, except that they are assigned to receive characters from the Input Synchronizers A4, A5 and A6.

Since each of the Buffer Registers F1 to F4 are identical except for the signals they receive and transmit, only the Buffer Register F1 will be described in detail. In particular, the FR1 signals which are pulses read by the magnetic reading head associated with the assigned channel MD4 on the Magnetic Drum MD, are transmitted to the reading amplifier R1F, which transmits via delay line D1F the pulses representing the characters to the pulse amplifier P1F. The function of each of the delay lines D1F to D4F (associated with registers F1 to F4 respectively) is to provide a convenient means to adjust the total loop delay to one hundred twenty-six pulse times. Adjustment of the delay of these lines is generally simpler than physical change in the angular separation between the magnetic heads on the drum. The output signals of pulse amplifier P1F are transmitted to one input terminal of the gate G1F. The output terminal of the gate G1F is connected to one input terminal of the buffer B1F, which is connected to the input terminal of the pulse amplifier PFA. Pulse amplifier PFA furnishes the output signals of the Buffer Register F1 and drives the writing amplifier W1F. The output terminal of the writing amplifier W1F is coupled via the FW1 signal line to the writing head of the associated magnetic drum channel. The information continues to recirculate in this manner.

When the Input Synchronizer A1 is transmitting information, the —AC1 signal cuts off gate G1F for the three pulse times during which the AA1 signal (the three odd bits) is supplied to buffer B1F. While this loading operation of the three odd bits is taking place, the three even bits are loaded into the Buffer Register F2. The three even bits enter via buffer B2F as the AB1 signals while the —AC1 signal at gate G2F clears out the old contents of the three positions which will receive the three even bits.

When Input Synchronizer A2 is transmitting information, the odd bits are received at buffer B1F as the AA2 signals. The even bits from Input Synchronizer A2 are received as the AB2 signals at buffer B2F. The —AC2 signals at gates G1F and G2F perform the required clearing. Similarly, when Input Synchronizer A3 is transmitting information, the odd bits (the AA3 signals) enter via buffer B1F and the even bits (the AB3 signals) are received at buffer B2F. The —AC3 signals at gates G1F and G2F perform the required clearing of the old contents.

In like manner, the Buffer Registers F3 and F4 service the Input Synchronizers A4 to A6, and the loading is identical to that described for the Buffer Registers F1 and F2.

CHARACTER COUNTER B (FIG. 9)

The Character Counter B controls the transmission of information from the Input Synchronizers A1 to A6 to the Buffer Registers F1 to F4. The function of the Character Counter B is to insure that the letter word received by each Input Synchronizer A1 to A6 is stored in the appropriate pair of subregisters of Buffer Registers F1 to F4 and that each character of the letter word is stored in its proper character position in the appropriate pair of subregisters of Buffer Registers F1 to F4.

In order to explain the operation of the Character Counter B, it is first necessary to briefly summarize the structure of the Buffer Registers F1 to F4. The Buffer Registers F1 to F4 are divided into two pairs of twin recirculation registers, one pair stores the letter words read by the Input Synchronizers A1 to A3, and the other pair stores the letter words read by the Input Synchronizers A4 to A6. Each of the Buffer Registers F1 to F4 comprises three subregisters. Each subregister serially stores three bits of each character of the letter words. In particular, the first subregister of Buffer Register F1 stores the three odd bits of each character received from Input Synchronizer A1. The next subregister of Buffer Register F1 stores the three odd bits of each character from the Input Synchronizer A2, and the third subregister of Buffer Register F1 stores the three odd bits of each character read by the Input Synchronizer A3. The corresponding subregisters of Buffer Register F2 store the even bits in the same manner. Buffer Registers F3 and F4 similarly store the characters for the Input Synchronizers A4 to A6. Each of the subregisters of the Buffer Registers F1 to F4 store twelve characters of the letter word received from each of the Input Synchronizers A1 to A6.

Since each character comprises six bits, each of the subregisters must have a capacity to store a minimum of thirty-six bits, that is, twelve characters times three bits, the three bits being either the three odd or the three even bits of the character. However, in order to permit use of the same timing signals WA1 to WA6 and WB1 to WB7 as are used for other purposes, the Buffer Registers comprise one hundred twenty-six positions with each subregister consisting of forty-two bit positions, whereas in fact only thirty-six are needed for character storage.

The Character Counter B includes a one hundred and twenty-six bit recirculating register. All but four and three-quarters of the bits of recirculating storage are between a recording and a reading head associated with a channel of the Magnetic Drum MD. The four and three-quarters bits are external to the channel of the drum to be available for required logical and arithmetic functions. The one hundred and twenty-six bits are divided into three main subsections of forty-two bits each. The first forty-two bits control the synchronizing of the transfer of information from Input Synchronizers A1 and A4 to the Buffer Registers F1 to F4. The next forty-two bits are similarly associated with Input Synchronizers A2 and A5, and the last forty-two bits are associated with Input Synchronizers A3 and A6.

Since each subsection services two of the Input Synchronizers A1 to A6, the synchronizing information related to the Input Synchronizers is interlaced to save equipment. More particularly, if each bit position of a subsection is designated by one of the position P1 to P42 inclusive, the positions P7, P10, P13, P16, P19, P22, P25, P28, P31, P34, P37 and P40 are the positions for character insertion synchronization from the first Input Synchronizer of a pair and the positions P8, P11, P14, P17, P20, P23, P26, P29, P32, P35, P38 and P41 are the positions for the characters of the second Input Synchronizer of the pair. Position P4 is used to indicate that the reading of a letter word into the first Input Synchronizer of the pair has been completed. Position P5 similarly indicates that the reading of a letter word into the second Input Synchronizer of the pair has been completed. The remaining positions—that is, P1, P2, P3, P6, P9, P12, P15, P18, P21, P24, P27, P30, P33, P36, P39 and P42 are not used. These pulse positions P1 to P42 appear consecutively at any particular point in the recirculating register of Character Counter B. For definiteness, position P1 has been chosen to appear at point BF of the register at pulse time IT1 so that P2 appears at the same point as pulse time IT2 etc. Furthermore, it has been found convenient to invert the time sequence of characters transferred to each subregister of Buffer Registers F1 to F4 so that the second character occupies the three pulse positions before the first and the third character occupies the three pulse positions before the second, etc. We therefore begin with pulses in pulse positions P40 and P41 of each subsection of Character Counter B and shift these three pulse positions earlier each time a corresponding character is read in.

To indicate which subregisters of the Buffer Registers F1 to F4 are available for receiving characters, the signals BA, BB and BC are generated. When the BA signal is generated, the subregisters of the Buffer Registers F1 to F4 reserved for Input Synchronizers A1 and A4 are available. When the signal BB is present the subregisters reserved for the Input Synchronizers A2 and A4 are available, and when the BC signal is present the subregisters associated with the Input Synchronizers A3 and A6 are available.

The generation of the BA, BB and BC signals is performed by the circuitry of the three-stage Ring Counter RC which comprises primarily the three flip-flops FBA, FBB and FBC.

Once each drum revolution, the master timing UC pulse is applied to buffer B2B via quarter pulse delay line D4B and to buffer B3B directly to insure synchronism of the Ring Counter RC with the timing signals and the drum rotation. The UC pulse, delayed one-quarter pulse time by delay line D4B to bring it to time IT1, sets flip-flop FBA. The UC pulse also resets flip-flop FBB, via buffer B3B, if it had been erroneously set. About one pulse time later, flip-flop FBC is reset by the coincidence of timing signal WA2 and the positive output BA of flip-flop FBA at gate G9B. Thus flip-flop FBA is set and flip-flops FBB and FBC are both reset at this time. Approximately forty-two pulse times after the UC pulse occurs, the timing pulses WA1 and WB1 occur simultaneously so that, in conjunction with the delayed BA signal (by means of three-quarter pulse time delay line D5B), they cause the output terminal of gate G5B to be positive and thus set flip-flop FBB generating the BB signal. Three-quarters pulse time later, the WA2 pulse in conjunction with the BB signal at gate G7B resets flip-flop FBA. Because of the three-quarter pulse time delay in delay line D6B, the BB signal does not open gate G6B until the WA1 and WB1 pulses, which had set flip-flop FBB, are no longer present. Flip-flop FBC is not set until the next time the WA1 and WB1 pulses coincide, i.e. forty-two pulse times later. One pulse time after flip-flop FBC is set, a WA2 pulse via gate G8B resets flip-flop FBB. Forty-two pulse times after flip-flop FBC is set, the WA1 and WB1 pulses again coincide and set flip-flop FBA through gate G4B and buffer B2B. The entire cycle now repeats with a total cycle time of one hundred twenty-six pulse times. Since the number of pulse times in a full drum revolution is an integral multiple of one hundred twenty-six, when the UC pulse next occurs, it finds flip-flop FBB already reset and merely duplicates the action of gate G4B in setting flip-flop FBA. Its function is to insure synchronism during initial starting transients or accidental mishaps. Thus, normally, shift from one of the signals BA, BB and BC to its successor occurs every forty-two pulse times. Therefore, normally, the Ring Counter RC steps from BA to BB to BC back to BA, etc., to indicate the sequential availability of the subregisters. It should be recalled that the BA, BB and BC signals are transmitted to the appropriate Input Synchronizers A1 to A6 to control the gating out of the characters to the appropriate subregisters of Buffer Registers F1 to F4.

In addition to locating the subregisters, it is necessary to locate the proper character positions within the subregisters. Before proceeding with this description, however, it is desirable to review the structure of the letter word. It will be recalled that the letter word comprises eighteen characters. The first twelve characters are concerned with the street address and these are the only characters required for an incoming pass, whereas the last six characters, which are concerned with the city and state, are required for an outgoing pass. Thus, on an incoming pass, it is only necessary to read in the first twelve characters while, on an outgoing pass, it is only necessary to read in the last six. However, to simplify the construction of the apparatus, on either pass all eighteen characters are read in. For an incoming pass, the first twelve characters are read in and, after the first twelve are read in, the next six are read in but are not transferred to the Buffer Registers F1 to F4; whereas, on an outgoing pass, the first twelve characters that are read are transferred to the Buffer Registers F1 to F4 but the last six characters are read into the Buffer Registers F1 to F4 to replace the second group of six that had been previously transferred.

The transfer of the characters from the Input Synchronizers A1 to A6 to the Buffer Registers F1 to F4 is controlled by pulses stored in a recirculating register which comprises one hundred twenty-one and one-quarter bit positions of magnetic drum storage on channel MD1, the magnetic reading head MD3, the BR signal line, the drum reading amplifier R1B, the one pulse time delay line D1B, the pulse amplifier P1B, the three and one-quarter pulse time delay line D2B, the gate G1B, the buffer B1B, the drum writing amplifier W1B, and the BW signal line which drives a magnetic writing head MD2. Delay line D1B is adjustable and serves as a more convenient way to adjust the overall delay of the loop to exactly one hundred twenty-six pulse times than mechanical repositioning of a magnetic head. This recirculation register has its three subsections operating synchronously with the three subregisters of each of the Buffer Registers F1 to F4 so that there is effectively a one to one correspondence between character positions in the subregisters and pulses in the subsections. Initially, pulses are stored in the P40 and P41 position of each subsection and, as each character is read in, the corresponding pulse is shifted three pulse times earlier in time, to mark a new character position in the chosen subregisters of the Buffer Registers F1 to F4. When this pulse is present at the output of pulse amplifier P1B and the 1° tap of delay line D2B, the BE and BD signals are respectively generated. These signals are fed to the Input Synchronizers A1 to A6 to initiate transfer of a character to the buffer registers as previously described. Since these pulses are shifted each time a character is inserted, the characters read in are transmitted to the inputs of the Buffer Registers F1 to F4 at different relative times or, in other words, the characters are inserted in different character positions of the Buffer Registers F1 to F4.

At the completion of reading of an envelope by one of the Photoelectric Readers PR, the KC signal is present at gate G1B and clears out the appropriate subsection of the recirculating register while the KB pulse is introduced into the P40 or P41 position via buffer B1B. These signals are generated in the Input Control K and are timed to correspond to the proper subregister. When the KC signal ends, the pulse introduced by KB continues to circulate in the register until the next envelope is read by the same reader. When an Input Synchronizer reads in one character, it causes the generation of a KA signal in the Input Control K. The KA signal is a series of pulses recurring every three pulse times which cause the pulse in the register corresponding to the character just read to bypass delay line D2B, appearing at gate G2B three pulse times earlier than it would normally have appeared at gate G1B, where it is now blocked by the −KA signal. The original pulse still appears at points BD and BE for use in controlling transfer to the Buffer Registers. It should be noted that the gate G1B is in the normal recirculation path of the Character Counter B, while the gate G2B is in a shift path. It should also be noted that only every third pulse position in the recirculating register is affected by this shifting operation. Thus, one of the initially inserted pulses henceforth occurs three pulse times earlier. It should further be noted that, as is elsewhere described, the KA signal only occurs for the appropriate subregister that is being loaded. After twelve such shifts, the twelve characters concerned with the street number, name, type and city section have been loaded. At this time, the shifted pulse occurs in synchronism with either the P4 or P5 position and is deleted by the action of the negative output of flip-flop F1B in blocking gate G2B. This flip-flop is set at pulse time IT5 by the coincidence of the WA5 and WB5 timing pulses and is reset three pulse times later by the WA2 timing pulse. During an incoming pass, this leaves no recirculating pulse in the corresponding subsection of the register and no further transfers from this Input Synchronizer occur. During an outgoing pass, the KB signal introduces a new pulse into the subsection at an intermediate point and transfers continue but into the same positions of the affected subregisters of the Buffer Registers F1 to F4 as were used for the seventh to twelfth characters of the letter word. In either type of pass, at the conclusion of transfer, the KB signal inserts a pulse into the P4 or P5 position of the related subsection of the register, which recirculates and appears at position BF at pulse time IT4 for Buffer Registers F1 and F2 and at pulse time IT5 for Buffer Register F3 and F4, to indicate that a transfer from the Buffer Registers to the Comparison Word Register C may be made. When such a transfer takes place, the VD signal is generated by the Buffer Register and Sorting Machine Selector at a suitable time. The —VD signal at gate G1B inhibits this pulse and the signal KB is again generated by the Input Control K. It is effective to insert a pulse into the proper pulse position in the subregister for the first character of the next letter word read into the appropriate Input Synchronizer.

INPUT CONTROL CIRCUIT K (FIG. 10)

The input control circuit K generates the KA signal, which causes the shifting in the Character Counter B; the KB signal which permits the insertion of a marking pulse into the Character Counter B as needed; and the KC signal, which causes the clearing of Character Counter B after the last character has been read from an envelope.

The KA signal is generated by the pulse amplifier PKA, which receives signals from the buffer B1K. The buffer B1K has input terminals respectively connected to the gates G1K to G6K. The gate G1K is associated with the Input Synchronizer A1. When the Input Synchronizer A1 has received a character from its reader PR1, it generates an AD1 signal. The AD1 signal alerts the gate G1K, which waits until the BA signal is generated by the Character Counter B. The BA signal indicates that the subregister associated with the Input Synchronizer A1 is available to receive information. The gate G2K is associated with Input Synchronizer A2. When Input Synchronizer A2 has received a character from reader PR2, it generates an AD2 signal. The AD2 signal alerts gate G2K which transmits a pulse when the BB signal is received. The occurrence of the BB signal indicates that the subregister associated with Input Synchronizer A2 is available to receive the character. The gates G3K, G4K, G5K and G6K are similarly associated respectively with the Input Synchronizers A3, A4, A5 and A6. The gate G7K and the gate G8K transmit timing pulses to the gates G1K to G6K to insure that the KA signals are generated at the appropriate times to perform the shifting in Character Counter B. There may be two or more pulses in the KA signal, but the timing of the AD1 to AD6 signals is such that one of them is sufficiently early to insert a shifted pulse and another follows to inhibit the original pulse in the Character Counter B, without interfering with the transfer from the Input Synchronizers to the Buffer Registers.

Figure 9:
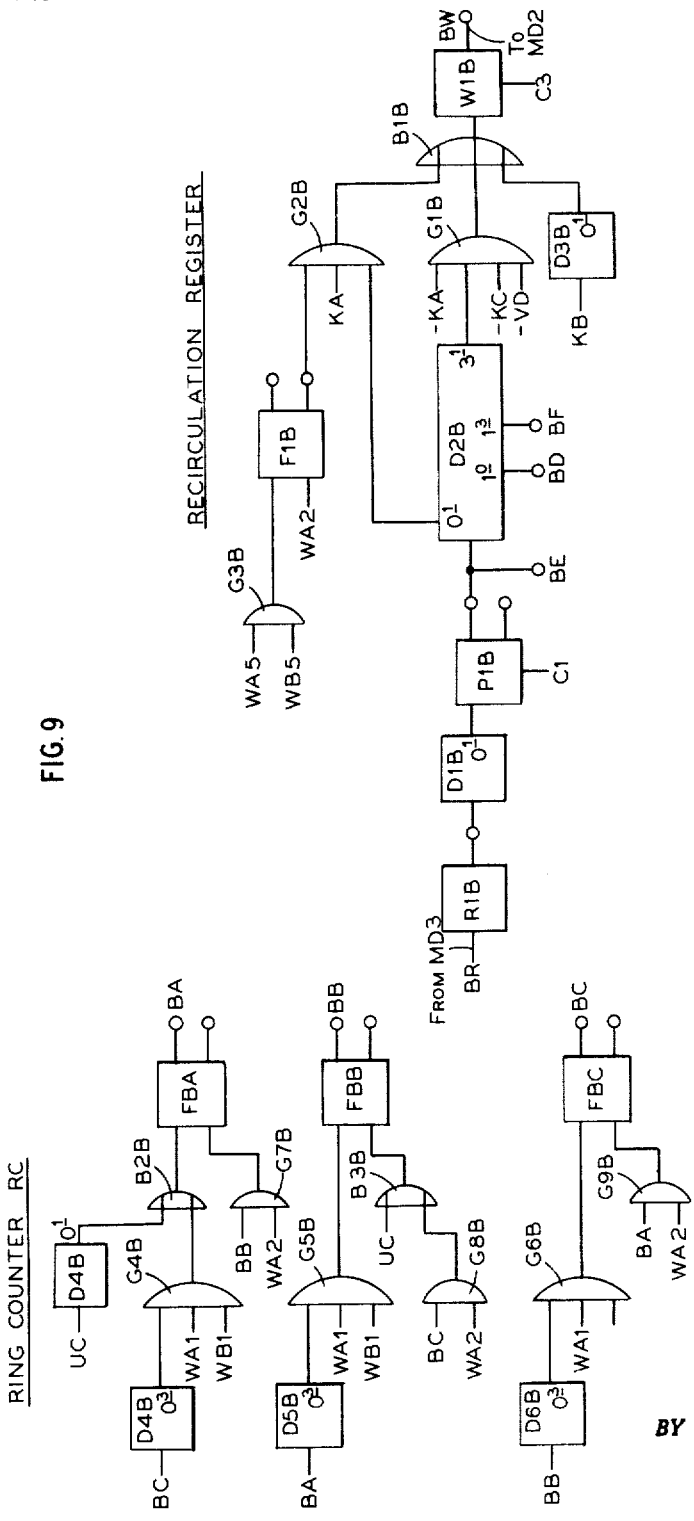
FIGURE 9 is a detailed view of the Character Counter B of FIGURE 1.
Figure 10:
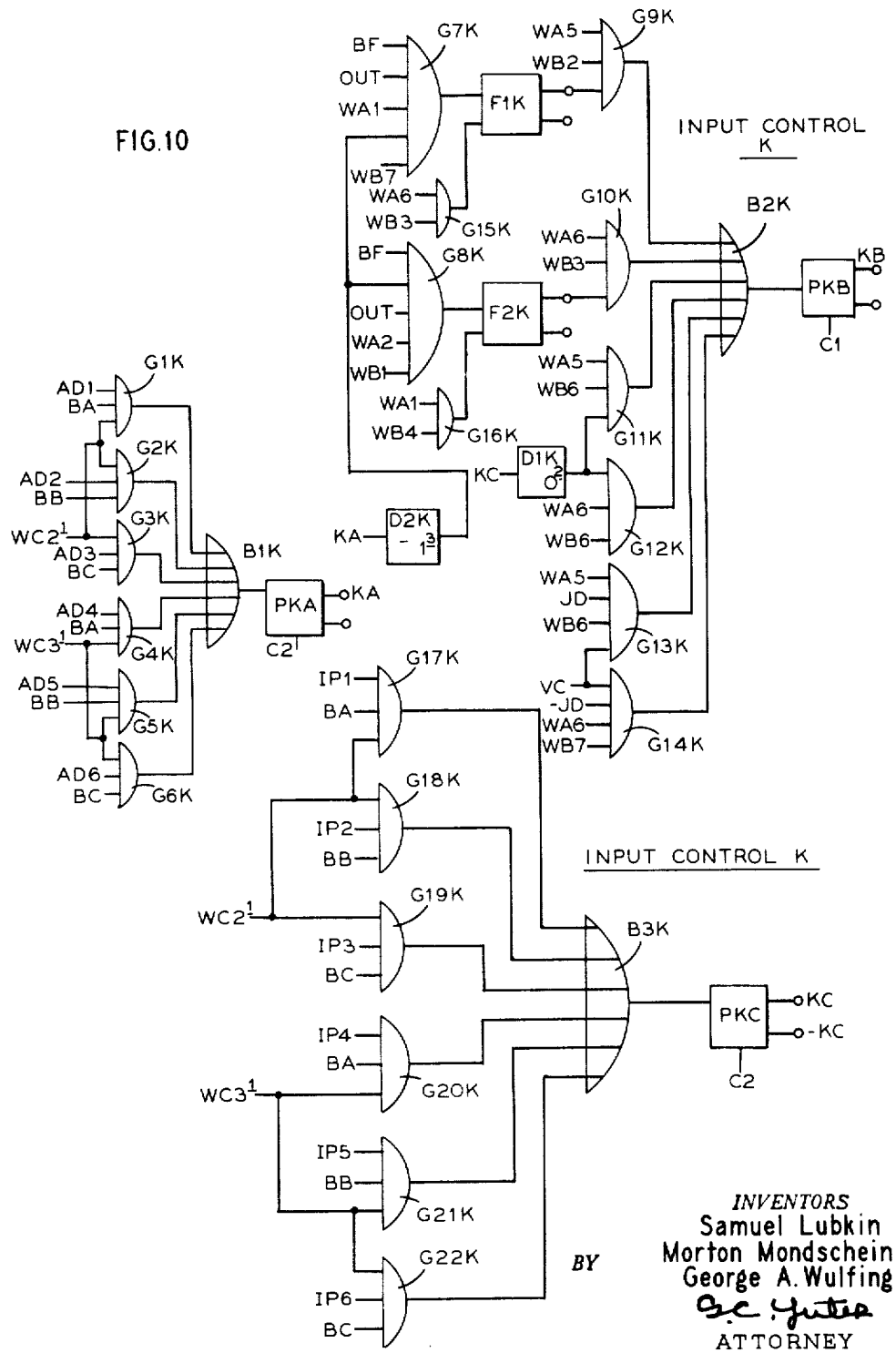
FIGURE 10 is a detailed representation of the Input Control K of FIGURE 1.
Figure 11:
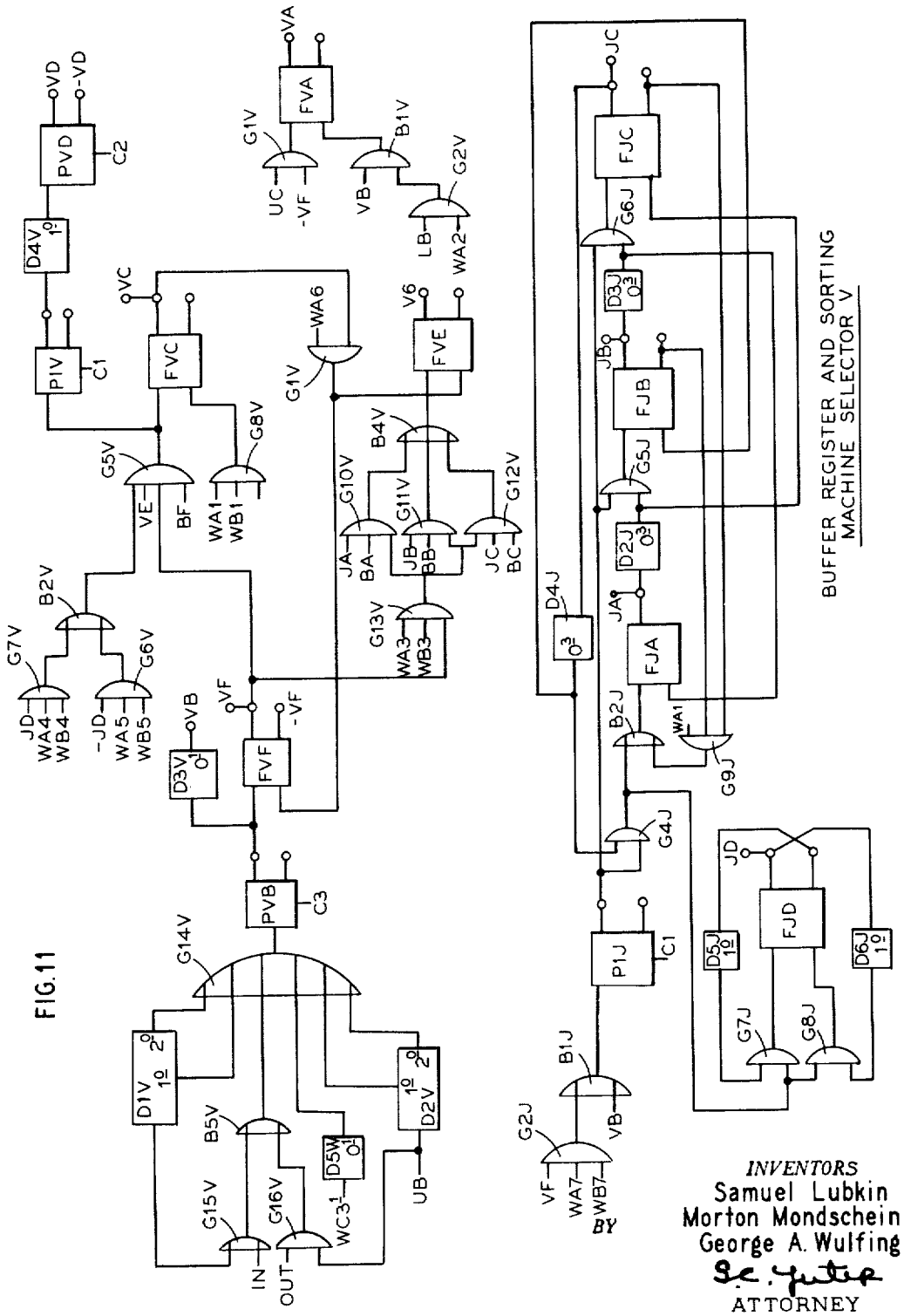
FIGURE 11 shows the details of the Buffer Register and Sorting Machine Selector V of FIGURE 1.
Figure 12:
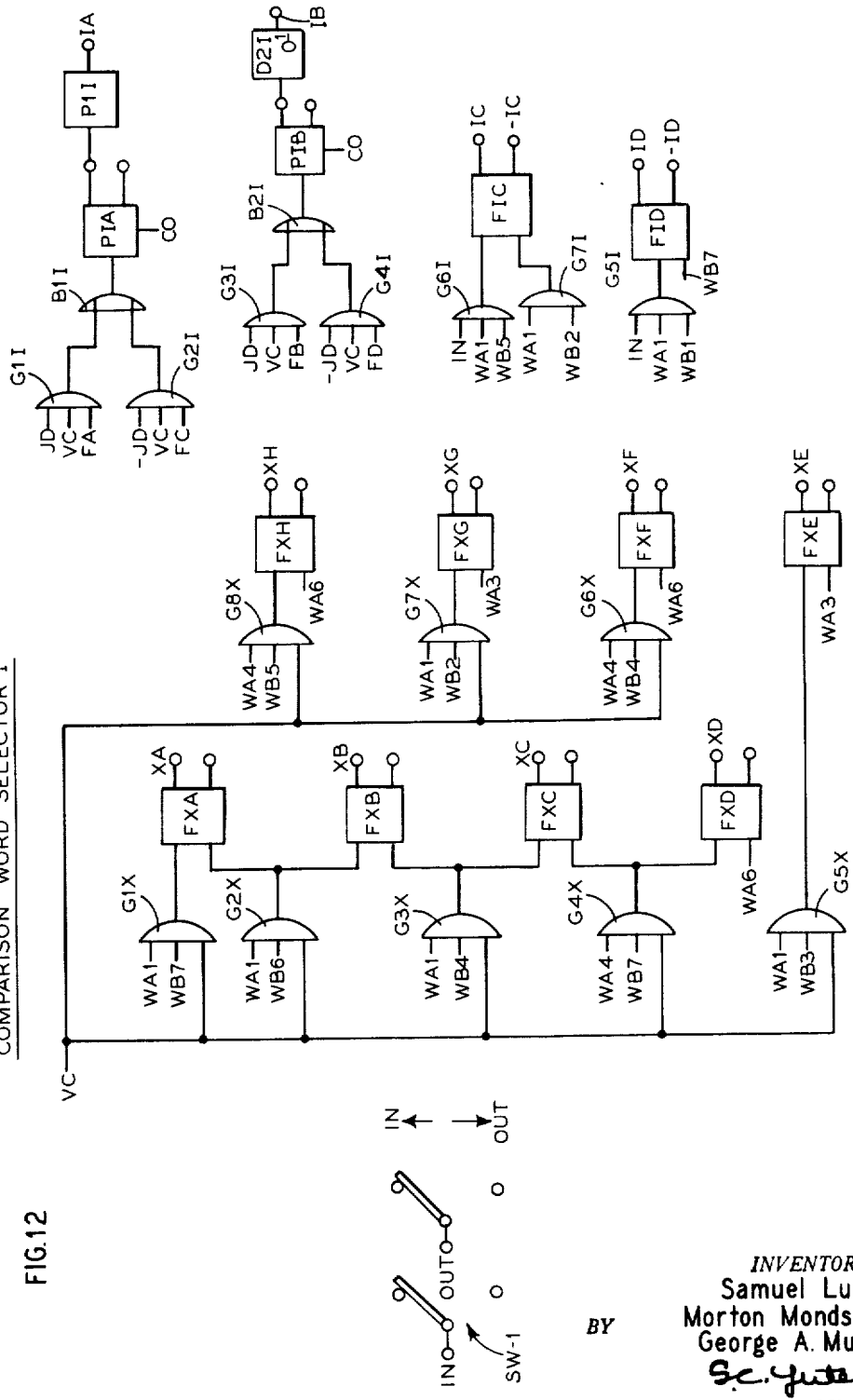
FIGURE 12 is a detailed representation of the Comparison Word Selector 1 of FIGURE 1.
Figure 13:
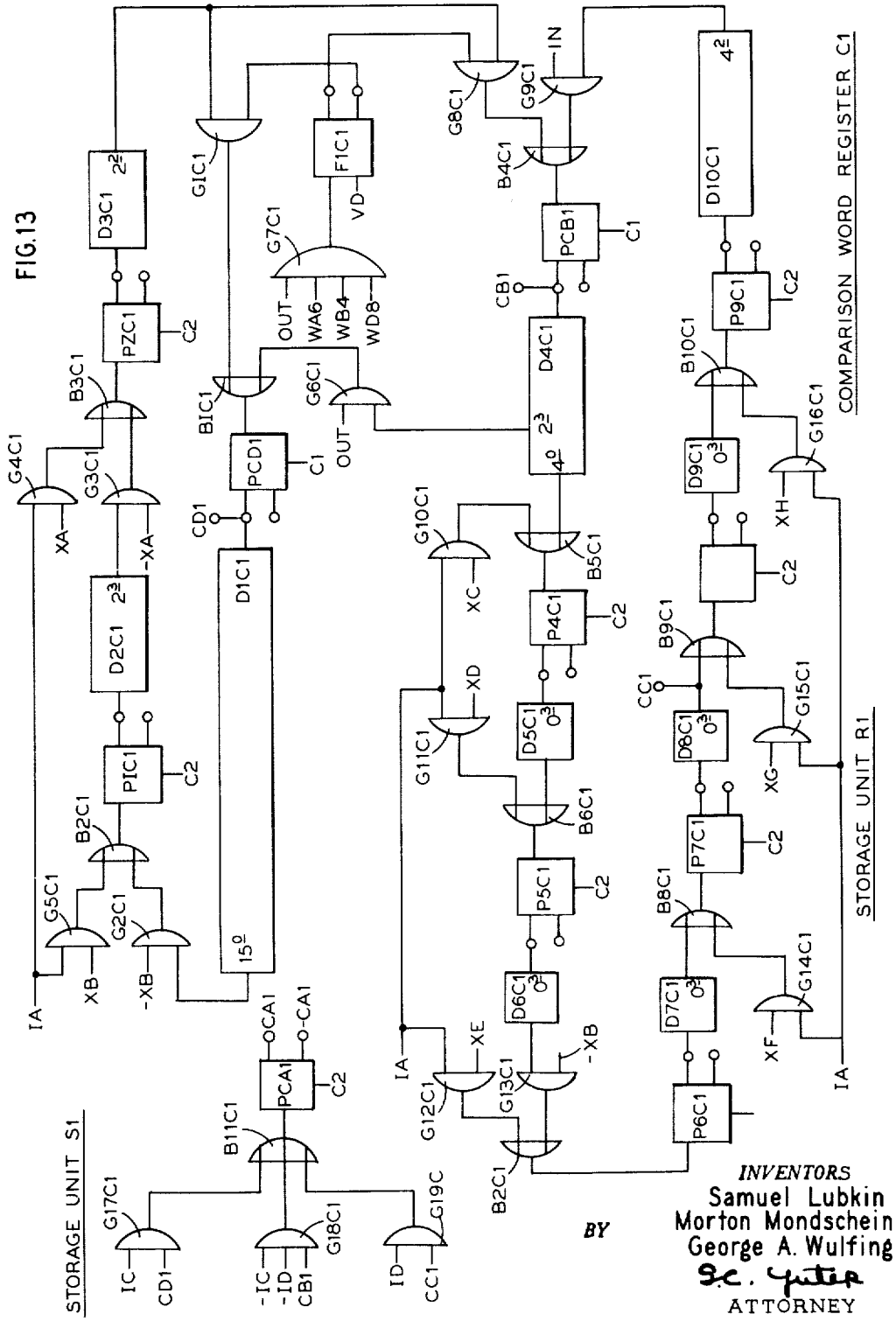
FIGURE 13 shows in greater detail the Comparison Word Registers C1 and C2 of FIGURE 1.
Figure 14:
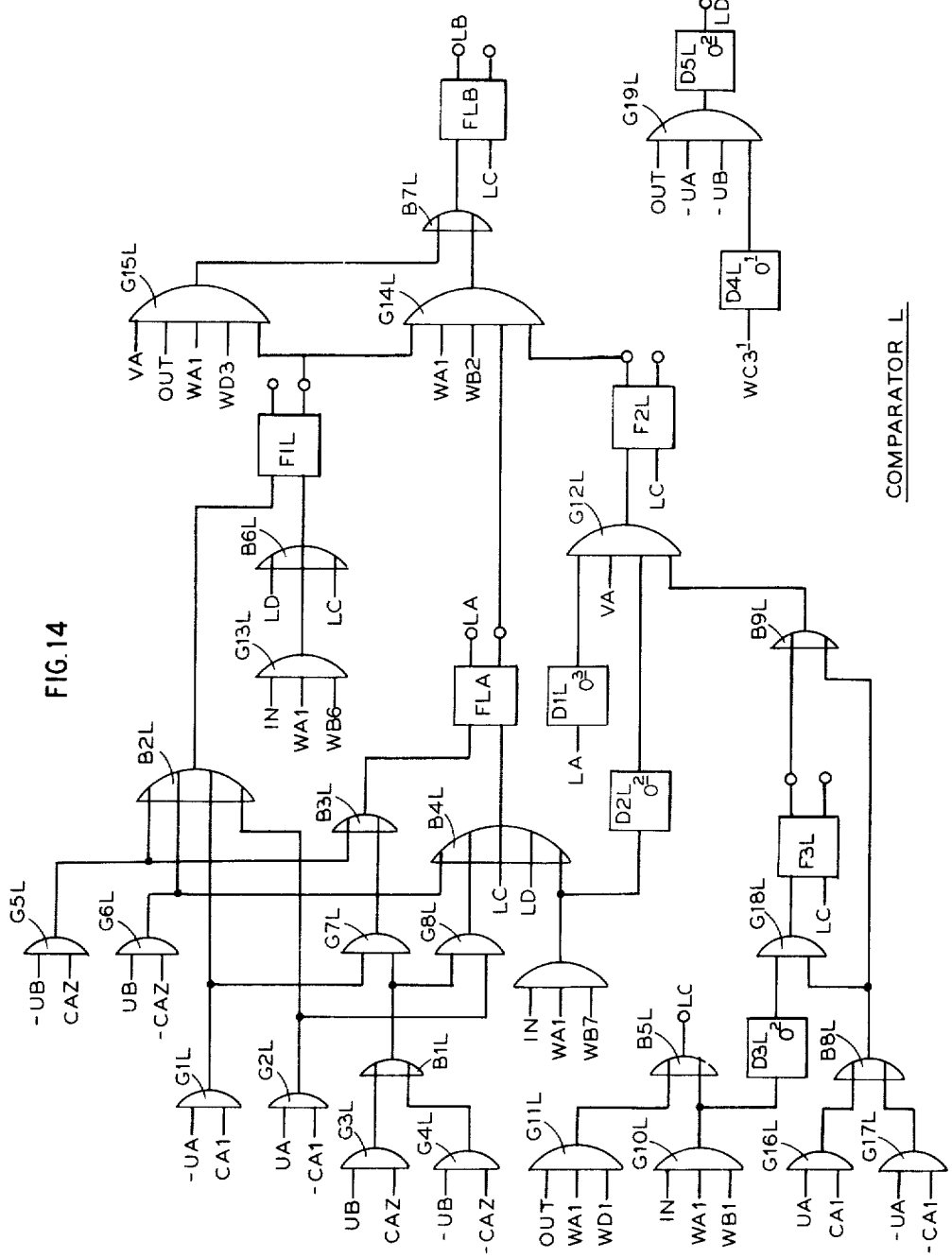
FIGURE 14 are the details of the Comparator L of FIGURE 1.
Figure 15:
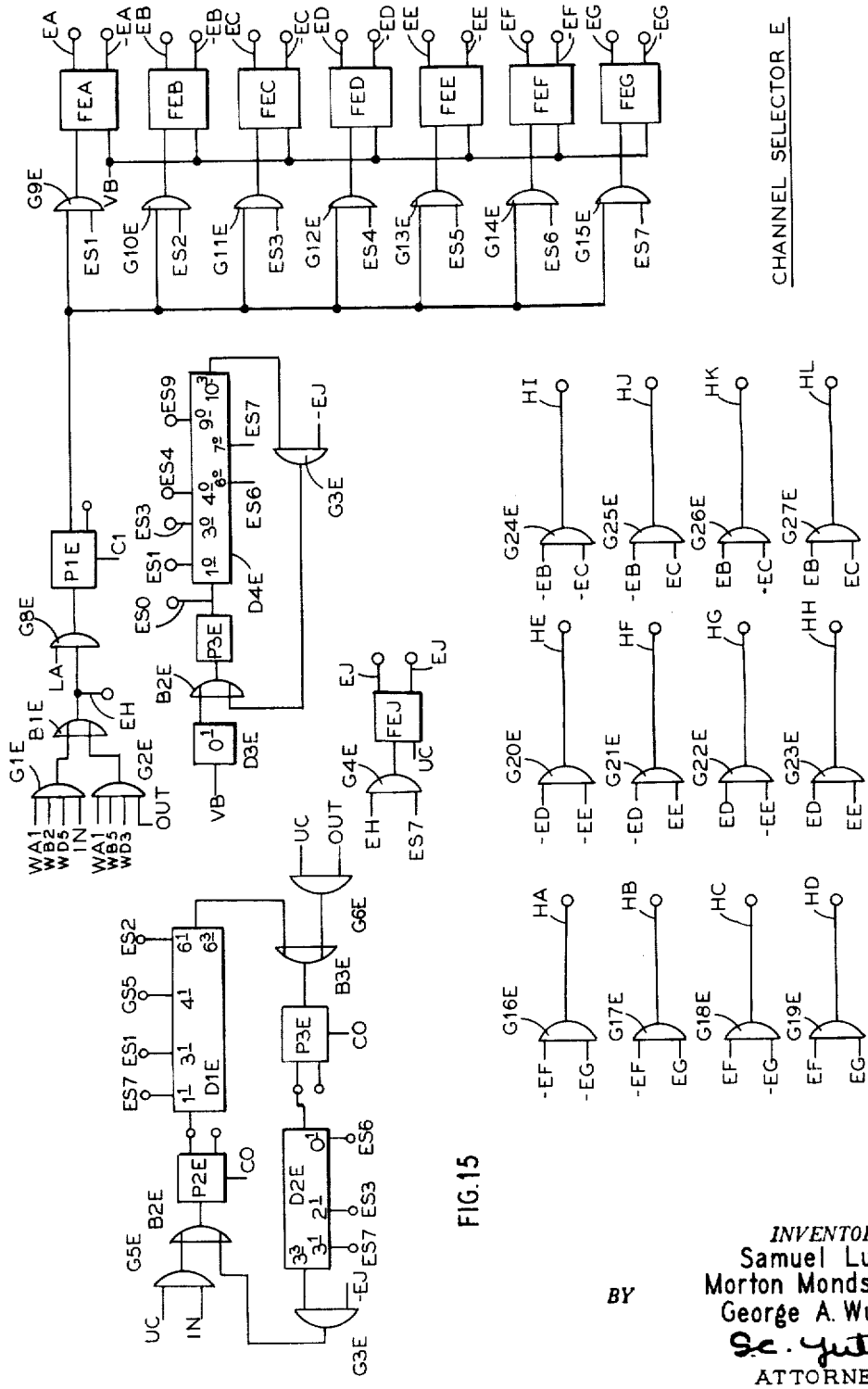
FIGURE 15 is a detailed view of the Channel Selector E of FIGURE 1.

As has been previously stated, during an outgoing pass, the first twelve characters read from an envelope are not significant, but are transferred to the Buffer Registers F1 to F4 none the less. The second six of these are then erased and superseded by the last six characters read into the Input Synchronizers. The fact that eleven characters have been transferred to the Buffer Registers F1 to F4 is indicated by the occurrence of a pulse at point BF in the Character Counter B (FIG. 9) at time IT7 as indicated by the coincidence of timing pulses WA1 and WB7, for Buffer Registers F1 and F2; or at time IT8, as indicated by the coincidence of timing pulses WA2 and WB1, for Buffer Registers F3 and F4. In the first case, when the twelfth character is entered, the KA signal is a series of pulses at $WC2^1$ time. This, delayed by one and three-quarters pulse times in delay line D2K sets flip-flop F1K through gate G7K. Flip-flop F1K gates a pulse at time IT23, corresponding to the coincidence of WA5 and WB2 pulses through gate G9K, buffer B2K, and pulse amplifier PKB to generate a KB signal at time $IT23^1$. In the second case, when the twelfth character is entered, the KA signal is a series of pulses at $WC3^1$ time. This, delayed by delay line D2K sets flip-flop F2K through gate G8K. Flip-flop F2K gates a pulse at time IT24, corresponding to the coincidence of WA6 and WB3 pulses through gate G10K, buffer B2K, and pulse amplifier PKB to generate a KB signal at time $IT24^1$. Flip-flops F1K and F2K are reset by timing pulses at gates G15K and G16K at a convenient time after they gate the KB signal. The KB signal is also generated at the proper pulse time for the Buffer Register concerned, when the corresponding part of Character Counter B is cleared by the series of KC pulses after the last character has been read from an envelope. This is done through gates G11K and G12K, which pass the delayed KC pulse when it coincides with pulse times IT5 or IT6. Finally, the KB signal is again generated at pulse time $IT41^1$ when a word is read from the Buffer Registers F1 and F2 into the comparison Word Registers C1 and C2 or at pulse time $IT4^2$ when a word is read from the buffer Registers F3 and F4 into the Comparison Word Registers C1 and C2. The VC signal, generated in the Buffer Register and Sorting Machine Selector V, indicates the transfer of a new word into the Comparison Word Registers C1 and C2. The JD signal indicates that this transfer was from Buffer Registers F1 and F2 whereas the —JD signal indicates that the transfer was from Buffer registers F3 and F4. These signals cause the transmission of the proper timing pulse from either gate G13K or gate G14K through buffer B2K to pulse amplifier BKB.

Shortly after the last character has been read from an envelope in Sorting Machine 1, the corresponding reader emits the IP1 signal. When the subregister associated with Input Synchronizer A1 is in position to receive information, as evidenced by the generation of the BA signal by the Character Counter B, gate G17K passes a series of $WC2^1$ pulses which generate KC pulses every third pulse time via buffer B3K and pulse amplifier PKC. The negative output of pulse amplifier PKC, designated as signal —KC, clears any pulse in the Control Counter B from positions corresponding to transfer of characters from Input Synchronizer A1 to Buffer Registers F1 and F2. This clearing removes the pulses remaining in the Control Counter B at the end of reading during an outgoing pass and also serves to clear the Character Counter B of any pulses accidentally introduced when the machine is first started or as a result of defective reading of characters. Gates G18K to G21K correspond to Input Synchronizers A2 to A6 and generate KC pulses for clearing the portion of Control Counter B corresponding to the subregisters storing characters read by these Input Synchronizers.

BUFFER REGISTER AND SORTING MACHINE SELECTOR V (FIG. 11)

The first function of the Buffer Register and Sorting Machine Selector V is to control the time of the transfer of the contents of any of the subregisters of the Buffer Registers F1 to F4 to the Comparison Word Registers C1 and C2. Since the pairs of subregisters of Buffer Registers F1 to F4 are asynchronously loaded, it is necessary to sequentially check to see which pairs of subregisters is completely loaded and to transfer the contents of the completely loaded pair of subregisters to the Comparison Word Registers C1 and C2. In general, there is a test to see whether the pair of subregisters associated with Input Synchronizer A1 which services the Sorting Machine 1 is completely loaded. If these subregisters are loaded, the letter word stored therein is transferred to the Comparison Word Registers C1 and C2 to await comparison with the drum words stored on the Magnetic Drum MD. When the comparison is successfully completed, the subregisters associated with Input Synchronizer A2 are tested for a complete loading, and if such is the case, the contents of these subregisters are transferred to the Comparison Word Registers C1 and C2. If, however, these subregisters are not completely loaded, the Buffer Register and Sorting Machine Selector V steps to determine whether the subregisters associated with Input Synchronizer A3 are completely loaded.

In other words, the Buffer Register and Sorting Machine Selector V cyclically goes through six steps, first checking the contents of the subregisters associated with Input Synchronizer A1, then those for Input Synchronizer A2, etc. Whenever it finds a pair of subregisters completely loaded, the stepping is temporarily halted and the contents of the completely loaded pair of subregisters is transferred to the Comparison Word Registers C1 and C2 to await the start of a comparison cycle. When the comparison is successfully completed, the stepping is resumed. Thus, in spite of the fact that the subregisters of the Buffer Registers F1 to F4 are randomly loaded, it is assured that each is unloaded whenever filled.

At the same time that the contents of the selected pair of subregisters is being transferred to the Comparison Word Registers C1 and C2 signals are generated to alert the associated one of the Bin Location Solenoid Actuators G1 to G6 to receive the information related to the appropriate bin number when the successful comparison is performed with the transferred contents of the pair of subregisters.

More particularly, the Buffer Register and Sorting Machine Selector V includes a three-stage ring counter comprising the flip-flops FJA, FJB and FJC, and their associated circuitry. It also includes the binary counter FJD and its associated circuitry. Briefly, at some stage, the ring counter is set up with the flip-flop FJA in the set condition and the flip-flops FJB, FJC and FJD in the reset condition. This state of the flip-flops FJA to FJD is associated with the Sorting Machine 1, Input Synchronizer A1, a first pair of subregisters in Buffer Registers F1 and F2, and Bin Location Solenoid Actuator G1. The next step causes the setting of the flip-flop FJB and the resetting of the FJA flip-flop. The state of the flip-flops is now related to the Sorting Machine 2, Input Synchronizer A2, a second pair of subregisters in Buffer Registers F1 and F2, and Bin Location Solenoid Actuator G2. The third step in the cycle causes the setting of the flip-flop FJC and the resetting of the flip-flop FJB. This state of the flip-flops is associated with Sorting Machine 3, Input Synchronizer A3, a third pair of subregisters in Buffer Registers F1 and F2. The next step in the cycle causes the setting of the flip-flop FJD and the flip-flop FJA along with the resetting of the flip-flop FJC. This state of the flip-flops is related to Sorting Machine 4, Input Synchronizer A4, a first pair of subregisters in Buffer Registers F3 and F4, and Bin Location Solenoid Actuator G4. The next step in the cycle causes the setting of the flip-flop FJB and the resetting of the flip-flop FJA. This state is associated with Sorting Machine 5, Input Synchronizer A5, a second pair of subregisters in Buffer Registers F3 and F4 and Bin Location Solenoid Actuator G5. The last step in the cycle is the setting of the flip-flop FJC and the resetting of the flip-flop FJB. This state is associated with Input Synchronizer A6, the third pair of subregisters in Buffer Registers F3 and F4, and Bin Location Solenoid Actuator G6. The next step in the cycle causes the setting of the flip-flop FJA and the resetting of the flip-flops FJC and FJD and the state is identical to the first described step and is therefore associated with Sorting Machine 1, etc.

Initially when power is turned on, the flip-flops FJA, FJB, FJC and FJD may be set in random fashion. Since, however, after the short delays caused by delay lines D2J, D3J, and D4J; flip-flop FJB, if set, resets flip-flop FJA; flip-flop FJC, if set, resets flip-flop FJB; and flip-flop FJA, if set, resets flip-flop FJC. Hence, no two of flip-flops FJA, FJB and FJC remain set simultaneously except momentarily. Furthermore, if both flip-flop FJB and flip-flop FJC are reset, this causes flip-flop FJA to set at the next WA1 timing pulse via gate G9J and buffer B2J. Hence, the three flip-flops FJA, FJB, and FJC cannot all remain in the reset state except for an initial very short period. Thus, after a few pulse times, one of the three flip-flops FJA, FJB, and FJC is set and the remaining two are reset. Flip-flop FJD may initially be either set or reset. The circuit therefore rapidly assumes one of the six states already described, after which it steps to successive states as will be subsequently described.

Assume that the circuit is in the first state, namely that the flip-flop FJA is set and the flip-flops FJB, FJC and FJD are reset. Although flip-flop FJA is obtaining periodic set pulses from gate G9J via buffer B2J, this does not change the situation since flip-flop FJA is already set. After a series of comparisons has been completed, the special character marking the end of comparison words applicable to the type of pass is read from the drum. This is detected by the circuitry generating the VB signal. The information from the Magnetic Drum MD is received as the UA and UB signals, via the Drum Reading Circuits M by the delay lines D1V and D2V. These delay lines changes the serially read information to parallel information so that the bits may be tested for the unique combinations associated with either the incoming pass or the outgoing pass. The WC3$^1$ signal, transmitted via the quarter pulse time delay line D5V to the gate G14V, determines the time of sampling. If during the occurrence of the WC3$^1$ signal, the proper coded combinations of bits is present at the remaining input terminals of the gate G14V, a pulse passes through to pulse amplifier PVB to generate the VB signal indicating completion of the comparison cycle.

It is necessary to insure that successful comparison signals are not acted upon except when they result from a full comparison cycle with a new word in the Comparison Word Registers C1 and C2. The VA signal is used to indicate that the necessary conditions are fulfilled. Flip-flop FVA is reset each drum revolution at the end of the comparison cycle by pulse VB, acting through buffer B1V. Flip-flop FVA is also reset immediately following a successful comparison as evidenced by the presence of signal LB which passes a WA2 pulse through gate G2V and buffer B1V. Flip-flop FVA is set by the UC pulse marking the beginning of a comparison cycle provided the absence of the −VF signal at gate G1V indicates that a new letter word had been transferred to the Comparison Word Registers C1 and C2. The VB pulse passes through buffer B1J to pulse amplifier P1J. Pulse amplifier P1J transmits a pulse to the gates G4J, G5J and G6J. At this time, flip-flop FJA is set and the pulse passes through gate G5J to set flip-flop FJB. Three-quarters of a pulse time later, the output terminal of three-quarter pulse time delay line D3J is fed back to reset the flip-flop FJA. If, at this time, the second pair of subregisters of Buffer Registers F1 and F2 is completely loaded, the contents of these subregisters will be transferred to the Comparison Word Registers C1 and C2 to await a comparison cycle. At the end of this cycle, the VB signal is again received at the buffer B1J and actuates the pulse amplifier P1J. This pulse is received by first input terminals of the gates G4J, G5J and G6J. Since the flip-flop FJB is set, the second input of the gate G6J is positive, causing the pulse to set the flip-flop FJC, which transmits a positive signal to the delay line D4J. Three-quarters of a pulse time later, the output terminal of the delay line D4J goes positive to reset the flip-flop FJB via the buffer B3J. The contents of the third pair of subregisters in the Buffer Registers F1 and F2 are now considered for transfer to the Comparison Word Registers C1 and C2. Assume, however, that this pair of subregisters are not completely loaded. Then, as is hereinafter described, the VC signal will be present at the gate G2J during the occurrence of the timing pulses WA7 and WB7. Therefore, a timing pulse passes through the gate G2J and the buffer B1J to cause the pulse amplifier P1J to transmit its fourth stepping pulse. This fourth stepping pulse passes through the gate G4J, since the flip-flop FJC is set and, therefore, the second input terminal of the gate G4J is positive. The flip-flop FJA sets and causes the resetting of the flip-flop FJC via the buffer B4J which has one input terminal connected to the output terminal of the delay line D2J. It should be noted, though, at the same time the pulse passes through gate G4J to buffer B2J it also is transmitted to first input terminals of the gates G7J and G8J. Up until this time, the flip-flop FJD has been in the reset condition. Therefore, there is a positive voltage present at the second input terminal of the gate G7J and a negative voltage present at the second input terminal of the gate G8J. Therefore, the pulse passes through the gate G7J to set the flip-flop FJD. Since the flip-flops FJA and FJD are both set, the contents of the first pair of subregisters of Buffer Registers F3 and F4 are considered for transfer to the Comparison Word Registers C1 and C2. If these subregisters are completely loaded, their contents are transferred to the Comparison Word Registers C1 and C2 and a comparison cycle occurs. At the end of the comparison cycle, the VB signal is generated to again step the flip-flops FJA to FJD to their next state. If the corresponding subregisters are not completely filled, the VF signal will be present at the gate G2J, causing the flip-flop FJB to set and the FJA flip-flop to reset, as previously described. The next step causes the flip-flop FJC to set and the flip-flop FJB to reset, as previously described. The next step causes the flip-flop FJA to again set and the flip-flop FJC to reset. It should be noted that, at this time, the pulse that sets the flip-flop FJA passes through the gate G4J and is therefore also transmitted to the gates G7J and G8J. Since the flip-flop FJD is set, the pulse passes through the gate G8J and the buffer B5J to reset the flip-flop FJD. The state of the flip-flops FJA to FJD is now back to the first step of the cycle and the contents of the first pair of subregisters of Buffer Registers F1 and F2 are again ready to be transferred to the Comparison Word Registers C1 and C2. In this manner, the contents of the pairs of subregisters in the Buffer Registers F1 to F4 are continually and sequentially transferred to the Comparison Word Registers C1 and C2. Similarly, in this manner, if one of the pairs of subregisters is not completely filled and ready for a transfer, it is stepped over and the transfer is attemped for the next pair of subregisters.

In summary, then, it may be said that the JA signal generated by flip-flop FJA is associated with the Sorting Machines 1 and 4; the JB signal generated by the flip-flop FJB is associated with the Sorting Machines 2 and 5, and the JC signal generated by the flip-flop FJC is associated with the Sorting Machines 3 and 6. To distinguish which one of a pair of Sorting Machines each of the flip-flops controls at one time, use is made of the JD signals generated by the flip-flop FJD. In particular, the set state of the flip-flop FJD and, accordingly, the presence of the JD signal indicates that one of the pairs of subregisters respectively associated with Sorting Machines 1, 2 or 3 will be chosen and the reset state of the flip-flop FJD with the absence of the JD signal indicates that the chosen subregisters will be associated with the Sorting Machines 4, 5 or 6.

While the flip-flops JA to JD select which of the subregisters is to transfer its contents to the Comparison Word Registers C1 and C2, it is still necessary to determine whether the selected pair of subregisters are completely loaded and, if not, to prevent the transfer and cause the stepping of the selection to the next pair of subregisters. The circuitry associated with the flip-flops FVF, FVC and FVE performs this function. In particular, at the end of a comparison cycle, the VB signal sets the flip-flop FVF. A positive signal VF from the positive output terminal of flip-flop FVF is transmitted to the gate G5V and gate G13V. The presence of the VF signal at gate G13V causes the periodic transmission of timing pulses to the gates G10V, G11V and G12V. It should be noted that the gate G10V also receives the JA and BA signals, the gate G11V the JB and BB signals, and the gate G12V the JC and BC signals. The JA signal indicates that it is desired to transfer the contents of the pairs of subregisters associated with Sorting Machines 1 and 4. The JB signal indicates it is desired to transfer the contents of the subregisters associated with Sorting Machines 2 and 5, and the JC signal indicates that it is desired to transfer the contents of the subregisters associated with Sorting Machines 3 and 6. Furthermore, the BA signal indicates that the pairs of subregisters associated with Sorting Machines 1 and 4 are in position for transfer, the BB signal indicates the same for the pairs of subregisters associated with Sorting Machines 2 and 5, and the BC signal indicates the same for the pairs of subregisters associated with Sorting Machines 3 and 6. Accordingly, if the JA signal is present, then, during the generation of the BA signal, a pulse passes through gate G10V and buffer B4V to set flip-flop FVE. The VE signal generated by flip-flop FVE indicates that the selected two pairs of subregisters are available for transfer, but they are not necessarily completely loaded. The VE signal is received at gate G4V, which actually samples to see whether the subregisters are completely loaded. If the subregisters are completely loaded, the BF signal from the Character Counter B will be present at the appropriate time as determined by the timing pulses on the gates G7V and G6V which are transmitted via the buffer B2V to the gate G5V. It should be noted that the VE signal notes the availability of two pairs of subregisters. The final choice of one of these pairs is determined by the presence or absence of the JD and −JD signals respectively transmitted to input terminals of the timing gates G6V and G7V.

Thus, when the chosen pair of subregisters are available and completely loaded at the end of a successful comparison, a pulse passes through the gate G5V to set the flip-flop FVC. The same pulse is amplified by pulse amplifier P1V, then delayed suitably by delay line D4V and reshaped and timed by pulse amplifier PVD to generate pulse −VD at the proper time for use in the Character Counter B to erase the circulating pulse which had initiated the process when it was at point BF. The VC signal is transmitted to the Comparison Word Selector J to cause the actual transfer of the contents of the selected subregisters of the Buffer Registers F1 to F4 to the Comparison Word Registers C1 and C2. In addition, the VC signal resets the flip-flop FVD and the flip-flop FVA through gate G1V. Flip-flop FVC is reset at the end of the transfer by timing signals WA1 and WB1 at gate G8V.

If, however, the flip-flop FVC is not set, then the VC signal is not generated and there is no transfer from Buffer Registers F1 to F4 to the Comparison Word Registers C1 and C2 via Comparison Word Selector I and the flip-flops FVE and FVF remain set and generating respectively the VE and VF signals. Therefore, the VF signal is present at the gate G2J as previously described, causing another step in the stepping cycle of the flip-flops JA to JD.

COMPARISON WORD SELECTOR I (FIG. 12)

The Comparison Word Selector I controls the transfer of information from the Buffer Registers F1 to F4 to the Comparison Word Registers C1 and C2. The information is received from the Buffer Registers F1 to F4 respectively as the FA, FB, FC, and FD signals, and is transferred to the Comparison Word Registers C1 and C2 as the IA and IB signals. The IA signals represent the odd bits of each character, while the IB signals represent the even bits of the characters. In general, the information is continuously transmitted from the Buffer Registers F1 to F4 to the Comparison Word Selector I until a pair of subregisters of the Buffer Registers F1 to F4 are completely loaded and ready to transfer and the comparison cycle for the word already in the Comparison Word Registers C1 and C2 has been completed. At that time, signals from the Buffer Register and Sorting Machine Selector V are received by the Comparison Word Selector I to cause it to transfer to the Comparison Word Registers C1 and C2 whatever information is then being received. This information is the word then being transferred from the Buffer Registers F1 to F4.

In particular, after completion of a comparison cycle, using the previous word in the Comparison Word Registers C1 and C2, a VC signal from the Buffer Register and Sorting Machine Selector V is received at gates G1I, G2I, G3I and G4I. Therefore, whatever information is passing through the gates G1I and G2I and the buffer B1I is transmitted to pulse amplifier PIA and from there transmitted as the IA signals to the Comparison Word Register C1 after one-quarter pulse time delay by delay line D1I. At the same time, whatever information is passing via the buffer B2I from the gates G3I and G4I is transmitted to the pulse amplifier PIB and delay line D2I to become the IB signals, which are similarly transferred to the Comparison Word Register C2. It should be noted that the IA signals represent the odd bits of the characters transferred and that the IB signals represent the even bits of the characters.

More particularly, the gate G1I receives, as the FA signals, the odd bits of the characters assembled in the Buffer Register F1 which services the Input Synchronizers A1, A2 and A3. Similarly, the gate G2I receives, as the FC signals, the contents of the Buffer Register F3 which stores the odd bits of the characters assembled by the Input Synchronizers A4, A5 and A6. In like manner, the gate G3I receives the FB signal from the Buffer Register F2, which stores the even bits of the characters read in via the Input Synchronizers A1, A2 and A3 and the gate G4I receives, as the FD signals, the even bits of the characters read in by the Input Synchronizers A4, A5 and A6. The JD and minus JD signals received by the gates G1I to G4I control whether the characters from the Input Synchronizers A1, A2 and A3 or the characters from the Input Synchronizers A4, A5 and A6 are transferred from the Buffer Registers F1 to F4 to the Comparison Word Registers C1 and C2. If the JD signal is present, the gates G1I and G3I are alerted and the information being transferred will be from the Buffer Registers F1 and F2, whereas if the JD signal is absent, then the minus JD signals will be positive and the gates G2I and G4I will be alerted so that the information from the Buffer Registers F3 and F4 is transferred to the Comparison Word Registers C1 and C2.

When the transfer of a letter word from a pair of subregisters of the Buffer Registers F1 to F4 to the Comparison Word Registers C1 and C2 is to occur, a VC signal is generated in the Buffer Register and Sorting Machine Selector V, causing the sequential generation of signals XA, XB, XC, XD, XE, XF, XG, XH. These signals occur sequentially, the last six at intervals of three pulse times. Signal XA has a duration of six pulse times; signal XB of twelve pulse times and each of the last six has a duration of two pulse times. At IT7 time, indicated by the coincidence of the WA1 and WB7 timing signals, a pulse passes through the gate G1X to set the flip-flop FXA, causing the generation of the XA signal. Six pulse times later, at time IT13, the coincidence of the WA1 and WB6 timing signals causes a pulse to pass through the gate G2X. This pulse is received at the set terminal of the flip-flop FXB to turn the flip-flop FXB on, causing the generation of the XB signal. Twelve pulse times later, a pulse passes through the gate G3X, causing the resetting of the flip-flop FXB and the setting of the flip-flop FXC. Flip-flop FXC is reset two pulse times later, by timing pulse WA3. The gate G4X controls the setting of the flip-flop FXD three pulse times after flip-flop FXC was set. Flip-flop FXD is reset two pulse times later by timing pulse WA6. The gate G5X controls the setting of the flip-flop FXE three pulse times after flip-flop FXD was set. Flip-flop FXE is reset two pulse times later by timing pulse WA3. In like manner, a pulse passed by the gate G6X sets the flip-flop FXF at time IT34. Three pulse times later, the gate G7X transmits a pulse which sets the flip-flop FXG. Three pulse times later, the gate G8X transmits a pulse which sets the flip-flop FXH. Each of flip-flops FXC, FXD, FXE, FXF, and FXH are reset two pulse times after they are set by either the WA3 or WA6 timing pulses. The XA to XH signals, since they occur sequentially, permit the sequential loading of the storage units in the Comparison Word Registers C1 and C2.

Included in the Comparison Word Selector I is the switch SWI which is a double pole, double throw switch. The switch SWI is manually operated and positioned either in the in or out modes. When there is an incoming pass, the switch SWI is moved into the up position so that the IN signal is positive and the OUT signal is negative. During an outgoing pass, the switch SWI is in the down position, causing the IN signal to be negative and the OUT signal to be positive.

The IN signal is applied to gates G5I and G6I which control the set lines to flip-flops FIC and FID. On an outgoing pass, these gates remain closed and both flip-flops remain reset except possibly for a transient period during starting of the machine until the timing signals on the reset lines of the flip-flops first appear. On an incoming pass, the WA1 and WB1 timing signals go through gate G5I to set flip-flop FID at the beginning (time IT1) of each word. Flip-flop FID remains set for six pulse times until timing pulse WB7 resets it, after which it remains set until the start of the next word. At time IT19, the coincidence of timing pulses WA1 and WB5 at gate G6I sets flip-flop FIC which remains set until time IT37 when the coincidence of timing pulses WA1 and WB2 at gate G9I resets it. The IC and ID signals serve to control the point within the storage from which the output of the Comparison Word Registers C1 and C2 are read.

COMPARISON WORD REGISTERS C1 AND C2 (FIG. 13)

The Comparison Word Registers C1 and C2 receive the letter words from the Buffer Registers F1 and F4 via the Comparison Word Selector I and temporarily store a letter word while comparisons are being made with the drum words permanently stored on the Magnetic Drum MD. In addition to storing this letter word, the Comparison Word Registers C1 and C2 reorganize and compress the letter word so as to be compatible with the drum words. The drum words are stored in pairs of registers in twin channels on the drum word portion of the magnetic drum. The odd bits of each character are stored in one register of one channel, and the even bits are stored in a parallel register of a second channel. Similarly, the letter word has the odd bits of its characters stored in one subregister, and the even bits stored in another subregister of the Buffer Registers F1 to F4. Accordingly, the Comparison Word Registers C1 and C2 comprise a Comparison Word Register C1 which stores the odd bits, and a Comparison Word Register C2 which stores the even bits. Furthermore, in spite of the fact that each character of the letter word is assigned six bit positions, the street number portion, since it is purely numeric, only requires four bit positions to encode the digits from 0 to 9. Accordingly, the street address portion of the drum words comprises only four bits per digit. Therefore, it is necessary to compress the six bits of the characters of the street number portion of the letter words received from the buffer storages F1 to F4 to four bits per character. The Comparison Word Registers C1 and C2 perform this function. Furthermore, since the length of the letter word for an incoming pass is greater than the letter word for an outgoing pass, there is provision for changing the length of each of the Comparison Word Registers C1 and C2 so that they may be used either for incoming passes or outgoing passes. In addition, since the letter word, as originally read by the Input Synchronizers A1 to A6, may have been assembled in the Buffer Registers in a different order than that required by the Comparator L, the Comparison Word Registers C1 and C2 alter the order. For definiteness, assume that the Sorting Machines are so arranged that the characters are read from the envelopes in the normal order, that is: the most significant digit in the street number first, followed by the remaining digits in order of decreasing significance, followed by the street name in usual order, followed by the street designation and the section of the city, followed by the city name in usual order, followed by the state abbreviation. Also, for simplicity, it is assumed that, as for the drum words, there are six digits in the street number obtained, where necessary, by prefixing one or more zeros. It is further assumed that the street name, and the city name as well, is contracted to four characters by use of some standard rule; that street designation, and section of city are each represented by a single character; and that the state abbreviation consists of precisely two characters. Since successive characters, when transferred from the Input Synchronizers A1 to A6 to Buffer Registers F1 to F4 are positioned successively early in time in each register, character groups read from Buffer Registers F1 to F4 appear most significant first, whereas characters within each group appear least significant first. It is thus necessary to invert the order of the groups when transferring a word to the Character Word Registers C1 and C2, so as to obtain the same sequence as for words stored on the Magnetic Drum MD.

Since Comparison Word Register C1, which stores the odd bits of the characters of the letter word, is practically identical to Comparison Word Register C2, which stores the even bits of the characters, only the Comparison Word Register C1 will be completely described, and mention will be made of the differences required for the Comparison Word Register C2. For an incoming pass, Comparison Word Register C1 basically comprises two interlinked storage units of circulating type Storage Unit S1 of twenty-one bit capacity and Storage Unit R1 of fourteen bit capacity. For an outgoing pass, Storage Unit R1 is unused and Storage Unit S1 is lengthened to form a single circulating storage unit of twenty-four bit capacity during the comparison cycle.

For an incoming pass, Storage Unit S1 comprises gate G1C1 buffer B1C1, pulse amplifier PCD1, the fifteen pulse time delay line D1C, gate G2C1, buffer B2C1, pulse amplifier P1C1, the two and three-quarters pulse time delay line D2C1, gate G3C1, buffer B3C1, pulse amplifier P2C1, and the two and one-half pulse time delay line D3C1. During an incoming pass, the VD signal, occurring at the time of the first transfer of data into the Comparison Word Register C1, resets flip-flop F1C1 which remains reset thereafter since the absence of the OUT signal keeps gate G7C1 blocked. Hence gate G1C1 remains permanently open. Also, the absence of the OUT signal keeps gate G6C1 blocked so that there is no input to buffer B1C1 from this source. Thus, for an incoming pass, the CD1 output of the circulating register is returned to delay line D1C1 via pulse amplifier P1C1 with no interference. Allowing for delays in the amplifiers, the recirculation loop is exactly twenty-one pulse times long, making two complete circulations during one word time. During transfer from the Buffer Register F1 or F3 to the Comparison Word Register, signal XA is present from time IT7 to IT13 and passes the odd pulses, of the characters representing the street designation (at times IT7$^1$ to IT12$^1$) and section of the city transmitted on line IA through gate G4C1 into buffer B3C1 and thence to pulse amplifier P2C1. At the same time, the —XA signal erases the previous register contents in these pulse positions by blocking the recirculation path at gate G3C1. The entered data appears at point CD1 at times IT10$^1$ to IT15$^1$ and, after an odd number of circulations at times IT31$^1$ to 36$^1$. Signal XB is positive during the period from time IT13 to IT25 and opens gate G5C1 for the pulses on line IA corresponding to the characters representing the street name (at times IT13$^1$ to IT24$^1$) while the —XB signal erases the previous register contents in these pulse positions by blocking the recirculation path at gate G2C1. The new data enters the Storage Unit S1 via buffer B2C1 and pulse amplifier P1C1 and appears at the positive output terminal of pulse amplifier PCD1 at times IT19$^1$ to IT30$^1$ and, after an odd number of circulations, at times IT40$^1$ of one word IT9$^1$ of the next word. Thus, the two sets of characters form a continuous set in a reverse sequence to their time of entry and agree in order with the corresponding portion of the drum words on line UA, appearing at point CD1 at times IT19$^1$ to IT36$^1$ and also at times IT40$^1$ of one word to IT15$^1$ of the next word. The signal at point CD1 is applied to gate G17C1 which is open during an incoming pass from IT19 until IT37 and thus passes through to buffer B11C1 and pulse amplifier PCA1 to form signal CA1 at times IT19$^2$ to IT36$^2$ in agreement with the timing of the corresponding pulses in the drum words on line UA.

For an outgoing pass, Storage Unit S1 is the same as described heretofore during the time of transfer of data to it from Buffer Register F1 or F3, but is lengthened to twenty-four bits total soon after this transfer in order to synchronize with the drum words. This lengthening is accomplished by inserting an additional three bits of delay consisting of gate G8C1, buffer B4C1, pulse amplifier PCB1, a portion of delay line D4C1, and gate G6C1 between delay line D3C1 and pulse amplifier PCD1. Most of these additional components constitute part of Storage Unit T1 during an incoming pass, but are not needed for that function during an outgoing pass. Since, as explained in connection with the Character Counter B, the city name and state abbreviation in an outgoing pass occupy the same positions in Buffer Registers F1 and F3 as do the street name and the characters representing the street designation and section of city in an incoming pass, this data will appear in proper sequence at point CA1 at times IT19$^1$ to IT36$^1$ and IT40$^1$ to IT15$^1$ while the loop remains twenty-one bits in length. At time IT18, as indicated by the coincidence of timing signals WA6 and WB4, when these coincide with timing pulse WD8 every one hundred sixty-eight times, gate G7C1 emits a pulse setting flip-flop F1C1. This cuts off gate G1C1 but opens G8C1 directing the output of delay line D3C1 to buffer B4C1 and thence via pulse amplifier PCB1, two and three-quarters pulse times of delay in delay line D4C1, and gate G6C1 back to buffer B1C1, thus adding three bits to the loop length. It is to be noted gate G9C1 is always blocked during an outgoing pass while gate G6C1 is always open and that flip-flop F1C1 is reset at the beginning of transfer from Buffer Register F1 or F3 by the VD pulse. Furthermore, at time IT18 when the extra delay is inserted, no pulses are passing that portion of the circuit. They reach it one pulse later, at IT19. The combination WA6 and WD6 corresponds to pulse time OT24 for words used in an outgoing pass. Hence the first pulse of the stored data arrives at gate G8C1 one pulse time later at pulse time OT1 and appears at output terminal of pulse amplifier PCB1 at pulse time OT1$^1$.

On an outgoing pass, the IC and ID signals are absent so that gates G17C1 and G19C1 remain closed while gate G18C1 remains open. Thus CB1 signals pass through gate G18C1, buffer B11C1, and pulse amplifier PCA1 to form the CA1 signals at times OT1$^2$ to OT18$^2$, in agreement with the corresponding pulses in the drum words on line UA. CA1 signals after time OT18$^2$ are not of importance since only the first eighteen bits in a drum word are used in determining the results of a comparison during an outgoing pass.

Storage Unit R1 is a recirculating loop consisting of gate G9C1, buffer B4C1, pulse amplifier PCB1, the four pulse time delay line D4C1, buffer B5C1, pulse amplifier P4C1, the three-quarter pulse time delay line D5C1, buffer B6C1, pulse amplifier P5C1, the three-quarter pulse time delay line D6C1, gate G13C1, buffer B7C1, pulse amplifier P6C1, the three-quarter pulse time delay line D7C1, buffer B8C1, pulse amplifier P7C1, the three-quarter pulse time delay line D8C1, buffer B9C1, pulse amplifier P8C1, the three-quarter pulse time delay line D9C1, buffer B10C1, pulse amplifier P9C1, and the four and one-half pulse time delay line D10C1. It should be noted that, for an incoming pass, gate G9C1 is always open, thus closing the loop between delay line D10C1 and pulse amplifier PCB1, whereas gate G8C1 is always closed, thus blocking extraneous signals at this point. The first step during a transfer from Buffer Register F1 or F3 to Storage Unit T1 is the occurrence of the —XB signal at gate G13C1 which blocks the circulation, thus erasing pulses at this point between pulse time IT13 and pulse time IT25. Since the length of loop, allowing for delays in the pulse amplifiers, is precisely fourteen pulse times, this means no pulses occur at this point between pulse times IT27 and IT39 or between pulse time IT41 of one word and IT11 of the next word, except as introduced at a later time. This corresponds to erasure of pre-existing pulses occurring at point CB1 between pulse times IT21 and IT33, between pulse times IT7 and IT19, between IT35 of one word and IT5 of the next word. The XC signal begins at pulse time IT25, opening gate G10C1 to the least significant digit in the street address as transmitted by line IA. The first two pulses, at times IT25$^1$ and IT26$^1$ pass through gate G10C1 to buffer B5C1 and pulse amplifier P4C1, but the third pulse, at IT27$^1$, is cut off by the cut off of the XC signal at IT27. These pulses occur at point CB1 at pulse times IT35$^1$ and IT36$^1$ and hence enter in a cleared part of the loop. The XD signal similarly passes the first two pulses in the second digit of the street address at times IT28$^1$ and IT29$^1$ through gate G11C1 and buffer B6C1 to pulse amplifier P5C1. These pulses occur at point CB1 at pulse times IT37$^1$ and IT38$^1$ and thus immediately follow the pulses that had previously been transferred. They also enter a cleared part of the loop. The same elimination of the third pulse occurs in later digits gated by the successive signals XE, XF, XG and XH and, in similar fashion, each successive pair of pulses passed immediately follow their predecessors. At the end of the transfer, the entire street number is stored in the loop, appearing at point CB1 at pulse times IT35$^1$ of one word to IT4$^1$ of the next word and because of the short loop length, also at pulse times IT7$^1$ to IT18$^1$ and at pulse times IT21$^1$ to IT32$^1$. At point CC1, the output of delay line D8C1, the corresponding times are IT29$^1$ to IT40$^1$, IT1$^1$ to IT12$^1$ and IT15$^1$ to IT26$^1$.

On an incoming pass, the ID signal opens gate G19C1 while the —ID signal closes gate G18C1 from time IT1 to time IT7. Thus the CC1 signals pass through gate G19C1, buffer B11C1, and pulse amplifier PCA1 to generate the CA1 signals at times IT1$^2$ to IT6$^2$, in agreement with the timing of the corresponding pulses of the lower bound portion of the drum words on line UA. At time IT7, the ID signal goes off so as to close gate G19C1, while the gate G18C1 opens because of the absence of the —IC and —ID signals until time IT19 when the —IC signal begins. Thus, the CB1 signals pass through gate G19C1, buffer B11C1, and pulse amplifier PCA1 to generate the CA1 signals at times IT7$^2$ to IT18$^2$, in agreement with the timing of the corresponding pulses of the upper bound portion and the three more significant digits in the street address of the drum words in line UA. Gate G18C1 opens again at time IT37 when the —IC signal ends, but this is unimportant since only the first thirty-six bits in a drum word are used in determining the results of a comparison during an incoming pass.

The Comparison Word Register C2 which stores the even bits of the characters of the letter word is identical to the Comparison Word Register C1 with the following exceptions: (1) The register consists of the two Storage Units S2 and R2; (2) Instead of there being an IA signal transmitted to each of the storage units, the IB signal is transmitted to the storage units; (3) The output signal of the Comparison Word Register C2 is the CA2 signal, whereas the output signal of the Comparison Word Register C1 is the CA1 signal.

THE COMPARATOR L (FIG. 14)

In order to fully describe the Comparator L, it will first be desirable to briefly summarize the word structure involved in the comparison. During outgoing passes, the drum word comprises six characters, each having six bits. The first four characters designate the city, and the second two characters the state. The word leaves the drum reading circuits M least significant character first in time as well as the least significant bits of each character first in time. Each drum word is stored in a pair of parallel registers on different channels of the Magnetic Drum MD. The first register stores the odd bits of the characters, and the second, parallel, register stores the even bits of the character. During the comparison operation, an odd and even bit of a drum word are compared in parallel with the related odd and even bits of the letter word. During an incoming pass, the drum word has a different structure. In particular, the first three characters are four-bit digits which represent the lower bound of the three less significant digits of the street number. The next three characters are also four-bit digits which represent the upper bound of the three less significant digits of the street number. The next three characters are also four-bit digits which represent the three more significant digits of the street number. The next six characters are six-bit characters which represent the street name, type and city section. The drum words of the incoming pass are also stored in parallel registers with the first register of the pair storing the odd bits of the characters and the second register of the pair storing the even bits of the characters.

On an outgoing mail pass, the drum words of an outgoing pass are compared for an equality with the letter word. If an equality is found, signals are generated which cause the transfer of the associated bin number to the appropriate one of Bin Location Solenoid Actuators G1 to G6. If no equality is determined, comparisons continue until there is an equality or until the special character marking the end of comparison words is reached.

At the end of the listings for each state, a special drum word is inserted with the same state coding and a new bin number, but with special coding for the city which is detected by the comparator circuitry and causes an artificial equality signal for the city portion no matter what the letter code is. This results in the designation of "residual" bin numbers corresponding to the appropriate states for these letters for which the city is not sufficiently important to be listed separately on the Magnetic Drum MD. For definiteness, the special character is taken as one with its two most significant bits zero, which is not true for any alphabetic character, nor for either of the codes used to mark the beginning points of comparison on the Magnetic Drum MD. Only if the characters read from the envelope for the state abbreviation differ from any of the state or territory designations on the magnetic drum, whether due to error or factual, can the end of the comparison cycle be reached without finding an equality between the letter word and one of the drum words. In this unusual case, the bin number is taken as designated by the twelve zeros resulting from clearing of the corresponding register before the start of a comparison cycle and the letter is directed to the "reject" bin.

During an incoming pass, the letter word, which is stored in the Comparison Word Registers C1 and C2 is compared against the drum words of the incoming pass. In this case, though, the following type of comparison is performed. In order to have a successful comparison on the incoming pass, it is necessary that the first three digits of the letter word have a magnitude greater than the first three digits of the drum word (lower bound). These same three digits of the letter word are compared with the second three digits of the drum word and should be less than or equal to the second three digits of the drum word (upper bound). Further, there is an equality comparison between the next six characters of the drum word and the six characters of the letter word. Finally, if the street number is of the same parity (both odd or both even) in both lower and upper bounds, the letter word must be of the same parity also. If the parity is not the same in the two bounds, the letter word may have any parity. This parity condition is desirable since, frequently, opposite sides of a street are on different routes. In other words, for a successful comparison on an incoming pass, the street number of the letter word must be within the upper and lower bounds of the street number of the drum word; the street name, type and city section of the letter word must be the same as the street name, type and city section of the drum word; and the least significant bit of the street number of the letter word must agree with the least significant bit of either the lower bound or the upper bound of the drum word or with both. When all these criteria are satisfied, a successful incoming pass comparison has been performed, and the appropriate bin number associated with that drum word is transferred to the appropriate one of Bin Location Solenoid Actuators G1 to G6. If the special character marking the end of the comparison cycle is reached without any successful comparison, because the address read from the envelope is unusual or in error, the bin number is taken as designated by the twelve zeros resulting from clearing of the corresponding register in the appropriate Bin Location Solenoid Actuator before start of a comparison cycle and the letter is directed to the "reject" bin.

It should be noted that each comparison will be performed serially; that is, the least significant bits of the least significant characters will be compared first, followed by the more significant bits of the characters, until finally the most significant bits of the most significant characters are compared.

The Comparator L is also used to effect channel switching as necessary to examine all the applicable drum words within one drum revolution. The drum words are arranged in order, as described in connection with the Magnetic Drum MD, except for the key words which serve to indicate whether or not to switch to another channel. For the key words, besides the type of comparison previously described, a somewhat different type of comparison must therefore be performed. For an outgoing pass, if the letter word is greater than a key word, a channel switch is called for. For an incoming pass, the same is true if the comparison is made ignoring the lower bound part of the drum word.

The odd bits, that is the first, third, fifth, etc. bits of the drum word in order of increasing significance, are transmitted as the UA and minus UA signals from the drum reading circuits M. The even bits, that is, the second, fourth, sixth, etc. bits of the drum word in order of increasing significance are received as the UB and minus UB signals. Similarly, the CA1 and minus CA1 signals from the Comparison Word Register C1 represent the odd bits of the letter word, and the CA2 and minus CA2 signals from the Comparison Word Register C2 represent the even bits of the letter word. Initially, the least significant bit of the drum word is compared with the least significant bit of the letter word along with a simultaneous comparison of the second least significant bit of the drum word with the second least significant bit of the letter word. During the next clock pulse interval, there are comparisons of the third and fourth less significant bits. This continues with a pair of bits compared at each pulse time.

More specifically, the gate G5L compares the more significant bit of a pair of bits of the drum word with the more significant bit of a pair of bits of the letter word. If the bit of the letter word is greater than the bit of the drum word, then the CA2 signal will be positive (binary 1) and the minus UB signal will be positive (binary zero). A pulse will then pass through gate G5L. If, however, the drum word and the letter word are equal, that is, both are binary ones or binary zeros, no pulse passes through the gate G5L. Similarly, if the bit of drum word is binary one and the letter word is binary zero, no pulse again passes through the gate G5L. The gate G6L tests to see whether the more significant bit of a pair of bits of the letter word is less than the more significant bit of a pair of bits of the drum word. Thus, if this bit of the letter word is binary zero and the bit of the drum word is binary zero, the —CA2 signal will be positive and the UB signal will be positive, so that a pulse passes through gate G6L. In this manner, the gates G5L and G6L test to see whether drum bit or the letter bit in the more significant position of a sequential pair of bits is greater; i.e., these gates will only pass a pulse if an inequality exists.

Comparison of the less or significant bits of the pair of bits, that is, the odd bits of the pair, is similarly performed by gates G1L and G2L. The gates G3L and G4L are identity comparison gates for the even bits. In other words, if, and only if, the drum word and the letter word have identical even bits both equal to binary one, a pulse passes through the gate G3L, and if and only if the drum word and the letter word have binary zeros in the same even bit positions, a pulse passes through the gate G4L. Thus, the buffer B1L will only transmit a pulse when an even bit of the drum word is equal to the same even bit of the letter word. Gates G16L and G17L and buffer B8L perform the same function for the odd bits, so that buffer B8L transmits a pulse only when an odd bit of the drum word is equal to the same odd bit of the letter word. The pulse transmitted by the buffer B1L is transmitted to input terminals of the gates G7L and G8L. The gate G7L then passes a pulse if and only if the even bits are equal and the odd bit of the letter word is binary one and the odd bit of the drum word is binary zero. Similarly, the gate G8L will transmit a pulse only if the even bits are equal and the odd bit of the drum word is binary one while the odd bit of the letter word is binary zero.

During an outgoing pass, gate G10L is closed by the absence of the IN signal while gate G11L passes a pulse at time OT1 as designated by the coincidence of the WA1 and WD1 timing signals. This pulse passes through buffer B5L as the LC signal and resets flip-flops F2L, F3L and FLB directly and flip-flops F1L and FLA via buffers B6L and B4L respectively at the beginning of each word. Buffer B2L combines the outputs of gates G1L, G2L, G5L and G6L and thus passes a pulse whenever any bit in the drum word differs from the corresponding bit in the letter word. Such inequality sets flip-flop F1L which remains set for the balance of the word unless signal LD is generated. Signal LD is generated when a character in the city name in the drum word is specially coded to force an artificial equality for itself and all preceding characters. It is used in the last character of the city name in the last entry for a particularly state so as to allot a particular bin number for each state to cover localities in the state that are not of sufficient importance to warrant individual bin assignments. The special character code differs from any alaphabetic code by having its two most significant bits both zero. This is detected by the absence of both the −VA and −VB signals at a time WC3² (obtained by delaying timing pulse WC3¹ one-quarter pulse time in delay line D4L) at gate G19L which thus generates the LD pulse if the OUT signal is present under these conditions. The LD pulse, delayed somewhat beyond the output of gate G19L by delay line D5L so as to continue beyond any setting pulses, resets flip-flops F1L and FLA to cancel any earlier indication of inequality between letter and drum words. Thus, signal LB between time OT19 and the start of the next word indicates that the first eighteen pairs of bits in the drum word are identical to those in the letter word, that is, that there has been a successful comparison for an outgoing pass.

Buffer B3L combines the outputs of gates G5L and G7L and, therefore, passes a pulse to set flip-flop FLA whenever a pair of bits in the letter word is greater than the corresponding pair of bits in the drum word. On the other hand, buffer B4L combines the outputs of gates G6L and G8L and therefore passes a pulse to reset flip-flop FLA whenever a pair of bits in the letter word is less than the corresponding pair of bits in the drum word. The LD signal, indicating the presence of the special character in the drum word implying a simulated equality, also resets flip-flop FLA as previously stated. When the pair of bits are identical for both drum and letter words, neither buffer B3L nor buffer B4L are energized and flip-flop FLA remains in whatever condition it was in previously. Thus the state of flip-flop FLA is determined by the last, and hence the most significant, pair of bits that are different for the drum and letter words. Since flip-flop FLA starts in thet reset state, signal LA at time OT19 of a key word, when it is examined in the Channel Selector E, indicates that the eighteen pairs of bits in the letter word was greater than the first eighteen pairs of bits in the drum word and hence that there should be a channel switch.

During an incoming pass, conditions are somewhat more involved. In this case, gate G11L is closed by the absence of the OUT signal while gate G10L passes a pulse at time IT1 by the coincidence of timing signals WA1 and WB1. This pulse, passing through buffer B5L, is the LC signal which resets flip-flops F2L, F3L and FLB directly and flip-flops F1L and FLA via buffers B6L and B4L respectively. At the first pulse time in the comparison, as indicated by the output of gate G10L delayed one-half pulse time by delay line D3L, an examination is made of the parity relations between the street number in the letter word and in the lower bound of the drum word, by noting whether their least significant bits are alike. If the parties are alike, gate G18L passes a pulse to set flip-flop F3L. If, during the comparison of the first six pairs of pulses, the letter word was greater than the drum word, flip-flop FLA will have been set and signal LA, delayed three-quarters pulse time by delay line D1L will alert gate G12L. At time IT7, the coincidence of timing pulses WA1 and WB7 will pass a pulse through gate G9L to reset flip-flop FLA and to set flip-flop F2L via gate G12L if the gate is otherwise open. This will be the case if the LA signal had alerted the gate at the time, if the VA signal was present as an assurance that the comparison occurred during a complete comparison cycle with a new letter word, and if the output of buffer B9L is positive at the time. The last condition requires either that flip-flop F3L be set or that the seventh odd bit in the comparison word be the same as the seventh odd bit in the drum word. Recalling that the seventh odd bit in the comparison word is the same as the first bit, being the least significant bit in the letter word, and that the seventh odd bit in the drum word is the least significant bit in the upper bound of the street number, the output of buffer B9L is positive, provided the street number in the letter word has the same parity as either the lower bound or the upper bound or both in the drum word. Hence, flip-flop F26 will be set if the three least significant digits of the street number in the letter word are greater than the lower bound portion of the drum word and the parity conditions for a successful comparison are met. If flip-flop FLA remains reset from time IT7 until IT37, then the letter word is less than or equal to that portion of the drum word consisting of the upper bound of the three least significant digits of the street number and the remainder of the address. Now, at time IT13, timing pulses WA1 and WB6 coincide at gate G13L and reset flip-flop F1L. If this flip-flop remains reset at time IT37, then the letter and drum words were identical as concerns all but the three least significant digits of the street number. Hence the fact that both flip-flops FLA and F1L are reset at time IT37 implies that the three least significant digits of the letter word are less than or equal to the upper bound of the drum word and that the remainder of the address is identical for both letter and drum words. These conditions, combined with the prior setting of flip-flop F2L, indicating that the three least significant digits of the letter word are greater than the lower bound on the drum word and that parity conditions are satisfied, mean that a successful comparison has been made. These conditions cause gate G14L to be open at time IT3 as designated by the coincidence of timing pulses WA1 and WB2 and thus pass a pulse at that time setting flip-flop FLB. If flip-flop FLA is set at time IT37 after being reset at time IT7, then the letter word is larger than that portion of the drum word consisting of the upper bound of the three least significant digits of the street number and the remainder of the address. This occurrence during a key word is noted by sampling the LA signal at the appropriate time in the Channel Selector E and when noted, a channel switch is initiated.

CHANNEL SELECTOR E (FIG. 15)

It should be recalled that each drum word is stored in a pair of registers. One register contains the odd bits of the drum word, while the second register contains the even bits of the drum word. The pairs of registers associated with each drum word are in pairs of channels of the Magnetic Drum MD, with each register of the pair having the same relative angular position in their channels. Each incoming pass drum word comprises eighty-four bits. Therefore, each register stores forty-two of the bits. On the other hand, each outgoing pass drum word comprises forty-eight bits. Therefore, there are twenty-four bits in each of the registers.

For the remainder of the description, whenever a register is mentioned, it is understood that it is one register of the pairs of registers and that parallel operations are occurring for the other register of the pair. In general, the drum words are arranged in numerical order and divided equally among one hundred twenty-eight channels. It should be noted then that there are in fact two hundred fifty-six channels since a pair of registers stores a drum word, but for the sake of simplicity, we will still consider that there are one hundred twenty-eight channels. Preceding these drum words is a series of words called key drum words which are used to determine which channel contains the drum word being sought. The first drum word in the first channel is a key drum word which is equal to the numerically largest drum word that is stored in the first half of the Magnetic Drum MD, that is, the largest drum word stored in the first sixty-four channels of the drum. A designated number of drum words later in the first channel, there is another key drum word equal to the largest drum word of the first quarter of the channels. At this same level (angular position) in the first channel of the second half of the channels, that is, the sixty-fifth channel, will be found a key drum word equal to the largest drum word stored in the third quarter of the channels. The same predetermined number of words later in the first channel is a third level which effectively divides the channels into eighths. In this manner, there are seven such levels, so that it is possible to select one of one hundred twenty-eight channels by performing comparisons of each level.

During a pass, the letter word in the Comparison Word Registers C1 and C2 is first compared with the first key drum word in the first channel. If the letter word is equal to the key drum word for an outgoing pass, or falls within the bounds given by the key drum word for an incoming pass, no further comparisons are made, the bin number included in the drum word being read out. If, at some key drum word comparison, it is found that the letter word is larger than the key drum word, a channel switching takes place. Whenever this condition exists, an appropriate flip-flop is set so that, after there have been seven such comparisons, seven flip-flops are in a combination of set and reset conditions to uniquely determine one channel. In this manner, it is possible, within a fraction of a drum revolution, to locate the channel which will contain the mate of the letter word. Therefore, it is possible to locate the appropriate drum word in less than one drum revolution.

It will be recalled that the key drum words in any channel are separated by a plurality of word spaces. There are two purposes for spacing the key drum words. First, the spacing permits abundant time for channel switching, but it also provides a convenient way of combining two sets of data on the same magnetic drum using the same channels without any waste of magnetic drum space. This is accomplished by choosing the proper number of words to space the key drum words. Since the drum word registers in an incoming pass are forty-two bits long and since the drum word registers on an outgoing pass are twenty-four bits long, there is a seven to four ratio in word length. Therefore, if the spacing of the key drum words on an incoming pass is four incoming drum word registers and the spacing of the key words on an outgoing pass is seven outgoing drum word registers, key words will be spaced equally for either type of pass, that is, one hundred sixty-eight bits. Then, by utilizing the same channel selection sequence for both types of pass, all channels contain the same number of words of each type. The discussion in the section on the Magnetic Drum MD indicates how the number of words of each type may be chosen so as to fully utilize the drum.

Now each WA pulse recurs at six-bit intervals, each WB pulse at seven-bit intervals, and each WD pulse at eight-bit intervals. A specific combination of a WA pulse, a WB pulse, and a WD pulse, therefore, recurs at one hundred sixty-eight bit intervals, since the least common multiple of six, seven and eight is one hundred sixty-eight. During an incoming pass, comparison data ends with pulse thirty-six in each drum word, since the last six bits of each word refers to a bin number. Because of delay in the comparison circuits, however, examination of the results of a comparison is made one pulse time later, at pulse time thirty-seven, or thirty-six pulse times after the first bin the first key word occurs. The UC pulse, which initiates the timing pulse generation is so placed as to make the first bit of the first key word in an incoming pass correspond to timing pulses WA1, WB1 and WD1. Pulse time thirty-seven in this key word, and hence for every key word, therefore, corresponds to WA1, WB2, WD5. The output of gate G1E is, therefore, positive at pulse time thirty-seven of each key word during an incoming pass.

During an outgoing pass, comparison ends with pulse time eighteen in each drum word since the last six bits of each word refers to a bin number. The results of comparison are examined one pulse time later, at pulse time nineteen. Here also, the UC pulse is generated to make the first bit of the first key word correspond to WA1, WB1 and WD1. Pulse time nineteen, therefore, corresponds to WA1, WB5, and WD3. The output of gate G2E is, therefore, positive at pulse time nineteen of each key word during an outgoing pass. The output signal EH of buffer B1E thus is positive at the end of comparisons in each key word in either type of pass. The LA signal from Comparator L indicates that the letter word is larger than the drum word it is being compared to. The output of gate G8E is thus positive if a shift in channel is called for by the comparison with a key word in either type of pass and, under these conditions, a signal appears at the output of pulse amplifier P1E and is available to set one of the flip-flops FEA to FEG.

During the comparison of the seven key drum words with the letter word, the flip-flops FEA to FEG are selectively sensitized for setting. In particular, during the first comparison, the flip-flop FEA is sensitized, during the second comparison the flip-flop FEB is sensitized, during the third comparison the flip-flop FEC is sensitized, until during the seventh comparison the flip-flop FEG is sensitized. The sequential sensitizing of the flip-flops FEA to FEG is performed by pulses generated in the recirculation register comprising the buffer B2E, the pulse amplifier P2E, the six and three-quarters pulse time delay line D1E, the buffer B3E, the pulse amplifier P3E, the three and three-quarters pulse time delay D2E, and the gate G3E. Initially, the UC signal as a pulse enters the recirculation register via the gate G5E and the buffer B2E for an incoming pass and via the gate G6E and the buffer B3E for an outgoing pass. This pulse continues recirculating as long as —EJ is positive and, at any point in the recirculating register, it recurs every eleven pulse times. Since the sampling at the gate G8E occurs every one hundred sixty-eight pulse times, it is seen that the pulse in the recirculation register precesses with respect to the sampling. Now the UC pulse, reclocked by either pulse amplifier P2E or pulse amplifier P3E, coincides with the first bit of the first key word in either type of pass. For an incoming pass, thirty-six pulse times later, when the EH pulse occurs during the first key word, it will be three pulse times beyond three full circulations of the loop and hence at tap $3^1$ of delay line D1E one-quarter pulse time later to generate the ES1 signal in coincidence with a possible first output of pulse amplifier P1E. For an outgoing pass, the first possible output of pulse amplifier P1E occurs eighteen and one-quarter pulse times after the first bit in the first key word, corresponding to seven and one-quarter bits beyond a full circulation of the loop. As will be seen from the figure, the UC pulse is, for an outgoing pass, entered at a suitable point in the recirculation register to appear at point ES1 at this moment, in agreement with conditions for an incoming pass.

One hundred sixty-eight pulse times later, this single pulse will be present at the $6^1$ tap of the delay line D1E as the ES2 signal. One hundred sixty-eight pulse times later, this same pulse will be present at the $2^1$ tap of the delay line D1E as the ES3 signal, etc. Now the pulse amplifier P1E is coupled in parallel to one input terminal of each of the gates G9E to G15E. The second input terminals of these gates receive respectively the ES1 signal, the ES2 signal, the ES3 signal, the ES4 signal, the ES5 signal, the ES6 signal, and the ES7 signal. During the first comparison, the ES1 signal will be present at the gate G9E, and if the letter word is greater than the key drum word, a pulse will be transmitted by the pulse amplifier P1E which then passes through the gate G9E to set the flip-flop FEA. During the second comparison, the ES2 signal will be present at the gate G10E and again if the letter word is greater than the key drum word, the pulse amplifier P1E will transmit a pulse which passes through the gate G10E to set the flip-flop FEB. In a similar manner, the remaining flip-flops are set sequentially as a result of the comparisons.

During the seventh comparison, the ES7 pulse will be generated. The ES7 pulse occurring simultaneously with the EH pulse transmits a pulse via the gate G4E to set the flip-flop FEJ. The flip-flop FEJ transmits a minus EJ signal to the gate G3E to clear the recirculation register so that no spurious setting of the flip-flops FEA to FEG can occur. The combination of the flip-flops FEA to FEG now remain set and are generating signals which are further decoded to select the appropriate channel. The first level of the decoding takes place by the circuitry associated with the HA to HL signals. Appropriate pairs of the EA to EG signals generated by the flip-flops FEA to FEG are transmitted to the gates G16E to G27E. For example, the gate G16E receives the minus EF signal and the minus EG signal. If the flip-flops FEF and FEG have not been set during the comparisons, both of these signals are positive and the HA signal is generated. In a similar manner, the remaining HB to HL signals are generated. The HA to HL signals are transmitted to appropriate circuits in the drum reading circuits M to complete the channel selection with the appropriate channel being located. Comparisons are then performed between the letter word and the drum words of the selected channel. When a successful comparison has been performed, a VA signal is transmitted from Buffer Register and Sorting Machine Selector V to the input terminals of flip-flop FEA to FEG to clear the channel selector E to its initial state which is for the selection of the first channel.

The VB signal, which occurs at the end of comparisons, resets flip-flops FEA to FEG. The UC signal, at the start of comparison in the next magnetic drum revolution, resets flip-flop FEJ so as to permit resumption of circulation in the register.

DRUM READING CIRCUITS M (FIG. 16)

The Drum Reading Circuits M basically form a tree circuit which ultimately selects one pair of magnetic reading heads from one hundred and twenty-eight pairs of magnetic reading heads under the control of signals from the channel selector E. There are eight drum word reading circuits similar to the typical Drum Reading Circuit M shown and described in detail. The remaining seven are substantially identical and the minor differences will be indicated. It should be noted that each drum word is stored in a pair of registers. The registers are disposed serially along channels of the Magnetic Drum MD. Since the drum words are stored in pairs of registers, the channels are selected in pairs so that the two halves (one half containing the odd bits, the other half containing the even bits) are read out simultaneously in parallel. Opposite each channel is a magnetic reading head. The purpose of the Drum Reading Circuits is to select the pair of magnetic reading heads opposite the pair of channels which contain the desired drum word, that is: the drum word which satisfies the specified conditions during comparison.

Drum Reading Circuit M1 shows the circuitry associated with the selection of one of the first sixteen channels having registers each of which contains half a drum word (the half containing the odd bits) and the corresponding one of the sixteen parallel channels which contain registers that store the other halves of the same drum words (the even bits).

The channel selection is performed on four levels. The first level is the choice of one magnetic reading head of a group of four magnetic reading heads by the HA, HB, HC and HD signals. It should be noted that only one of these signals is present at any one time. Therefore, if the HA signal is present, the magnetic reading head 000A, the magnetic reading head 004A, the magnetic reading head 008A, etc., is selected. In particular, the HA signal is a positive voltage transmitted via, for example, the magnetic reading head 000A to the base of the transistor T1M. Whatever signals are picked up by the magnetic reading head 000A are available in amplified form at the collector of the transistor T1M. The magnetic reading heads 001A, 002A and 003A are receiving respectively the HB, HC and HD signals, which at this time are at negative potentials so that the associated transistors are biased to cut off. Thus, the HA, HB, HC and HD signals select one magnetic reading head from each group of four magnetic reading heads.

The second level of selection is performed by the HE, HF, HG and HH signals. Again, only one of these signals may be present at any one time, that is, one of these signals is at a positive potential and the other three are at negative potentials. Thus, for example, if the HE signal is present, that is, positive, the base of transistor T2M is at a positive potential and whatever signals are being received from the selected magnetic reading head of the group of magnetic reading heads 000A to 003A is transmitted, with further amplification, from the emitter to the collector of transistor T2M. If the HF signal were present, then the transistor T4M would be conducting, and amplified signals from the selected magnetic reading head of the group of the magnetic reading heads 004A to 007A would be available at its collector.

The third level of selection is performed by the HI, HJ, HK and HL signals. Again, only one of these signals will be positive at any one time. Therefore, for example, if the HI signal is present, the signal transmitted from any of the transistors T2M, T4M, T6M or T8M to the emitter of transistor T10M will appear, still further amplified, at the collector of this transistor. The output of the transistor T10M is the MA1 signal, which when present represents information being read from one of the channels of a group of sixteen channels. In a similar manner, if the HJ signal is present at the base of the transistor T11M, a MA2 signal is present, which represents the information being read by one of the magnetic reading heads 016A to 031A. To summarize, then, the MA1 signal represents information being read by one magnetic reading head of a first group of sixteen magnetic reading heads. The MA2 signal represents the information being read by one magnetic reading head of a second group of sixteen magnetic reading heads. There is a Drum Reading Circuit M2 which selects one magnetic reading head from the group of magnetic reading heads 032A to 063A. The selection is identical, with the exception that an HK signal is transmitted to the base of a transistor equivalent to transistor T10M, and an HL signal is transmitted to the base of a transistor equivalent to transistor T11M. The output signal of the equivalent of the transistor T10M is the MA3 signal, and the output signal of the equivalent of the transistor T11M is the MA4 signal. The transmission of one of the signals MA1, MA2, MA3 and MA4 is the third level of selection. The Drum Reading Circuits M3 are identical to the Drum Reading Circuits M1, except that the magnetic reading heads 000A to 031A are replaced by the magnetic reading heads 064A to 095A, and the output signals are the MA5 and MA6 signals; that is, the MA5 signals represent drum words being read by one of magnetic reading heads 064A to 079A, and the MA6 signals represent information being read by one of the magnetic reading heads 080A to 095A. The Drum Reading Circuits M4 are identical to the Drum Reading Circuits M2, except that the magnetic reading heads 032A to 063A are respectively replaced by the magnetic reading heads 096A to 0127A, and they generate the MA7 and MA8 signals. The MA7 signal is the information read by one of the magnetic reading heads 096A to 112A, and the MA8 signals represent the information being read from one of the magnetic reading heads 112A to 127A. It should be noted that, at any one time, only one of the MA1 to MA4 signals is present, and only one of the MA5 to MA8 signals is present. Thus, at this level, we have narrowed down channel selection to one of two possible channels.

The last level of selection is performed by the EA and minus EA signals. The minus EA signal is received at the base of transistor T12M, whose emitter receives the MA1, MA2, MA3 and MA4 signals. The plus EA signal is received at the base of transistor T14M which receives in at its emitter the MA5, MA6, MA7 and MA8 signals. When the EA signal is present, the EA signal is positive, and the minus EA signal is negative. With the EA signal positive, the transistor T14M conducts and one of the MA5 to MA8 signals is transmitted from the collector of the transistor T14M to the reading amplifier R1U, which drives the pulse amplifier PUA and the information from the selected channel is transmitted as the UA signal. If, however, the EA signal is absent, then the minus EA signal is positive and the plus EA signal is negative. Therefore, one of the signals MA1 to MA4 present at the emitter of the transistor T14M is transmitted from its collector to the reading amplifier R1U. In this manner, the final level of channel selection is performed.

There are also four drum reading circuits M5 to M8 which select the appropriate magnetic reading head related to the other halves of the drum words stored in the other registers. These Drum Reading Circuits M4 to M8 are identical to the above described circuits except that their magnetic reading heads 000B to 127B are opposite the mates of the channels associated with the magnetic reading heads 000A to 127B. Just as the MA1 to MA8 signals were generated, the MB1 to MB8 signals related to the other halves of the drum words are generated. The emitter of the transistor T16M receives the MB1 to MB4 signals and the emitter of the transistor T18M receives the MB5 to MB8 signals. The EA signals perform the same function as previously described to gate one of the MB1 to MB8 signals through to the reading amplifier R2U and the pulse amplifier PUB to cause the other halves of the selected drum words to be transmitted as the UB signals.

BIN LOCATION SOLENOID ACTUATORS G1 TO G6

There are six Bin Location Solenoid Actuators G1 to G6. Each of the Bin Location Solenoid Actuators G1 to G6 controls the envelope router of one specific Sorting Machine. When there has been a successful comparison, the coded combination of pulses representing the bin number is serially fed to dynamic storage units in a preselected one of the Bin Location Solenoid Actuators G1 to G6. This coded combination of pulses is temporarily stored until a signal (IP1 to IP6) is received from the photoelectric reader indicating that the last bit of data has been read from the following envelope (and thus that a new bin number might shortly be emitted by the machine). At this time, the coded combination of pulses is decoded in parallel to actuate a plurality of flip-flops which now take over the task of storing the bin number until a further signal from the Sorting Machine (OC1 to OC6) indicates that the conveyor is in proper position for the solenoids to position twelve wheels on the pocket containing the letter. The coded positioning of these wheels is unique to a specific bin. As the conveyor belt moves above the bins, when the appropriate bin is reached, the wheels are engaged, causing the opening of the pocket and the letter drops into the selected bin.

Since the Bin Location Solenoid Actuators G1 to G6 are identical except for the signals associated with the particular mail sorters, a typical Bin Location Solenoid Actuator G1 will be described in detail and the differences for the remaining Bin Location Solenoid Actuators G2 to G6 will be indicated. The dynamic register I stores the six odd bits representing the bin number and the dynamic register II stores the six even bits, representing the bin number. These registers are cleared when the reading from the envelope in Sorting Machine 1 is completed as later described. Now, when there has been a successful comparison, the LB signal is present at input terminals of gates G1G1 and G2G1 respectively to cause the bin number as represented by the UA and UB signals from the Drum Reading Circuits M to enter the dynamic registers I and II.

In particular, the LB signal in combination with the JA and minus JD signals causes the six odd bits to pass through the gate G1G1 and the buffer B1G1 to the pulse amplifier P1G1. The signals are transmitted from the pulse amplifier P1G1 to the five and three-quarters pulse time delay line D1G1 and are fed back through gate G3G1 and buffer B1G1 to the pulse amplifier P1G1, and continue recirculating. At the same time, the VB signals, the pulses representing the six even bits of the bin number, pass through the gate G2G1 to the buffer B2G1 and pulse amplifier P2G1 to five and three-quarters pulse delay line D2G1 and back through gate G4G1 to buffer B2G1.

When Sorting Machine 1 transmits the next IP1 signal, chosen at least seven pulse times long, this, after squaring up by toggle flop T1G2, opens gates G5G1 and G6G1 to permit the contents of the registers to be transmitted, after reshaping by pulse amplifier PGA1 and PGB1, as signals GA1 and GB1. GA1 is gated by the successive pulses WA1 to WA6 to set flip-flops F1G1, F1G3 to F1G11 in accord with the odd pulses in the bin number while GB1 is similarly gated to set flip-flops F1G2, F1G4 to F1G12 in accord with the even pulses. The negative output of toggle flop T1G2, delayed by delay line D4G1, inhibits recirculation of both dynamic registers at gates G3G1 and G4G1, after allowing whatever pulses have passed the $5^1$ taps on delay lines D1G1 and D2G1. This sets the contents of each register at 000000 so that, in the event that no successful comparison can be made with the word next read from Sorting Machine 1 because of error in or unusualness of the address, the letter will be directed to a "reject" bin. Each Sorting Machine is provided with a "reject" bin, either corresponding to a bin number code consisting of twelve zeros or placed beyond all other bins and arranged to accept all letters remaining on the conveyor at this point.

When the Sorting Machine 1 transmits the OC1 signal to the toggle flop T1G1, the GC1 and GD1 signals are generated. The GC1 signal which is merely the OC1 signal squared up is transmitted to the gates G20G1 to G31G1, causing solenoid actuators A1G1 to A1G12 to emit drive currents 1GN1 to 1GN12, respectively, when the corresponding bit in the bin number is a "1," as indicated by the setting of the corresponding flip-flop F1G1 to F1G12. The OC1 signal is of sufficient duration to permit full solenoid operation. When the OC1 signal ends, GC1 goes off but the output of delay line D3G1 remains positive for another pulse time. During this time, it overlaps the —GC1 signal, which has now become positive, and thus gate G7G1 emits the pulse GD1 lasting one pulse time. The GD1 signal resets flip-flops F1G1 to F1G12 in preparation for the bin number for the next letter.

The precise timing of signals from the Sorting Machine is not important, but it is necessary for the particular conditions of operation here assumed, in which six Sorting Machines speed as high as ten letters per second, are handled by a single magnetic-drum Transcoder: (1) That the IP1 signal appear after the last character is read from the envelope; (2) That the first character is read from an envelope no sooner than five drum revolutions after the preceding IP1 signal; and (3) That the OC1 signal for a particular letter occur after the IP1 signal for the succeeding letter, but before the IP1 signal for the letter after that.

The fundamental difference between the Bin Location Solenoid Actuator G1 and the Bin Location Solenoid Actuators G2 to G6 resides in the signals received by the gates G1G1 and G2G1. In particular, the Bin Location Solenoid Actuator G2 which has gates G1G2 and G2G2 which receive the JB signal instead of the JA signal received by the gates G1G1 and G2G1. The combination of the JB and minus JD signals indicates that the bin number being received is associated with Sorting Machine 2. Similarly, the Bin Location Solenoid Actuator G3 receives at its similar gates G1G3 and G2G3 the JC signal, instead of the JA signal. The gates G1G4 and G2G4 of Bin Location Solenoid Actuator G4 receive the JA signal and the plus JD signal. The gates G1G5 and G2G5 of Bin Location Solenoid Actuator G5 receive the JB signal and the plus JD signal, and the gates G1G6 and G2G6 of Bin Location Solenoid Actuator G6 receive the JC signal and the plus JD signal.

The Bin Location Solenoid Actuator G2 transmits the 2GN1 to 2GN12 signals to the Sorting Machine 2. The Bin Location Solenoid Actuator G3 transmits the 3GN1 to 3GN12 signals to the Sorting Machine 3, etc.

While only one embodiment of the invention has been described in detail, there will now be obvious to those skilled in the art many modifications and variations accomplishing many or all of the objects, but which do not depart from the spirit of the invention as defined in the appended claims.

What is claimed is:

1. For combination with apparatus having means for converting indicia on a record medium to a first coded combination of signals and means for routing said record medium to one of a plurality of locations in response to a second coded combination of signals, apparatus comprising a plurality of registers for storing first and second groups of indicia, means for converting said first groups of indicia to third coded combinations of signals, means for comparing said first coded combination of signals with each of said third coded combinations of signals, means for converting to a second coded combination of signals the second group of indicia stored in the register whose first group of indicia when converted to a third coded combination of signals has a given relationship with said first coded combination of signals, and means for transmitting said second coded combination of signals to said routing means.

2. For combination with record medium routing apparatus which converts indicia on a record medium to a first coded combination of signals and which routes the record medium to one of a plurality of locations in response to a second coded combination of signals, apparatus comprising a cyclic storage medium having a plurality of registers, each of said registers storing a second coded combination of signals and a third coded combination of signals, the second coded combination of signals in each of said registers being different from each other, the third coded combination of signals in each of said registers being different from each other, means for sequentially comparing said first coded combination of signals with the third coded combination of signals of each of said registers, and means for transferring to said record medium routing apparatus the second coded combination of signals from the register whose third coded combination of signals has a given relationship with said first coded combination of signals.

3. For combination with record medium routing apparatus which converts indicia on a record medium to a first coded combination of signals and which routes the record medium to one of a plurality of locations in response to a second coded combination of signals, apparatus comprising a moving storage medium having a plurality of registers, each of said registers storing first and second groups sequentially of coded combinations of indicia, transducing means operatively disposed with respect to said moving storage medium for converting said groups of coded combinations of indicia to coded combinations of signals wherein said first group of coded combination of indicia is converted to a third coded combination of signals and said second group of coded combination of indicia is converted to a second coded combination of signals, means for comparing said first coded combination of signals with each of said third coded combination of signals, and means for transmitting to said record medium routing apparatus the second coded combination of signals associated with the register whose third coded combination of signals has a predetermined relation to said first coded combination of signals.

4. For combination with letter routing apparatus which converts indicia printed on a letter to a first coded combination of signals and which routes the letter to one of a plurality of bins in response to a second coded combination of signals, apparatus comprising a rotatable magnetic drum having a plurality of registers, each of said registers storing sequentially first and second groups of coded combinations of spot magnetization, a magnetic reading head adjacent said magnetic drum for sequentially converting said groups of spot magnetization to groups of signals, means responsive to said magnetic reading head for producing third coded combinations of signals from said first groups of coded combinations of spot magnetization, comparison means responsive to said first coded combination of signals and said third coded combinations of signals for generating a transfer signal when said first coded combination of signals has a predetermined relationship with one of said third coded combinations of signals, and means responsive to said transfer signal for transmitting to said letter routing apparatus a second coded combination of signals representing the second group of coded combinations of spot magnetization stored in the register associated with said one of said third coded combinations of signals.

5. For combination with apparatus having means for converting indicia on a record medium representing characters to first coded combinations of signals representing said characters and having means for routing said record medium to one of a plurality of locations in response to a second coded combination of signals, apparatus comprising: temporary storage means for receiving the characters from said indicia converting means and for assembling said characters into a word; a permanent storage means having first and second parallel channels, each of said channels including a plurality of registers, each of said registers having a first portion for storing characters related to said word stored in said temporary storage means and a second portion storing bits related to said second coded combination of signals, a key register at the start of one of said channels for indicating that said first channel contains registers whose first portions store combinations of characters within a given group; comparison means responsive to said temporary storage means and said permanent storage means for first comparing the characters of said key register with the characters of said word stored in said temporary storage means to select one of said channels and second comparing the characters of the first portions of the registers of said selected channel, for transmitting a signal when a predetermined relationship exists between said word stored in said temporary storage means and the characters of the first portion of one of said registers; and means responsive to said signal for converting the bits of the second portion of the register whose first portion participated in a comparison that resulted in the transmission of said signal to a second coded combination of signals for transmission to said routing means.

6. For combination with apparatus having means for converting indicia on a record medium representing characters to first coded combinations of signals representing said characters and having means for routing said record medium to one of a plurality of locations in response to a second coded combination of signals, apparatus comprising: temporary storage means for receiving the characters from said indicia converting means and for assembling said characters into a word; a permanent storage means having a plurality of channels, each of said channels including a plurality of registers, each of said registers having a first portion for storing characters related to said word stored in said temporary storage means and a second portion storing bits related to said second coded combination of signals, a first key register at the start of a first of said channels for indicating that said channel contains registers whose first portions store combinations of characters within a given first group; a second key register in a second of said channels for indicating that said channel contains registers whose first portions store combinations of characters within a given second group; comparison means responsive to said temporary storage means and said permanent storage means for comparing the characters of said registers with the characters of said word stored in said temporary storage means, said comparing means for transmitting a first signal when a first predetermined relationship exists between the characters of a key register and the characters of said word and a second signal when a second predetermined relationship exists between the characters of the registers and the characters of said word; switching means for selectively coupling said channels to said comparison means, said switching means including means for initially coupling said first channel to said comparison means, and means responsive to said first signal for causing the coupling of another channel to said comparison means and means responsive to said second signal for converting the bits of the second portion of the register whose first portion participated in a comparison that resulted in the transmission of said second signal to a second coded combination of signals for transmission to said routing means.

7. For combination with apparatus having means for converting indicia on a record medium representing characters to first coded combinations of signals representing said characters and having means for routing said record medium to one of a plurality of locations in response to a second coded combination of signals, apparatus comprising: temporary storage means for receiving the characters from said indicia converting means and for assembling said characters into a word; a permanent storage means having a plurality of parallel channels, each of said channels including a plurality of sequentially available registers, each of said registers having a first portion for storing characters related to said word stored in said temporary storage means and a second portion storing bits related to said second coded combination of signals, a first key register at the start of a first of said channels for indicating that said first channel contains registers whose first portions store combinations of characters within a given first group; a second key register in a second of said channels for indicating that said second channel contains registers whose first portions store combinations of characters within a given second group, a third key register in a third of said channels for indicating that said third channel contains registers whose first portions store combinations of characters within a given third group, said first key register being serially displaced from said second key register by M registers and said second key register being displaced from said third key register by N registers, where M and N are predetermined numbers; comparison means responsive to said temporary storage means and said permanent storage means for first comparing the characters of said registers with the characters of said word stored in said temporary storage means, said comparing means for transmitting a first signal when a first predetermined relationship exists between the characters of a key register and the characters of said word and a second signal when a second predetermined relationship exists between the characters of the registers and the characters of said word; switching means for selectively coupling said channels to said comparison means, said switching means including means for initially coupling said first channel to said comparison means, and means responsive to said first signal for causing the coupling of another channel to said comparison means, and means responsive to said second signal for converting the bits of the second portion of the register whose first portion participated in a comparison that resulted in the transmission of said signal to a second coded combination of signals for transmission to said routing means.

8. The apparatus of claim 7 wherein M and N are equal.

9. For combination with apparatus having means for converting indicia on a record medium representing characters to first coded combinations of signals representing said characters and having means for routing said record medium to one of a plurality of locations in response to a second coded combination of signals, apparatus comprising: temporary storage means for receiving the characters from said indicia converting means and for assembling said characters into a word; a permanent storage means having a plurality of channels, each of said channels including a plurality of registers, each of said registers having a first portion for storing characters related to said word stored in said temporary storage means and a second portion storing bits related to said second coded combination of signals, a first key register at the start of a first of said channels, a second key register in said first channel displaced a given number of registers from said first key register; comparison means responsive to said temporary storage means and said permanent storage means for first comparing the characters of said registers with the characters of said word stored in said temporary storage means, said comparing means transmitting a first signal when a first predetermined relationship exists between the characters of said first key register and the characters of said word or when a second predetermined relationship exists between the characters of said second key register and the characters of said word and transmitting a second signal when a predetermined relationship exists between said word stored in said temporary storage means and the characters of the first portion of one of said registers; switching means for selectively coupling said channels to said comparison means, means for coupling a second channel to said comparison means when said first signal is transmitted during the first key register comparison or for coupling a third channel to said comparison means when said first signal is transmitted during the second key register comparison; and means responsive to said second signal for converting the bits of the second portion of the register whose first portion participated in a comparison that resulted in the transmission of said signal to a second coded combination of signals for transmission to said routing means.

10. The apparatus of claim 9 wherein said first and second predetermined relations are the same.

11. For combination with apparatus having means for converting indicia on a record medium representing characters to first coded combinations of signals representing said characters and having means for routing said record medium to one of a plurality of locations in response to a second coded combination of signals, apparatus comprising: synchronizing means for receiving the characters from said converting means; temporary storage means for receiving the characters stored in said synchronizing means, said temporary storage means including means for duplicating a plurality of said characters, the group of characters in said temporary storage means being divided into three portions, a first portion, a second portion which is the duplicate of said first portion and a third portion; a permanent storage means including a plurality of registers, each of said registers having a first portion for storing characters related to characters stored in said temporary storage means and a second portion storing bits related to said second coded combination of signals, comparison means responsive to said temporary storage means and said permanent storage means for comparing the characters of the first portions of said registers, said comparing means including means for comparing the first and third portions of the coded combinations of characters in a first portion of a register with the first and third portions respectively of the group of characters in said temporary storage means for giving an indication unless a predetermined relationship exists, means for comparing the second and third portions of the coded combinations of characters in said first portion of said register for giving an indication unless a second predetermined relationship exists, and means for transmitting a signal when neither indication is produced; and means responsive to said signal for converting the bits of the second portion of the register whose first portion anticipated in a comparison that resulted in the transmission of said signal to a second coded combination of signals for transmission to said routing means.

12. For combination with apparatus having means for converting indicia on a record medium representing characters to first coded combinations of bits representing said characters and having means for routing said record medium to one of a plurality of locations in response to a second coded combination of bits as signals, apparatus comprising: synchronizing means for receiving the characters from said converting means; temporary storage means for receiving the characters stored in said synchronizing means, said temporary storage means including means for deleting bit positions of a plurality of said characters, a permanent storage means having a plurality of registers, each of said registers having a first portion for storing characters related to characters stored in said temporary storage means and a second portion storing bits related to said second coded combination of signals; comparison means responsive to said temporary storage means and said permanent storage means for comparing the characters of the first portions of the registers of said selected channel for transmitting a signal when a predetermined relationship exists between said characters stored in said temporary storage register and the characters of the first portion of one of said registers; and means responsive to said signal for converting the bits of the second portion of the register whose first portion anticipated in a comparison that resulted in the transmission of said signal to a second coded combination of signals for transmission to said routing means.

13. For combination with apparatus having means for converting indicia on a record medium representing characters to first coded combinations of signals representing said characters and having means for routing said record medium to one of a plurality of locations in response to a second coded combination of signals, apparatus comprising: temporary storage means for assembling said characters into an M-character or an N-character word where M and N are given numbers; a permanent storage means having a plurality of parallel channels, each of said channels having a plurality of serially occurring first registers having a first portion for storing M characters to said M-character word and a second portion storing bits related to said second coded combination of signals, and a plurality of serially occurring second registers having a first portion for storing N characters related to said N-character word, the transition from first registers to second registers in each of said channels being displaced by predetermined numbers of registers from the transition from first registers to second registers in other of said channels; comparison means responsive to said temporary storage means and said permanent storage means for comparing the characters of said registers with the characters of the word stored in said temporary storage means, said comparison means having means for transmitting a first signal when a first predetermined relationship exists between the characters of the register following a transition in certain of said channels, and means for transmitting a second signal when a second predetermined relationship exists between the characters of any register and the characters of said word; switching means for selectively coupling said channels to said comparison means, and switching means including means for initially coupling a first of said channels to said comparison means and means responsive to said first signal for causing the coupling of another channel to said comparison means; and means responsive to said second signal for converting the bits of the second portion of the register whose first portion participated in a comparison that resulted in the transmission of said second signal to a second coded combination of signals for transmission to said routing means.

14. The apparatus of claim 13 wherein said predetermined number of registers of displacement is the same from channel to channel.

15. The apparatus of claim 13 wherein the transition from second registers to first registers in each of said channels is displaced by predetermined numbers of registers from the transition from second registers to first registers in the other of said channels.

16. The apparatus of claim 15 wherein the said transitions from first registers to second registers in each of said channels is displaced from said transitions in the other channels by N of said first registers, and said transitions from second registers to first registers in each of said channels is displaced from said transitions in the other channels by M of said second registers.

References Cited by the Examiner
UNITED STATES PATENTS

| | | | |
|---|---|---|---|
| 2,533,242 | 12/1950 | Gridley | 340—347 X |
| 2,818,322 | 12/1957 | Blakely | 340—174.13 |
| 2,819,656 | 12/1959 | Nolde | 340—174.1 |
| 2,940,065 | 6/1960 | Formby | 340—174.1 |
| 2,950,049 | 8/1960 | Mazer | 340—149.1 |

ROBERT C. BAILEY, *Primary Examiner.*

IRVING L. SRAGOW, *Examiner.*